（12）United States Patent
Zoellner et al.

(10) Patent No.: US 7,865,873 B1
(45) Date of Patent: Jan. 4, 2011

(54) BROWSER-BASED SYSTEM AND METHOD FOR DEFINING AND MANIPULATING EXPRESSIONS

(75) Inventors: Keith Zoellner, Austin, TX (US); Morry Belkin, Austin, TX (US); Jeremy Kaplan, Woodstock, IL (US)

(73) Assignee: Stored IQ, Austin, TX (US)

( * ) Notice: Subject to any disclaimer, the term of this patent is extended or adjusted under 35 U.S.C. 154(b) by 1047 days.

(21) Appl. No.: 11/645,205

(22) Filed: Dec. 22, 2006

Related U.S. Application Data

(63) Continuation-in-part of application No. 11/524,831, filed on Sep. 21, 2006, now Pat. No. 7,610,285.

(60) Provisional application No. 60/719,058, filed on Sep. 21, 2005, provisional application No. 60/754,938, filed on Dec. 29, 2005.

(51) Int. Cl.
*G06F 9/44* (2006.01)
*G06F 3/00* (2006.01)

(52) U.S. Cl. .............. 717/110; 717/113; 717/120; 717/123; 715/760; 715/761; 715/782

(58) Field of Classification Search .............. 717/110; 715/760
See application file for complete search history.

(56) References Cited

U.S. PATENT DOCUMENTS 5,996,054 A * 11/1999 Ledain et al. ............... 711/203
6,205,543 B1    3/2001 Tremblay et al.
6,263,498 B1 *  7/2001 Alcorn et al. ............... 717/110
6,550,057 B1 *  4/2003 Bowman-Amuah ......... 717/126
7,013,466 B2 *  3/2006 Carey et al. ................. 719/316
7,610,285 B1   10/2009 Zoellner et al.
2004/0098415 A1 * 5/2004 Bone et al. .................. 707/200
2006/0020646 A1  1/2006 Tee et al.
2006/0168589 A1  7/2006 Moore

OTHER PUBLICATIONS

Office Action issued in U.S. Appl. No. 11/524,831, mailed Sep. 10, 2008, 16 pgs.
Office Action issued in U.S. Appl. No. 11/524,831, mailed Apr. 16, 2009, 16 pgs.

* cited by examiner

*Primary Examiner*—Thomas K Pham
(74) *Attorney, Agent, or Firm*—Sprinkle IP Law Group

(57) ABSTRACT

Embodiments of the invention provide methods and systems for defining classes of objects which entails defining and manipulating expressions. A two-tiered classification editor operates to enable a user to define and manipulate expression in real time through a browser-based user interface. The first tier comprises a group editor for enabling a user to define groups. The second tier comprises an expression editor for enabling a user to define and manipulate an expression comprising a set of groups and one or more relationships between the groups. Each group may comprise a set of conditions, each of which may be based on a possible attribute of an object. Via the expression editor, a user can drag and drop to create and modify these expressions on-the-fly. When a user is done manipulating an expression on the second tier, the user is returned to the first tier, which may present the expression as modified.

20 Claims, 40 Drawing Sheets

FIG. 28

StoredIQ management system - Microsoft Internet Explorer

File  Edit  View  Favorites  Tools  Help

Back ▸  ▸  ✕  ⟳  ⌂  | Search  ☆ Favorites  | ▸  ▸  ▾  ▾  ▾

Address  D:\deepfiler\parts\ui\web\Static\objectclass.htm  ▾  Go  Links »

Classification details

Classification name: Demo
Description: This is the demo of the classification page Current expression
First Group Or Second Group Or Third Group                    Volume: Every Volume ▾   Modify Group editor First Group                                                                    New Group  ✕
  ⊞ All of the following
    FSMD    Path       is          /usr/lib
    FSMD    Accessed   at least    3 days ago
    FSMD    Size       between     1000 and 9999 KB Second Group                                                                              ✕
  ⊞ Any of the following Condition set name: Third Group                                                           ✕
Condition set should contain: At least ▾  2  of the following

| Category | Object | Condition | Attribute |   |   |   |
|---|---|---|---|---|---|---|
| ePHI | Drug names (high confidence) | appears | at most 20 times | | Edit • Remove |
| ePHI | Account numbers | contains | siq | | Edit • Remove |
| ePHI | Employer names | is | StoredIQ | | Edit • Remove |

Attributes
▲ File system                           Add ▸
▲ Standard entity                       Add ▸
▼ ePHI entity                           Add ▸
  Account numbers                       Add ▸
  Admission dates                       Add ▸
  Ages over 89                          Add ▸
  Certificate license numbers           Add ▸
  Dates of birth                        Add ▸
  Dates of death                        Add ▸
  Device identifier or serial numbers   Add ▸
  Discharge dates                       Add ▸
  Drug names (high confidence)          Add ▸
  Drug names (low confidence)           Add ▸
  Employer names                        Add ▸
  Health plan beneficiary numbers       Add ▸
  Medical record numbers                Add ▸
  Medical terms (high confidence)       Add ▸

Done                                                                          My Computer

BROWSER-BASED SYSTEM AND METHOD FOR DEFINING AND MANIPULATING EXPRESSIONS

CROSS-REFERENCE TO RELATED APPLICATION(S)

This is a continuation-in-part application of U.S. patent application Ser. No. 11/524,831, filed Sep. 21, 2006, now U.S. Pat. No. 7,610,285 entitled "SYSTEM AND METHOD FOR CLASSIFYING OBJECTS", which claims priority from U.S. Provisional Patent Application No. 60/719,058, filed Sep. 21, 2005, entitled "SYSTEM AND METHOD FOR CLASSIFYING OBJECTS". This application also claims priority from U.S. Provisional Patent Application No. 60/754,938, filed Dec. 29, 2005, entitled "SYSTEM AND METHOD FOR DEFINING AND MANIPULATING EXPRESSIONS". All applications referenced in this section are hereby fully incorporated herein for all purposes.

FIELD OF THE INVENTION

The present invention relates generally to managing and controlling data storage resources. More specifically, the present invention relates to systems, methods and apparatuses for filtering and classifying objects in file systems or file based data storage media utilizing metadata and/or content of the files and other objects stored in the file systems or file-based data storage media. Even more specifically, the present invention relates to systems and methods for constructing and manipulating expressions useful for classifying or implementing rules with respect to the files or objects in the file systems or file-based data storage.

BACKGROUND OF THE INVENTION

Today's computers require memory to hold or store both the steps or instructions of programs and the data that those programs take as input or produce as output. This memory is conventionally divided into two types, primary storage and secondary storage. Primary storage is that which is immediately accessible by the computer or microprocessor, and is typically though not exclusively used as temporary storage. It is, in effect, the short term memory of the computer.

Similarly, secondary storage can be seen as the long-term computer memory. This form of memory maintains information that must be kept for a long time, and may be orders of magnitude larger and slower. Secondary memory is typically provided by devices such as magnetic disk drives, optical drives, and so forth. These devices present to the computer's operating system a low-level interface in which individual storage subunits may be individually addressed. These subunits are often generalized by the computer's operating system into "blocks," and such devices are often referred to as "block storage devices."

Block storage devices are not typically accessed directly by users or (most) programs. Rather, programs or other components of the operating system organize block storage in an abstract fashion and make this higher-level interface available to other software components. The most common higher-level abstraction thus provided is a "filesystem." In a filesystem, the storage resource is organized into directories, files, and other objects. Associated with each file, directory, or other object is typically a name, some explicit/static metadata such as its owner, size, and so on, its contents or data, and an arbitrary and open set of implicit or "dynamic" metadata such as the file's content type, checksum, and so on. Directories are containers that provide a mapping from directory-unique names to other directories and files. Files are containers for arbitrary data. Because directories may contain other directories, the filesystem client (human user, software application, etc.) perceives the storage to be organized into a quasi-hierarchical structure or "tree" of directories and files. This structure may be navigated by providing the unique names necessary to identify a directory inside another directory at each traversed level of the structure; hence, the organizational structure of names is sometimes said to constitute a "filesystem namespace."

Filesystems support a finite set of operations (such as create, open, read, write, close, delete, etc.) on each of the abstract objects which the filesystem contains. For each of these operations, the filesystem takes a particular action in accordance with the operation in question and the data provided in the operation. The sequence of these operations over time affects changes to the filesystem structure, data, and metadata in a predictable way. The set of filesystem abstractions, operations, and predictable results for particular actions is said to constitute "semantics" for the filesystem. While particular filesystems differ slightly in their precise semantics, in general filesystems implement as a subset of their full semantics a common semantics. This approximately equivalent common semantics can be regarded as the "conventional" or "traditional" filesystem semantics.

Storage resources accessed by some computer, its software or users need not be "directly" attached to that computer. Various mechanisms exist for allowing software or users on one computing device to access over a network and use storage assets that are actually located on another remote computer or device. There are many types of remote storage access facilities, but they may without loss of generality be regarded to fall into one of two classes: block-level and file-level. File-level remote storage access mechanisms extend the filesystem interface and namespace across the network, enabling clients to access and utilize the files and directories as if they were local. Such systems are therefore typically called "network file systems." Note that the term "network file system" is used herein generally to refer to all such systems—there is a network file system called Network File System or NFS, originally developed at Sun Microsystems and now in the public domain. When discussing the general class of such systems herein, the lower-case term, e.g., "networked file systems" will be used. When discussing the specific Sun-developed networked file system, the fully capitalized version of the term or its acronym, e.g., "Network File System or NFS" will be used.

Networked file systems enable machines to access the filesystems that reside on other machines. Architecturally, this leads to the following distinctions: in the context of a given filesystem, one machine plays the role of a filesystem "origin server" (alternatively, "fileserver" or "server") and another plays the role of a filesystem client. The two are connected via a data transmission network. The client and server communicate over this network using standardized network protocols; the high-level protocols which extend the filesystem namespace and abstractions across the network are referred to as "network filesystem protocols." Exemplary filesystem protocols include the Common Internet File System (CIFS), the aforementioned NFS, Novell's Netware filesharing system, Apple's Appleshare, the Andrew File System (AFS), and the Coda Filesystem (Coda). CIFS and NFS are by far the most prevalent. These network filesystem protocols share an approximately equivalent semantics and set of abstractions, but differ in their details and are noninteroperable. Thus, to use a filesystem from a fileserver, a client must "speak the same language," i.e., have software that implements the same protocol that the fileserver uses.

A fileserver indicates which portions of its filesystems are available to remote clients by defining "exports" or "shares." To access a particular remote fileserver's filesystems, a client must then make those exports or shares of interest available by including them by reference as part of their own filesystem namespace. This process is referred to as "mounting" or "mapping (to)" a remote export or share. By mounting or mapping, a client establishes a tightly coupled relationship with the particular file server. The overall architecture can be characterized as a "two-tier" client-server system, since the client communicates directly with the server which "has" the resources of interest to the client.

In addition to organizing and maintaining the relationships between filesystem clients and file servers, additional challenges exist in managing access to and utilization of filesystems. While most organizations have and enforce stringent document workflow and retention policies for their paper files, similar policies—while desired and mandated—are rarely enforced for electronic files. As a non-limiting example, many corporations have a policy that prohibits the usage of corporate storage capacity on fileservers for the storage of certain personal files and content types, for instance, digital music in MP3 format, personal digital images, so on. This "policy" usually takes the form of a memo, email, entry in a company policy manual, etc. The administrators in charge of enforcing this policy face significant challenges. Conventional filesystems do not provide mechanisms for configuring a filesystem to only allow particular content types or otherwise make decisions about what should be stored, where, and how. These conventional filesystems are static, and the set of semantics for access and other administrative controls are rather limited. Thus any such policy enforcement that happens is done retroactively and in an ad-hoc manner via manual or mostly-manual processes. The net result is that network file storage fills up with old, duplicated, and garbage files that often violate corporate and administrative utilization policies.

In today's increasingly litigious environment and in the presence of new rules and regulations such as the Health Insurance Portability and Accountability Act of 1996 (HIPAA) and the Sarbanes-Oxley Act of 2002, the lack of management, including the inability to enforce policies consistently and effectively, represents a serious risk that corporations and businesses alike must rush to address. Unfortunately, as a direct result of the general lack of innovation and improvement in filesystem architecture over the last 30 years, viable solutions that could provide practical and effective policy management to enterprises do not seem to exist.

Perhaps a general comparison between typical databases systems and typical filesystems could provide an insight as to the lack of innovation and improvement in filesystem architecture. For databases, storage is usually organized into tables arranged in a flat space (i.e., tables may not be contained in other tables) which contain records with generally fixed form. Such database systems often provide a notion of "triggers" and "stored procedures." Triggers define a set of conditions; when the database is manipulated in a way that matches some condition, the stored procedure associated with that trigger is executed, potentially modifying the transaction or operation. This mechanism is used primarily in two ways in database applications: to ensure data correctness and integrity and to automate certain administrative and application-specific tasks. The analogous facility is not available in filesystems because filesystems are quasi-hierarchical collections of directories and files. As such, triggers cannot be generally or easily defined with associated stored procedures that can be automatically activated and enacted synchronous with a filesystem activity in any extant filesystem.

In general, implementation of triggers and stored procedures in filesystems is significantly more complex than in databases systems because of less regular structure of filesystems, their less formally well-defined semantics, and because file data is itself arbitrarily semi-structured and loosely typed. Implementation of programmable procedures which respond to an arbitrary filesystem operation by modifying the operation is challenging when the correct (i.e., traditional, expected, etc.) semantics of filesystems must be preserved. There are existing systems that will generate "events" when operations occur on the filesystem; these events can then be used to activate arbitrary actions post-facto. However, the actions cannot themselves modify the file operation, since the event which activates them is not generated until the triggering operation completes.

Currently, the "intelligence" that a conventional filesystem exhibits with respect to access control is typically restricted to a static set of rules defining file owners, permissions, and access control lists. To the extent even this relatively low level of "intelligence" exists, it is usually statically defined as a part of the filesystem implementation and may not be extended.

In a typical enterprise, the files and directories stored in the enterprise filesystems represent unstructured or semi-structured business intelligence, which comprises the work product and intellectual property produced by its knowledge workers. The work product may include business-critical assets and may range from Excel spreadsheets representing (collectively) the financial health and state of the enterprise to domain-specific artifacts such as Word documents representing memos to customers. However, in contrast to the data stored in "mission critical" information systems such as logistics systems, inventory systems, order processing systems, customer service systems, and other "glass house" applications, the unstructured and semi-structured information stored in the enterprise filesystems is largely "unmanaged." It is perhaps backed up but little or no effort is made to understand what the information is, what its relevance or importance to the business might be, or even whether it is appropriately secured.

As examples, assuming that a user 'Idunno' has stored unauthorized and illegal copies of MP3 music files in a "home directory" on some file server that belong to a corporation 'Big Corp' where Idunno works. In doing so, Idunno has perhaps violated a corporate policy of Big Corp stating that no MP3 files are to be stored on the network. However, the system managers may have no knowledge to this violation, nor any automated means of remedying the situation. Even in the event that the system managers are able to episodically inventory the filesystems for such violators, they are often loathe to automatically take appropriate actions (e.g., deleting) on such offending files. The reason is that, more often than not, while they have the responsibility for enforcing such policies, they do not have the authority to do so. To remedy this, the end-user (i.e., the file owner—in this example, Idunno) or some other responsible party must be brought "into the loop." Other examples of file management policies might include: documents relating to patients' individual medical conditions within a healthcare provider business might be stored in such a way that perhaps would violate the privacy constraints of HIPAA; or financial documents within the finance operation of a Fortune 2000 company might be stored in such a way that perhaps would violate both regulatory requirements under the Sarbanes-Oxley Act of 2002 and internal corporate governance considerations.

The pressing need to monitor filesystems and to report activities related to the filesystems presents a challenge of unprecedented scope and scale on many fronts. Filesystem activity produces changes to the state of a filesystem. This activity can affect changes to the structure, the stored metadata, and the stored data of the directories and files. Generally speaking, this activity is not logged in any way; rather, the filesystem itself holds its current state. Some filesystems—called "journaling" filesystems—maintain transient logs of changes for a short duration as a means of implementing the filesystem itself; however, these logs are not typically organized in any way conducive to monitoring and reporting on the state of the filesystem and its activity and are not made available to external programs for that purpose. Further, these logs are frequently purged and therefore provide a poor basis for reporting of historical and trend data.

One significant and open problem is that of collection, redaction, and analysis of high-level data about what a filesystem is being used for, what is stored in it, by whom and for what purpose. Solutions today involve software programs or users explicitly walking through the filesystem structure, gathering the data required, and then analyzing it and/or acting on it, etc. Collection of filesystem data proactively as operations occur is generally not done as it is generally not supported by the filesystem itself. Furthermore, the accuracy of such collected data is usually questionable, as it reflects not an instantaneous state of the filesystem at any given moment, but, rather, an approximate state of the filesystem over the duration of the run. Without collecting and maintaining the appropriate statistics as file operations occur, it is impossible for the data, at the end of the run, to represent a correct and accurate picture of the contents of the filesystem at that time.

The problem of data collection and reporting is further compounded in the network filesystem environment. Because each server—indeed, each filesystem on each server—is a separate entity, it is therefore necessary to perform each data collection independently on each server. If reporting or monitoring is to be done across the network filesystem environment, significant challenges exist; namely, because of the parallel and discrete nature of the collection runs, it becomes difficult or impossible to sensibly merge the collected data into a consistent snapshot of the state of the filesystem at some time.

It is further the case that collection and storage of all such data as it occurs could be untenably burdensome; such logs would "grow" quickly and consume additional storage capacity at an undesirable rate.

A need exists for a system and method that can collect data as it occurs, that can dynamically redact or "historize" the collected data, and that would allow ongoing statistics to be gathered and maintained while simultaneously constraining the total amount of storage capacity that must be dedicated to such a purpose. A further need exists for a system and method that would enable a user to define and manipulate expressions for the purpose of classifying or implementing rules with respect to the files or objects in the file systems or file-based data storage. Embodiments of the present invention address these needs and more.

SUMMARY OF THE INVENTION

Embodiments of the invention provide methods and systems for defining classes of objects. In one embodiment, defining object classes entails defining and manipulating expressions. In one embodiment, a two-tiered classification editor operates to enable a user to define and manipulate expression in real time (i.e., on-the-fly) through a browser-based user interface.

The first tier of the browser-based classification editor may comprise a group editor for enabling a user to define objects in various groups. In one embodiment, each group may comprise a set of conditions and, if the group comprises more than one condition, a relationship between these conditions. Each of the conditions, in turn, may be based on a possible attribute of an object.

The second tier of the browser-based classification editor may comprise an expression editor for enabling a user to drill down and define or otherwise manipulate an expression comprising a set of groups and one or more relationships between the groups. Via the expression editor, a user can drag and drop to create and modify these expressions on-the-fly. By modifying the expression, the effect of the evaluation of the expression is changed almost instantly and different objects may be encompassed by this evaluation. As groups are defined on the first tier, when more than one group is defined a default expression is constructed wherein the default expression comprises one or more logical or other relationships between the currently defined set of groups. In one embodiment, the second tier may use menus of other types to allow logical relationship to be defined or altered, or additional items such as parentheses to be added to the expression. When a user is done manipulating an expression on the second tier, the user may be returned to the first tier, which may present the expression as modified on the second tier.

BRIEF DESCRIPTION OF THE DRAWINGS

A more complete understanding of the present invention and the advantages thereof may be acquired by referring to the following description, taken in conjunction with the accompanying drawings in which like reference numbers indicate like features.

FIGS. 7-41 depict an example of a set of interfaces operable to implement a two-tiered browser-based classification editor according to one embodiment of the invention.

DETAILED DESCRIPTION

Figure 1:
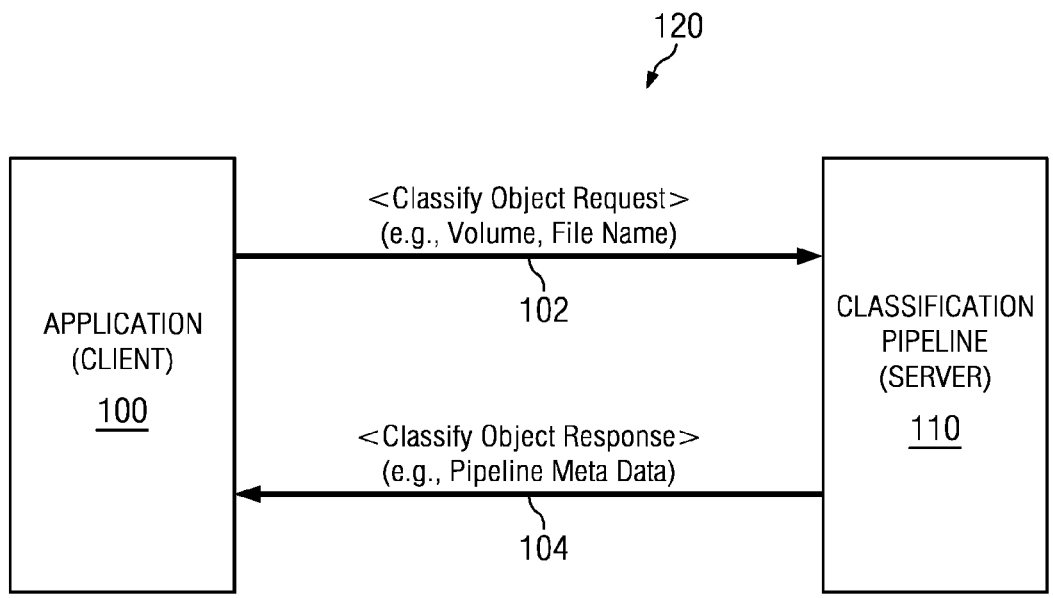
FIG. 1 depicts a block diagram illustrating a synchronous integration flow of a classification pipeline according to one embodiment of the present invention.

The invention and the various features and advantageous details thereof will now be described with reference to the exemplary, and therefore nonlimiting, embodiments that are illustrated in the accompanying drawings. Descriptions of known programming languages and techniques, networking, communications and computer software and hardware, operating platforms and protocols may be omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before describing embodiments of the invention in detail, it might be helpful to clarify a few terms used in this disclosure. A "file classification" can have one or more file attributes and can be associated with one or more volumes. A volume is a mountable share where objects (e.g., subject files) reside on a server. A file attribute is an entity, an instance of a file classification or file system metadata. The term "file system metadata" or its acronym "FSMD" encompasses file system attributes that embodiments of the invention maintain about files. An exemplary list of file system attributes implementing embodiments of the invention can be found in the User's Guide, StoredIQ Appliance 4.0, July 2006 edition, pp. 106-125, attached as appendix A to the present application. FSMD may comprise metadata such as access and creation times, file size, etc. A content-based entity is an instance of data, type of entity, location of entity, or data match. Examples of entities can be found in the aforementioned User's Guide, pp. 126-131.

Attention is now directed to systems, methods and apparatuses for a classification pipeline configured to provide a set of tagging and extraction services. The classification pipeline disclosed herein may be embodied in computer-executable program instructions residing on computer-readable media. In one embodiment, a system implementing the classification pipeline disclosed herein is programmed with computer-executable program instructions for extracting and/or analyzing the data of files or other objects in the filesystem (collectively referred to as objects) or metadata pertaining to these objects, in order that the objects may be classified and/or certain actions taken based on the classification of the object. Actions (e.g., executing a business policy, harvesting metadata, generating a report, etc.) may be taken based upon the classification of the object or based upon metadata associated with the objects.

In embodiments of the invention, the tagging and extraction services provided by the classification pipeline are made available to one or more clients (i.e., machines running client software) through an interface. In the present disclosure, this interface is interchangeably referred to as the "classification pipeline interface" or simply "the interface". The interface may be implemented in various ways. For example, it may be implemented as an application web interface or an Applications Programming Interface (API). It may be implemented as a single synchronous interface or a set of asynchronous interfaces. One example of a synchronous interface for a classification pipeline is described below with reference to FIG. 1. One example of a set of asynchronous interfaces for a classification pipeline is described below with reference to FIG. 2. In both examples, the classification pipeline configuration can be controlled through the interface, which is implemented as an API exposed as a series of XML request and replies over TCP.

A synchronous interface implementing embodiments of the invention may comprise two components: the Classify Object Request and the Classify Object Response. The Classify Object Request is designed to pass a set of parameters to the classification pipeline for a single file. The metadata for the specified file is extracted and passed back to the requesting application on the Classify Object Response. The interface of this type may be referred to as an "Object_Classify_Request interface".

In one embodiment, the Classify Object Request can pass at least two types of parameters: required and optional. Required parameters may include File Name (i.e., the name of the file to be classified) and Volume (i.e., the volume where the file is located.) The File Name parameter could be fully qualified relative to the context provided by the Volume parameter. In one embodiment, the Volume parameter refers to a volume defined within an appliance that is hosting the pipeline (e.g., a StoredIQ appliance), in which case, a volume must first be defined on that appliance (e.g., using the StoredIQ user interface) before it can be given as a parameter. Various volume types (e.g., CIFS, NFS, Netware, Centera, Exchange, etc.) may be implemented in embodiments of the invention. Examples of volume configuration options can be found in the aforementioned User's Guide, StoredIQ Appliance 4.0, July 2006 edition, pp. 36-39. Optional parameters for the Classify Object Request may include:

Pipeline Profile Name—Refers to the name of a pipeline profile that is defined on the appliance hosting the classification pipeline. The pipeline profile determines what sets of metadata the client application will receive from the classification pipeline. Using the StoredIQ appliance as an example, the pipeline profile is set up in the System Configuration tab of the StoredIQ user interface. If no pipeline profile name is passed, the default is to provide all sets of metadata. Other configurations are possible.

Object System Metadata—This parameter includes data such as file size, access times, and modified times. The data will vary depending upon the underlying object system (e.g., CIFS, NFS, Netware, etc.). Embodiments of the classification pipeline are configured to extract all types of metadata. In cases where user(s) inherently have object system metadata "in hand" (e.g., as a function of learning or acquiring the name of the file to be classified), the classification pipeline is operable to allow the user(s) to pass the user-acquired data into the pipeline.

External Metadata—This parameter provides a mechanism for client applications to pass in metadata that is not created by the pipeline per se, but can be referenced within the object classification rules engine to assist in the classification processing.

There are many different types of metadata, including metadata about electronic documents created by client applications. Document metadata describes document attributes such as the title, author, content, location, and date of creation. Since it is often possible to view a history of every change ever made to an electronic document during its lifetime, acquiring this type of information can help in "historicizing" and/or classifying the document. Document metadata can include edits and comments made by the author and other users to a document as well as hidden information about the document. Exemplary document metadata may include one or more of the following: text changes, comments, document versions, document revisions, template information, file properties and summary information, author's name, author's initials, author's email address, company or organization's name, name of the computer on which it is created, name of the hard disk, volume, or network server on which the document is saved, routing information, names of previous authors, hyperlinks, macros, hidden text, and non-visible portions of embedded Object Linking and Embedding (OLE) objects, etc.

FIG. 1 depicts a block diagram illustrating a synchronous integration flow of a classification pipeline according to one embodiment of the present invention. API 120 can be used by any type of software application to interface with the classification pipeline. For example, Application 100 may wish to receive information pertaining to a certain object or to a certain location on a particular filesystem. More details on the term "object" will be described below with reference to FIGS. 3-5. To obtain this information on the object, Application 100 may send a <Classify Object Request> 102 ("request 102") to Classification Pipeline 110 with information pertaining to the object on which Application 100 wishes to receive information. The information pertaining to the object sent via request 102 may include information such as the volume on which the object is located or the name of the object.

To facilitate the sending of request 102 (and possibly of response 104 to request 102), request 102 may be formulated according to API 120 or any suitable API that Classification Pipeline 110 is operable to implement. Classification pipeline 110 may then obtain or extract metadata on or about the object, and/or classify the object according to a set of classification parameters. In one embodiment, the metadata extracted or obtained on the object may be dependent on a level of service specified in conjunction with Classification Pipeline 110.

In response to request 102, Classification Pipeline 110 may send a <Classify Object Response> 104 ("response 104"). Response 104 may contain information pertaining to the object on which information was requested in request 102. This information on the object may be metadata pertaining to the object (e.g., Pipeline Metadata) or data contained by the object, or a classification of the object, or tagged entities that were found within the content of the object. In one embodiment, metadata in response 104 may be formulated as an XML string.

The interaction with Classification Pipeline 110 depicted in FIG. 1 may occur in a synchronous manner. In other words, Application 100 may send request 102 to Classification Pipeline 110, which in turn will respond with response 104 to the same Application 100 when metadata has been obtained on the object, or the object has been classified. In some cases, however, it may be desirable to have separate, asynchronous interactions, such that a request pertaining to an object may be sent by one application and the metadata or classification information about that object may be sent to, or obtained by, another distinct application, portion of application or location.

Asynchronous interfaces allow an asynchronous ingest and an asynchronous publish subscribe interface to the pipelines output. They may be configured with one or more of the following abilities: get and set volume definitions, get and set file classification definitions, get and set new entity types, and get and set pipeline profile configurations.

Figure 2:
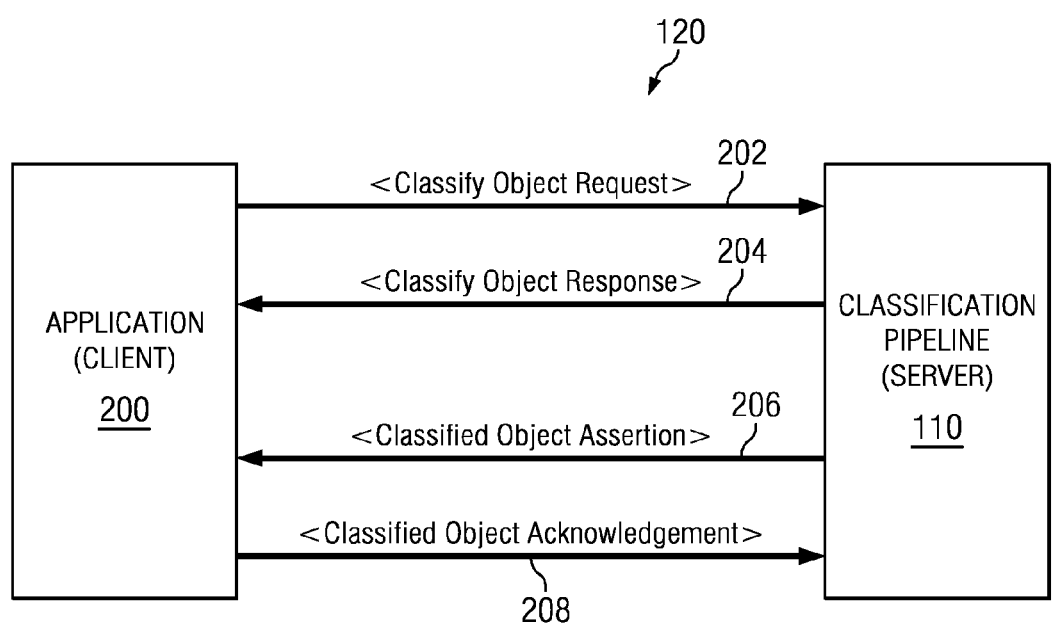
FIG. 2 depicts a block diagram illustrating an asynchronous integration flow of a classification pipeline according to one embodiment of the present invention.

FIG. 2 depicts a block diagram illustrating an asynchronous integration flow of a classification pipeline according to one embodiment of the present invention. In this example, Application 200 may send a <Classify Object Request> 202 ("request 202") to Classification Pipeline 110 with information pertaining to the object on which Application 200 wishes to receive information. The information pertaining to the object sent via request 202 may include information such as the volume on which the object is located or the name of the object. Request 202 may also contain information on the location to which a response to request 202 is to be delivered, such as to what application the response should be delivered, what portion of an application the response should be delivered, or if the response should be stored etc. To facilitate the sending of request 202, request 202 may be formulated according to API 120 or any suitable API that Classification Pipeline 110 is operable to implement.

In response to this initial request 202, Classification Pipeline 110 may send a <Classify Object Response> 204 ("response 204") indicating that request 202 has been received by Classification Pipeline 110 and that information will be delivered to the requested application/location. Classification Pipeline 110 may then operate to obtain or extract metadata on or about the object, or to classify the object according to a set of classification parameters. In one embodiment, the metadata extracted or obtained on the object may be dependent on a level of service specified in conjunction with Classification Pipeline 110.

Once this information has been obtained, Classification Pipeline 110 may send a <Classified Object Assertion> 206 ("response 206"). Response 206 may contain information pertaining to the object on which information was requested in request 202, and may be sent to the location, application or portion of application specified in request 202. Although response 206 is depicted in FIG. 2 as being sent to Application 200, this is for the convenience of depiction and for the purpose of illustration only. Response 206 may be delivered to another application (not shown), a location (not shown), or a certain procedure or portion of Application 202. This information on the object may be metadata pertaining to the object or data contained by the object, or a classification of the object. In one embodiment, metadata in response 206 may be formulated as an XML string.

Upon receiving response 206, Application 200 (or a portion of Application 202) may send a <Classified Object Acknowledgement> 208 ("response 208") acknowledging that the information pertaining to the object has been received.

Figure 3:
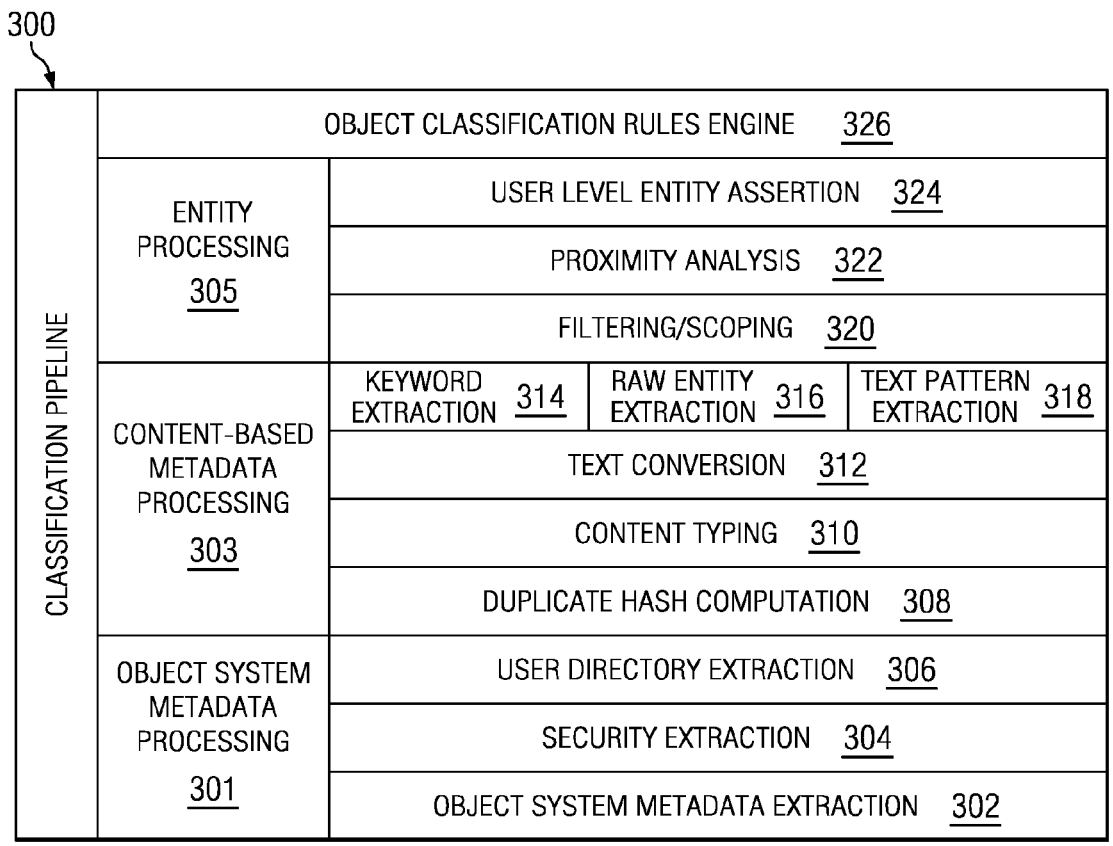
FIG. 3 depicts a classification pipeline according to one embodiment of the invention.

Moving to FIG. 3, one embodiment of a classification pipeline is depicted. Classification Pipeline 300 may comprise a plurality of layers through which metadata can be obtained and/or processed for submission to Object Classification Rules Engine 326. The term "layers" is representative of the various ways in which the functionality of Classification Pipeline 300 may be implemented (e.g., services, stages, etc.). In one embodiment, the functionality of Classification Pipeline 300 can be divided into three levels (Object System Metadata Processing 301, Content-based Metadata Processing 303, and Entity Processing 305).

Object System Metadata Processing 301 may comprise layers 302, 304, and 306 for extracting system-level metadata which pertains to the keeper of the object (e.g., the system on which the object resides, the surrounding systems, the type of filesystem on which the object resides, the security settings pertaining to the object, other filesystem information such as user directories, etc.). Current filesystems generally provide ample amounts of system metadata. Object System Metadata Extraction 302 may operate to extract raw system metadata pertaining to the location and type of filesystem on which an object resides. This can be done by using the volume parameter passed in on the <Object Classification Request>. Each volume has a system type. Object System Metadata Extraction 302 may operate to map available attributes based on the system type. The type of volume is extensible (i.e., new system types can be readily added). Object-System Metadata Extraction 302 may operate to collaborate, from within the pipeline and based on detailed information extracted thus far, with other software facilities within a network (e.g., an enterprise policy engine in an enterprise network) to aggregate, enrich, and/or augment the extracted metadata (e.g., the enterprise policy engine may recursively feed analyzed attributes back into Object System Metadata Extraction 302).

Security Extraction 304 may operate to extract an object's security settings such as access permissions. Like system metadata, the security settings are a type of metadata that exist on objects which can be extracted, tagged, and classified via Classification Pipeline 300. The extracted security information can be useful for forensic and/or reporting purposes. For example, one might desire to know, while an object is being tagged, how many times the object had been accessed, when and perhaps by whom. In this way, access behavior may be analyzed based on the extracted security information and the historic value(s) associated therewith.

User Directory Extraction 306 may operate to extract system metadata pertaining to user directories associated with the object. User Directory Extraction 306 can enrich the extracted system metadata with directory information (e.g., the active directory where an object currently resides on a user computer).

Additional system-level processing is possible to extract from the keeper of an object other types of metadata germane to the structure (e.g., file type) of the object (e.g., "Sender" may be germane to "Email", "Author" may be germane to "Document", etc.). The keeper of the object refers to the system(s) on which the object resides. As an example, a client can simply plug in, insert or otherwise add new metadata extraction algorithm(s) or processing layer(s) to Classification Pipeline 300.

Content-based Metadata Processing 303 may comprise layers 308, 310, 312, 314, 316 and 318 for obtaining metadata on an object based upon the content of the object (e.g., free form text of an email or document, etc.). For example, Duplicate Hash Computation 308 may operate to perform a binary hash to detect possible duplicate objects which can then be removed (also called "deduplication"). In one embodiment, another layer (not shown) can be added to perform a text-based hash on the content of the object to see if it has changed semantically. This can be done before extractions 314, 316, 318.

Content Typing 310 may operate to determine the type of object by its content and not by its extension. As an example, a file named "work.doc" may be an .mp3 file in disguise. Determining the type of a document based on what's in it can help to ensure the accuracy of its classification.

Text Conversion 312 may operate to process and prepare the text of the object for content-based extraction operations (e.g., Keyword Extraction 314, Raw Entity Extraction 316, Text Pattern Extraction 318, etc.). Other content-based metadata extraction operations are also possible. In one embodiment, another layer or module (not shown) can be added to remove any ambiguity (also called "the disambiguity" layer") in the content of the object. As one skilled in the art can appreciate, removing ambiguity (e.g., run-on sentences, improper punctuation, extra spaces, tables, dashes or hyphens in words and sentences, etc.) from the content can improve performance. The aforementioned text-based hashing can be performed on the converted text as well.

The converted text next is broken down into speech units (e.g., names, cities, nouns, verbs, etc.) and goes through a battery of extraction processes (e.g., Keyword Extraction 314, Raw Entity Extraction 316, Text Pattern Extraction 318, etc.). These layers of extraction operate to look for keywords, semantic entities, word units, expressions, text patterns, etc. And extract them from the text based on some predetermined parameters (e.g., a client desiring to locate documents discussing patient privacy might specify a list of relevant keywords such as "patient" and "privacy" based on which Keyword Extraction 314 is operable to go through the text and tag documents that contain those keywords). In some embodiments, third party text processing software development kits such as ThingFinder® by Inxight Software, Inc. of Sunnyvale, Calif. can be used to supplement this functionality. Inxight ThingFinder® can automatically identify, tags, and indexes about 35 types of named entities in a document, such as persons, organizations, dates, places, and addresses.

Entity Processing 305 may comprise layers 320, 322, and 324 for processing the object and/or metadata previously obtained from the object. In particular, the object and metadata previously obtained may be combined or analyzed to produce further metadata on the object. In embodiments of the invention, Filtering/Scoping 320 may operate to tag metadata according to predetermined scope(s)/filtering rule(s), which are user-definable. This can be useful in classifying objects in compliance with privacy policies and/or rules. With this functionality, objects may be included (scoping) and/or excluded (filtering) from one or more classes.

Proximity Analysis 322 may operate to tag or select an entity (metadata) based on its proximity or affinity to another entity or entities. For example, to distinguish from all dates a user may specify for Proximity Analysis 322 to find dates in proximity to a particular word or entity. As another example, to find names of people who work in hospitals, a user might first create an entity called "Hospital Names" and distinguish from all names only those that are in proximity to Hospital Names using Proximity Analysis 322. These are examples of proximity-based entities.

At this point, everything about an object is tagged and there could be a plurality of entities (extracted as well as created by the layers in the classification pipeline) of various types. User Level Entity Assertion 324 may operate to normalize these entities and interface with Object Classification Rules Engine 326 for submitting objects and their associated data. In this respect, User Level Entity Assertion 324 can be seen as interfacing between the tagging functionality and the classification functionality of Classification Pipeline 300. That is, an object may move up or through Classification Pipeline 300 as metadata concerning the object continues to be collected, enriched, and augmented. Once it reaches the last node, in this case, Proximity Analysis 322, the tagging aspect of the pipeline is done and User Level Entity Assertion 324 can assert all the data in its aggregate into Object Classification Rules Engine 326.

In one embodiment, Object Classification Rules Engine 326 is operable to classify objects according to a set of rules which define classes for objects based upon various data, metadata or various combinations associated therewith. Each object is classified based on its associated data according to these rules. These classification rules are user-definable and can be expressed in the form of conditions. In one embodiment, a condition has an attribute in terms of a value or value plus instances. In this way, if an object has an entity associated therewith that satisfies a condition, Object Classification Rules Engine 326 may classify that object to be a member of a class having that condition. Once the class membership is asserted, its class can be expressed in terms of another class (i.e., the class becomes the object's another attribute). This complex class membership can be interpreted subsequently during class processing.

Figure 3A:
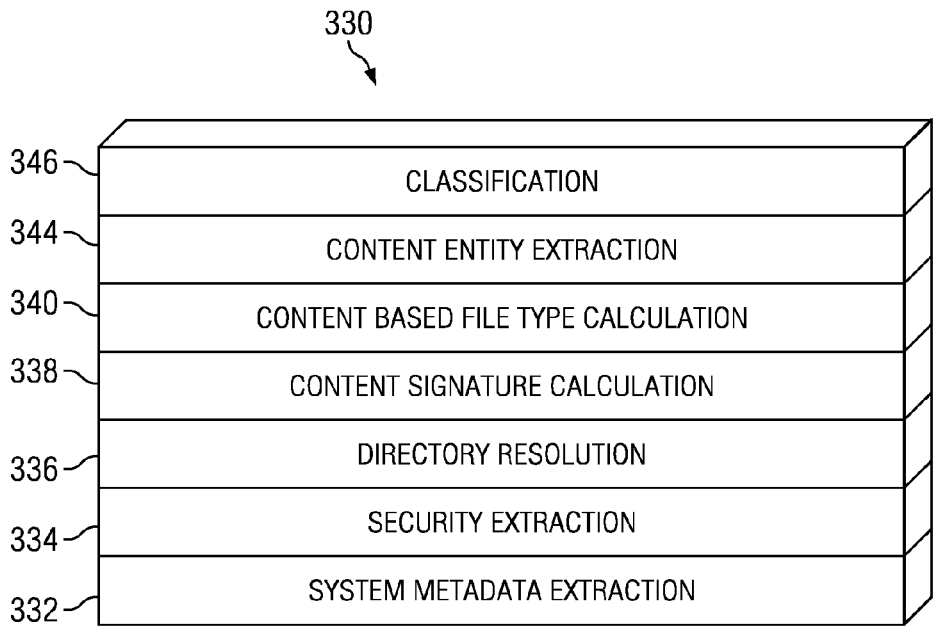
FIG. 3A depicts another exemplary embodiment of a classification pipeline.

It will be apparent to those of skill in the art that the stages or layers 302-326 depicted with respect to Classification Pipeline 300 are exemplary only, and that Classification Pipeline 300 may include more or fewer stages depending on the functionality of Classification Pipeline 300 desired. As an example, FIG. 3A depicts one embodiment of Classification Pipeline 330 comprising layers 332, 334, 336, 338, 340, 344, and 346 for operating on metadata spaces listed in Table 1 below. In one embodiment, layers 332, 334, 336, 338, 340, 344, and 346 are implemented as a set of tagging and extraction services available through a Web interface or an API interface.

TABLE 1

| Metadata Spaces | Description |
| --- | --- |
| Object System | Includes all core metadata acquired from the underlying system where an object resides and includes attributes such as size, creation date, and modified date. |
| Security | Contains all security information from an object. |
| User Directory | User and group mappings from the current directory of an object. |
| Content Signature | Contains a SHA-160 bit hash of the object being processed. |
| Content-based Typing | Contains a series of attributes representing the type of object derived from an analysis of the object's content. |
| Content Entities | Includes all entities that are located via text and natural language processing of the object's content. The scope of the entities to be extracted is based on the entities located within the active file classification(s) for the volume specified on the pipeline object classification request. Examples of entities can be found in the attached Appendix B, entitled "Understanding standard entities." |
| Object Classification | Indicates that the pipeline client wants specified objects to be classified against the file classification rules defined for the provided volume. |

In one embodiment, clients (e.g., application 100) of the classification pipeline (e.g., Classification Pipeline 110) can subscribe to specific metadata spaces listed above by defining a pipeline profile. If no pipeline profile is provided (e.g., request 102 contains no pipeline profile), the classification pipe may be configured to provide all sets of metadata.

In embodiments of the invention, any of the above-described layers and options of the classification pipeline can be turned on and off by metadata subscription. As an example, a client may choose to subscribe to a particular profile of the pipeline and configure it accordingly. As another example, a client may choose to tag an object but not classify it.

In some cases, a client may desire to have some dimensions of classification that is germane to a particular application domain, but not necessarily part of the classification pipeline. For example, a class may require its members to contain the name "Steve", be bigger than one megabyte in file size, be created over one year ago, mention a software product called "Classification Pipeline," and references the city of Austin. In one embodiment, a user can pass the classification requirements in from the application domain to the classification engine (e.g., Object Classification Rules Engine 326) and the classification pipeline (e.g., Classification Pipeline 300) can synthesize the user-defined classification requirements with all the tag attributes (e.g., name; size, date, text pattern, keyword, etc.) and feed them into the classification engine to assert classification accordingly. In this way, classification can be done based on dynamically inserted requirements from external applications.

Figure 4:
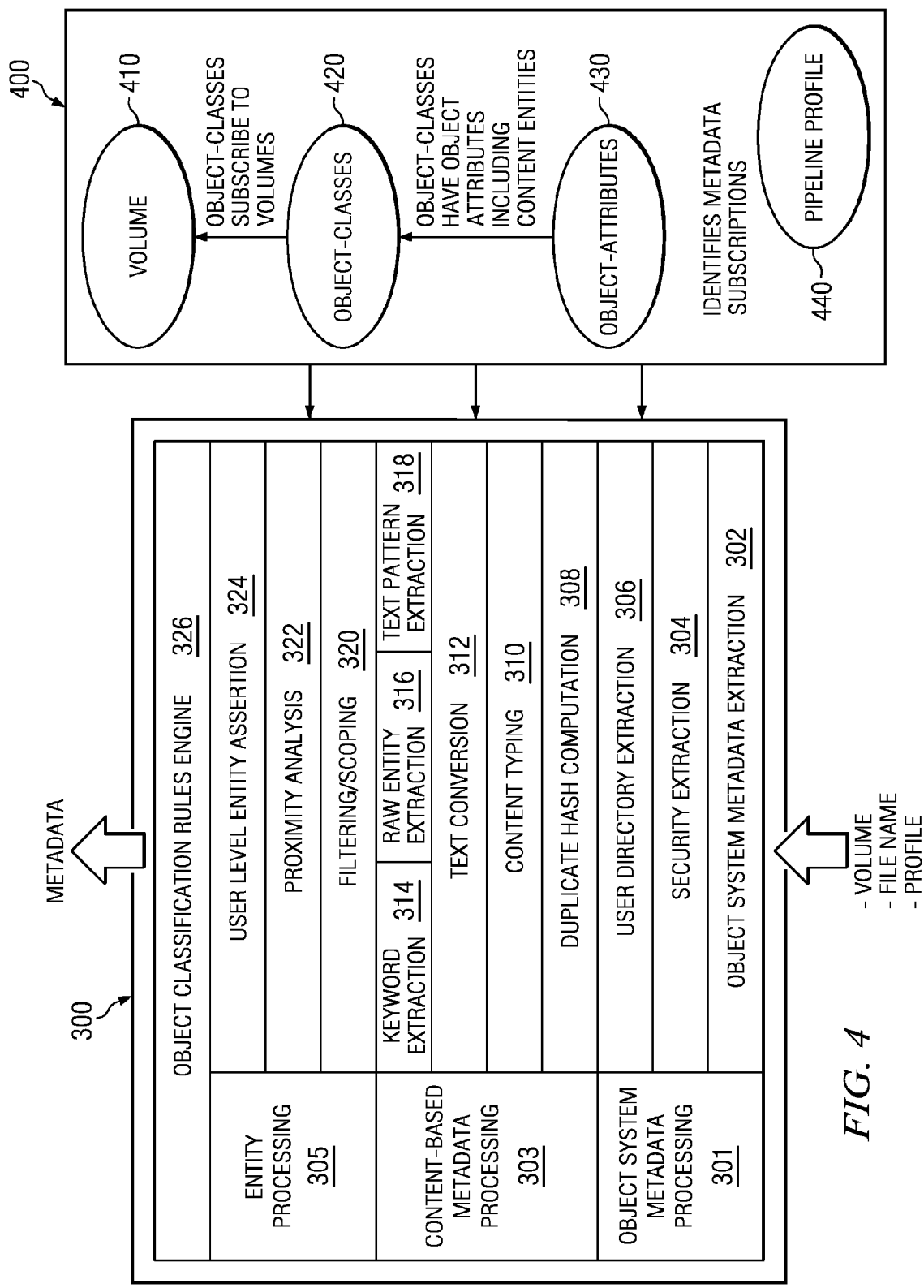
FIG. 4 depicts an exemplary configuration of a classification pipeline according to one embodiment of the invention.

FIG. 4 depicts an exemplary configuration of one embodiment of the classification pipeline, illustrating by example how embodiments of the classification pipeline disclosed herein may be utilized in conjunction with external applications or data.

Pipeline configuration can be controlled via an application web interface, or through an API exposed as a series of XML request and replies over TCP. The example shown in FIG. 4 exemplifies pipeline configuration via the API and adopts the following terminology:

Object-Class—consists of one or more conditions, all of which can be combined by an "AND" and "OR" Boolean operations or instance requirement counts.

Condition—consists of a single Object-Attribute and value/occurrence based expression whose scope is constrained by the Object-Attribute properties. For the purpose of inclusion within an Object-Class, a condition on an Object-Attribute has the following dimensions.

Object-Attribute—consists of file system metadata, content based data, and user-defined (i.e., custom) attributes. Each Object-Attribute can have the following properties:
    Base Type (e.g., String, Integer, Date, Occurrence)
    Sparse or Dense Indicator
    Single or Multiple Instance
    Data Values or Partial Data values (is, contains, begins with, ends with, regular expression values)

Object-Attribute Tagging/Extraction Implementations—can be Core or Custom:
    Core Object-Attributes—default object-attributes provided by the classification pipeline.
    Custom Object-Attributes—object-attributes created by applications (including the classification pipeline) users, available for viewing and updating. Custom Object-Attributes can have the following types:
    Keyword—Custom Object-Attributes
    Regular Expression-based—Custom Object-Attributes There are four types of pipeline configuration objects that control the behavior of the classification pipeline: Volumes, Pipeline-Profile, Object-Attributes, and Object-Classes. In the example shown in FIG. 4, pipeline configuration objects 400 (Volume 410, Object-Classes 420, Object-Attributes 430, and Pipeline Profile 440) control the behavior of Classification Pipeline 300.

Volume—A volume is an aggregation of data needed to address a repository of objects somewhere on the network. A volume can include the name of the server, the name of the share, the protocol to be used in communicating with the server, authentication credentials (if applicable to the protocol), a starting directory from which subsequent file requests are relative, and an include directory regular expression. The latter two items can allow for specification of subsections of share when it is desirable to logically break up a network share.

Pipeline-Profile—A pipeline-profile comprises a series of options that control which sets of metadata are extracted from an object as it passes through the pipeline. Following the example shown in FIG. 3A, these options may include the following:
    Enable/disable content signature calculation;
    Enable/disable system metadata extraction;
    Enable/disable content based object file-type calculation;
    Enable/disable classification engine;
    Enable/disable directory resolution;
    Enable/disable extraction of security information;

Enable/disable the extraction of content Object-Attributes; and

Maximum number of content Object-Attributes to extract per type per object.

Object-Attribute—depending upon implementation, Object-Attributes can fall into two categories: core or custom. Core Object-Attributes are provided with the classification pipeline and are immutable. The definition of custom Object-Attributes is controlled by the user. "Person" and "Address" are examples of core Object-Attributes. One embodiment of the invention supports two custom Object-Attribute types, keyword and regular expression. Users can create and modify custom Object-Attributes of these types. Since Object-Attributes are the vocabulary upon which Object-Classes are built, the ability to add custom Object-Attributes allows a user to extend this vocabulary.

Object-Attributes have the following properties:

Name—name of the Object-Attribute;

Custom—(Boolean) determines whether Object-Attribute is of type custom;

Base-type—integer, date, string, occurrence;

Dense—(Boolean) determines whether the Object-Attribute is dense or sparse (i.e., is it always present); and Multi-instance—(Boolean) determines whether multiple instances are possible.

The latter four determine what conditions can be applied to a particular Object-Attribute.

Object-Class—An Object-Class is a collection of conditions expressed across Object-Attributes. Each condition within an Object-Class enumerates value/instance-based expressions across a single Object-Attribute. An Object-Class may be associated with one or more volumes and there can be multiple Object-Classes associated with a given Volume. One example of an Object-Class is defined as a path containing a sub-string "home" AND the presence of a social security number (SSN) and is associated with all volumes. In this case, the conditions are:

Object-Attribute—path
  Condition—contains "home"
Object-Attribute—SSN
  Condition—at least one time.

Referring to FIG. 4, Classification Pipeline 300 may receive Volume 410 specifying a location on a filesystem, a filename or object name, or a profile of an object which may indicate which objects to process through Classification Pipeline 300 or which may indicate services within Classification Pipeline 300 are desired. Utilizing some of this information, Classification Pipeline 300 may extract metadata and classification information on the object and pass this metadata or classification to another application.

As described above, Classification Pipeline 300 may be utilized in conjunction with configuration data 400 to tailor classification pipeline. Pipeline Profile 440 received by Classification Pipeline 300 may indicate desired layers or services of Classification Pipeline 300 (e.g., extract security information but no hash computation) or may indicate how Classification Pipeline 300 is to be set up. Other configuration data may include various volumes of filesystems, particular servers, protocols or various access information associated with objects on which Classification Pipeline 300 is to operate. Objects classes may be defined by rules which define classes to which objects may belong. These object classes may be associated with certain volumes or filesystem types such that when files from a particular filesystem or filesystem type are processed by Classification Pipeline 300, Classification Pipeline 300 may determine if these objects are of that class.

Components of the classification pipeline disclosed herein can be controlled programmatically through an XML over TCP interface. For example, a plurality of methods can be provided to GetAll, Get, Create, Update, and Delete for each of the pipeline configuration objects 400 described above. Other implementations are also possible.

Figure 5:
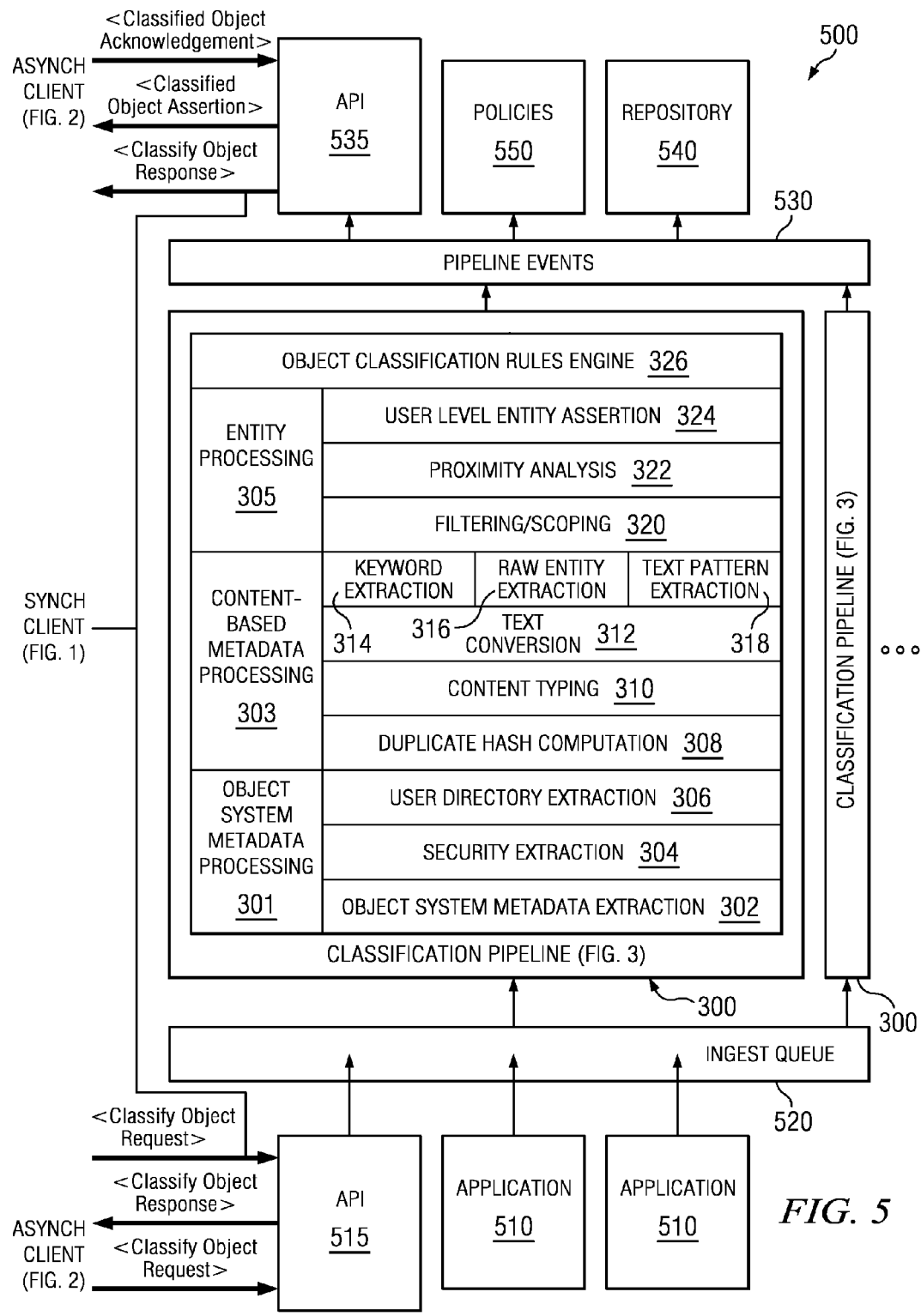
FIG. 5 depicts an exemplary system implementing one embodiment of the invention.

Embodiments of the classification pipeline disclosed herein may be utilized as part of a broader system. One embodiment of such a system 500 is depicted in FIG. 5. Classification Pipeline 300 may interface with a set of applications 510 (e.g., StoredIQ Walkers, StoredIQ Event Sinks, etc.) designed to provide objects and object data to an ingest queue 520 where objects to be processed by Classification Pipeline 300 are organized. Ingest queue 520 may be operable to implement an API 515 such that information on objects may be provided to ingest queue 520. For example, if applications 510 which may be provided in conjunction with Classification Pipeline 300 only cover a certain set of filesystems, the "external" API 515 may allow objects in a filesystem outside the set of filesystems to be classified by Classification Pipeline 300 by passing information on the object, or the object itself, to ingest queue 520. This information on an object or the object may be passed in by a third party application or any other application that wishes to utilize the capabilities of Classification Pipeline 300.

From ingest queue 520 objects are then processed by Classification Pipeline 300. The processing of these objects may lead to one or more pipeline events 530. These pipeline events may be the fact that an object has been classified a certain way, that certain metadata of an object comports with certain criteria, etc. Based on the pipeline events generated, metadata or other object data may be stored to a repository 540 and/or utilized to implement policies 550 and/or inform applications (e.g., a Web application external to Classification Pipeline 300) through API 535. Policies may be actions to be taken and may for example be based upon the classification of an object. These policies may be either predefined or user defined, such that system 500 may take user-defined actions based upon a pipeline event. These pipeline events or other results of processing by Classification Pipeline 300 may also be reported using API 535 as discussed above, such that client applications may receive requested information on objects that have been processed by Classification Pipeline 300.

Figure 6:
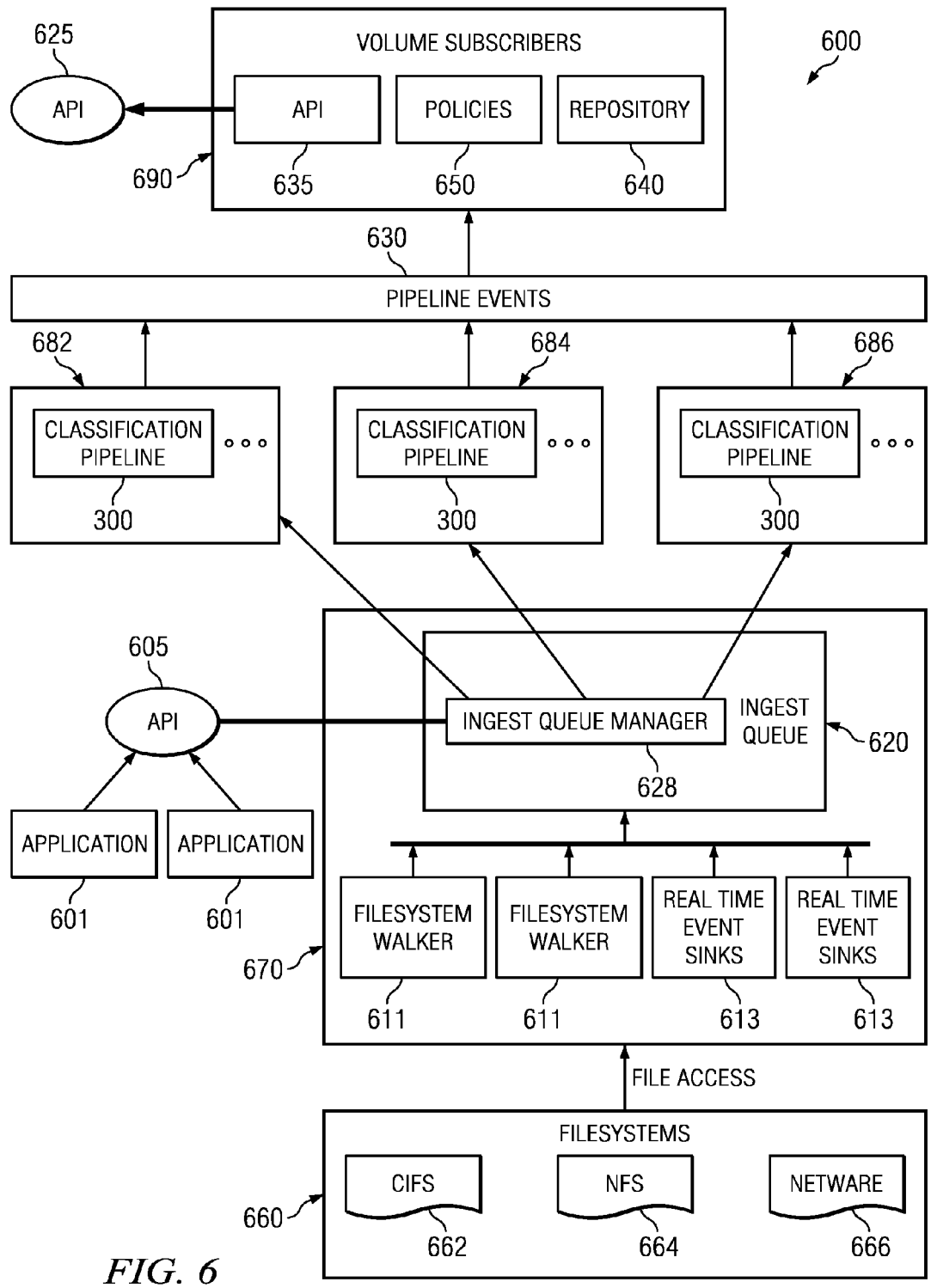
FIG. 6 depicts one embodiment of an exemplary architecture for the implementation of a system for processing objects through classification pipelines.

FIG. 6 depicts one embodiment of an exemplary architecture for the implementation of a system 600 for processing objects using a cluster of classification pipelines disclosed herein. Filesystems (e.g., CIFS 662, NFS 664, Netware 666 in a network Filesystem environment 660) may be accessed by various applications (e.g., Filesystem Walkers 611, Real Time Event Sinks 613) to obtain objects as well as information on objects in these filesystems and events pertaining to these systems. These applications may place these events and information into a pipeline queue (e.g., Ingest Queue 620) which is managed by a queue manager (e.g., Ingest Queue Manager 628). Additionally, an external interface (e.g., API 605) may allow external applications (e.g., Applications 601) to provide information on objects in external filesystems to the pipeline queue.

From this queue (e.g., Ingest Queue 620), the queue manager (e.g., Ingest Queue Manager 628) may distribute objects to computer nodes (e.g., nodes 682, 684, 686), each which is operable to implement one or more instances of a classification pipeline (e.g., Classification Pipeline 300), or a subset thereof. Thus, each of the objects in the queue may be processed by an instance of a classification pipeline implemented on a node. The processing of these objects by the instances of the classification pipeline on the various nodes results in the generation of various pipeline events (e.g., Pipeline Events 630). The pipeline events may result in the various actions taken by volume subscribers (e.g., Volume Subscribers 690) based upon the volume with which the object that caused a pipeline event to be generated is associated. Thus, if a pipeline event was generated based upon an object in a certain volume, the pipeline event, object metadata or other information associated with the object may be stored in a repository or storage location (e.g., Repository 640). Additionally, the pipeline event, object metadata or other information associated with the object may implement some predefined policies (e.g., Policies 640) and/or be reported to external applications through an external interface (e.g., API 625), as described above.

It will be apparent from the above descriptions that many other architectural arrangements may be implemented and utilized in conjunction with embodiments of the classification pipeline disclosed herein.

Once the data of files or other objects in the filesystem (collectively referred to as objects) or metadata pertaining to these objects has been extracted, parsed and/or analyzed as described above, it may be desirable to classify these objects according to their data or metadata. This classification may be desirable such that the collection of objects on filesystems may be better analyzed, action may be taken based on the classification of certain objects, or for a wide variety of other purposes.

Having described systems, methods and apparatuses for classifying objects via the tagging and extraction services through a classification pipeline, attention is now directed to methods and systems for defining classes of objects. In one embodiment, defining object classes entails defining and manipulating expressions. In one embodiment, a two-tiered classification editor operates to enable a user to define and manipulate expression in real time (i.e., on-the-fly) through a browser-based user interface.

The first tier of the browser-based classification editor may comprise a first functionality, sometimes referred to as a group editor, which enables a user to define objects in various groups, if so desired. One example of a group editor will be described below with reference to FIGS. 7-28.

In one embodiment, each group may comprise a set of conditions and, if the group comprises more than one condition, a relationship between these conditions. Each of the conditions, in turn, may be based on a possible attribute of an object. For example, an attribute may be the size of an object. A condition may be that the size of the object is over 1000 KB. Another example, of an attribute may be the path of an object. Thus, a condition may be that the path of an object is "/usr/lib". Thus, objects which have a certain set of attributes or criteria may be encompassed by the group.

An example group may therefore comprise the conditions that the size of the object is over 1000 KB and that the path of an object is "/usr/lib". Additionally, the example group may comprise a relationship pertaining to the conditions. For example, a relationship may be "all of the following" indicating that all of the conditions must be met for the group to encompass the object. Another relationship may be "any of the following" indicating that if any of the conditions are met by an object the group may encompass the object. An almost endless variety of these types of relationships may be imagined which take into account the various permutations of the conditions of the group, such as "at least" a number of the conditions must be met etc.

The second tier may comprise a second functionality, sometimes referred to as an expression editor, which enables a user to drill down and define or otherwise manipulate an expression. Within this disclosure, an expression comprises a set of groups and one or more relationships (e.g., Boolean operators) between the groups. At the second tier, a user can drag and drop to create and modify these expressions on-the-fly. The underlying functionality of the classification editor can receive and react to the user input in real time. By modifying the expression, the effect of the evaluation of the expression is changed almost instantly. Moreover, different objects may be encompassed by this evaluation. One example of an expression editor will be described below with reference to FIGS. 29-40.

In one embodiment, as groups are defined on the first tier, when more than one group is defined a default expression is constructed wherein the default expression comprises one or more logical or other relationships between the currently defined set of groups. In a particular embodiment, when a user desires to modify this expression a second tier is used to modify the expression. The second tier allows a user to drag and drop various items to create and modify these expressions, for example the order of evaluation. Additionally, the second tier may use menus of other types to allow logical relationship to be defined or altered, or additional items such as parentheses to be added to the expression. By modifying the expression, the effect of the evaluation of the expression is changed and different objects may be encompassed by the evaluation of this expression.

When a user is done manipulating an expression on the second tier, the user may be returned to the first tier, which may present the expression as modified on the second tier. At any future time, then, the user may choose to return to the second tier to once again modify the expression.

Embodiments of the present invention will now be explained in more detail with reference to FIGS. 7-41 which depict one embodiment of a set of interfaces operable to implement a two-tiered browser-based classification editor.

Figure 7:
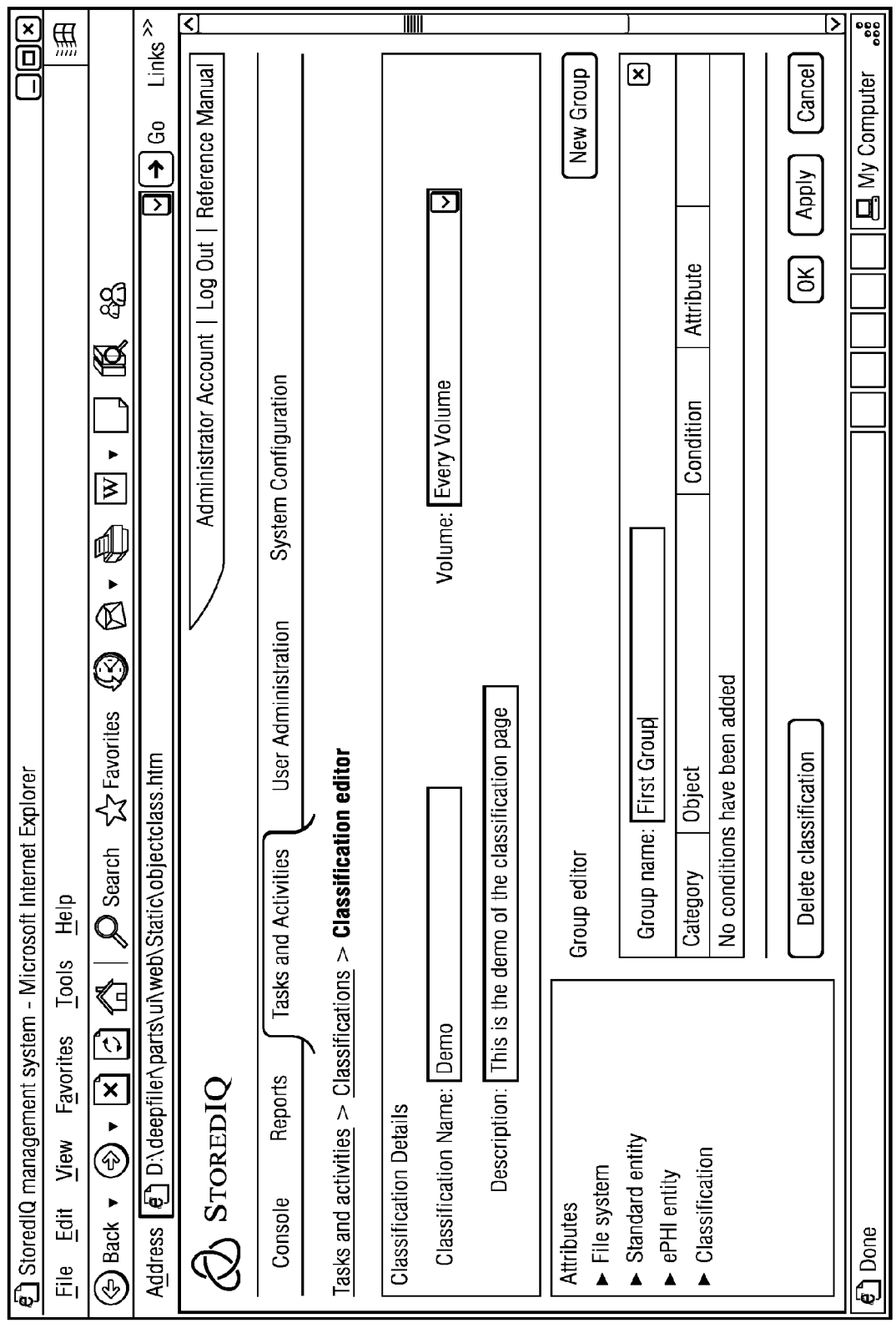

FIG. 7 depicts one embodiment of a screen for an initial state of a classification editor. In one embodiment, this may be the initial display when a new classification is created. There is a blank group and it is the active group. In this screen notice that the user has typed in, "First Group" in order to name this initial blank group.

Figure 8:
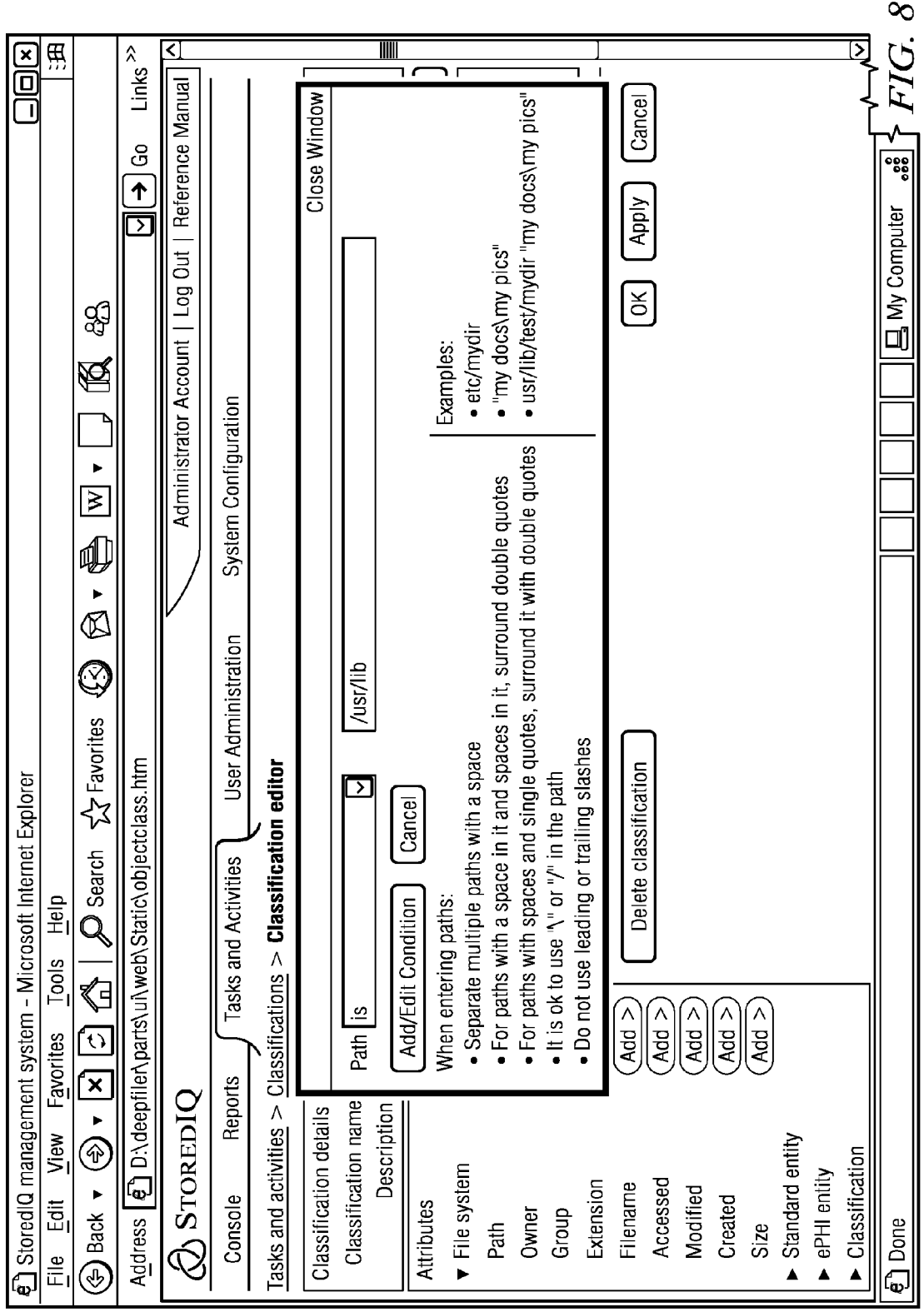

FIG. 8 depicts one embodiment of a screen for a state of a classification editor when a group is being defined. The user has clicked on "File System" on the left-hand side which opened up the list of File System Attributes which may be associated with the group being defined. The user has then clicked on the "Add" button next to "Path" which brought up the dialog that is displayed. The user has left the dropdown in the dialog set to the default value of "is" and typed in "/usr/lib" into the input field. The actions depicted with respect to FIG. 8 may mean that one attribute associated with the group "First Group" may be that the path is "/usr/lib".

Figure 9:
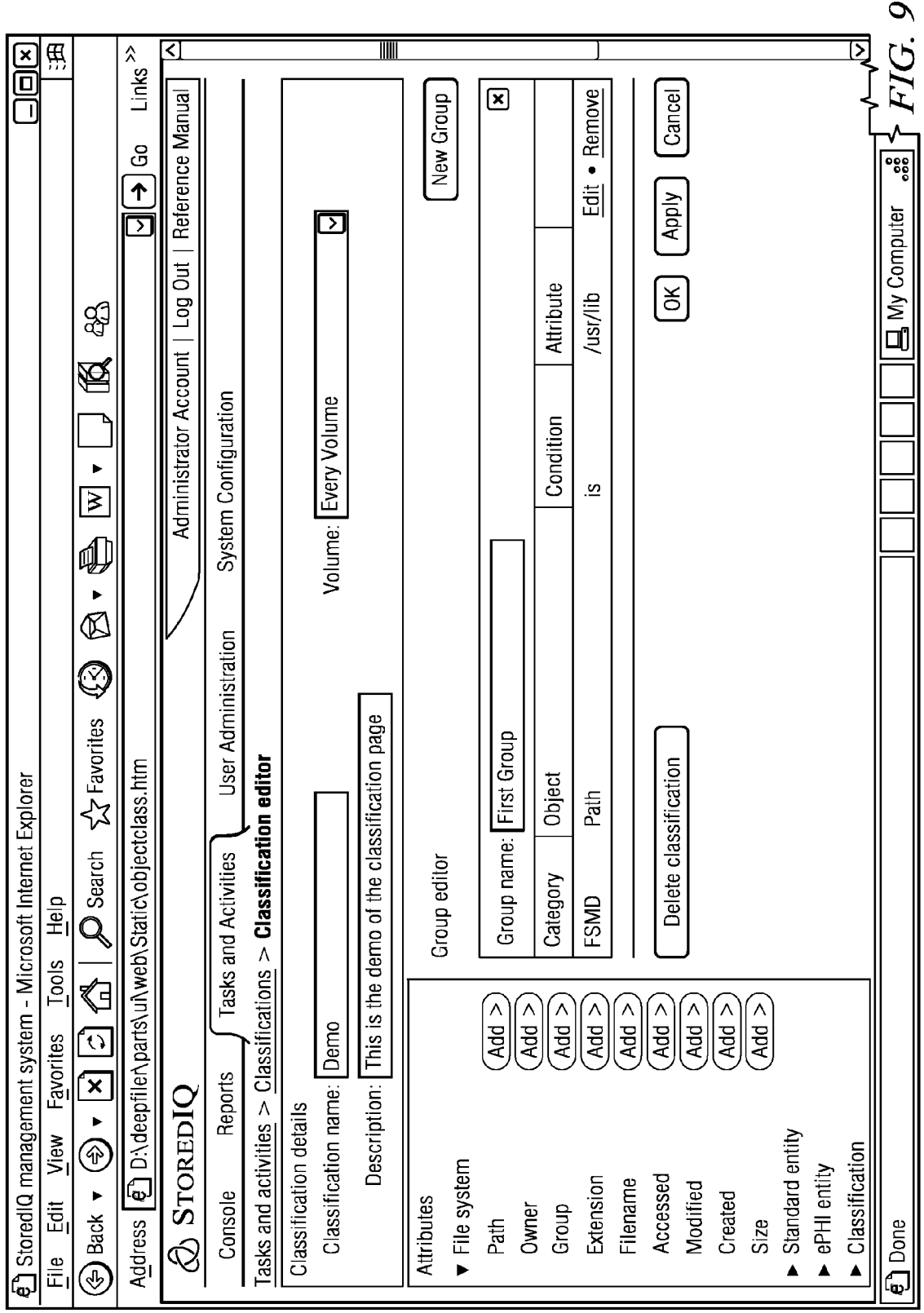

FIG. 9 depicts one embodiment of a screen for a state of a classification editor displaying attributes associated with a group. The user has clicked on the "Add/Edit Condition" button that was in the dialog in FIG. 8. A row has been added to "First Group" with the values selected from the dialog in FIG. 8. This row shows that the group "First Group" may comprise objects whose path is "/usr/lib".

Figure 10:
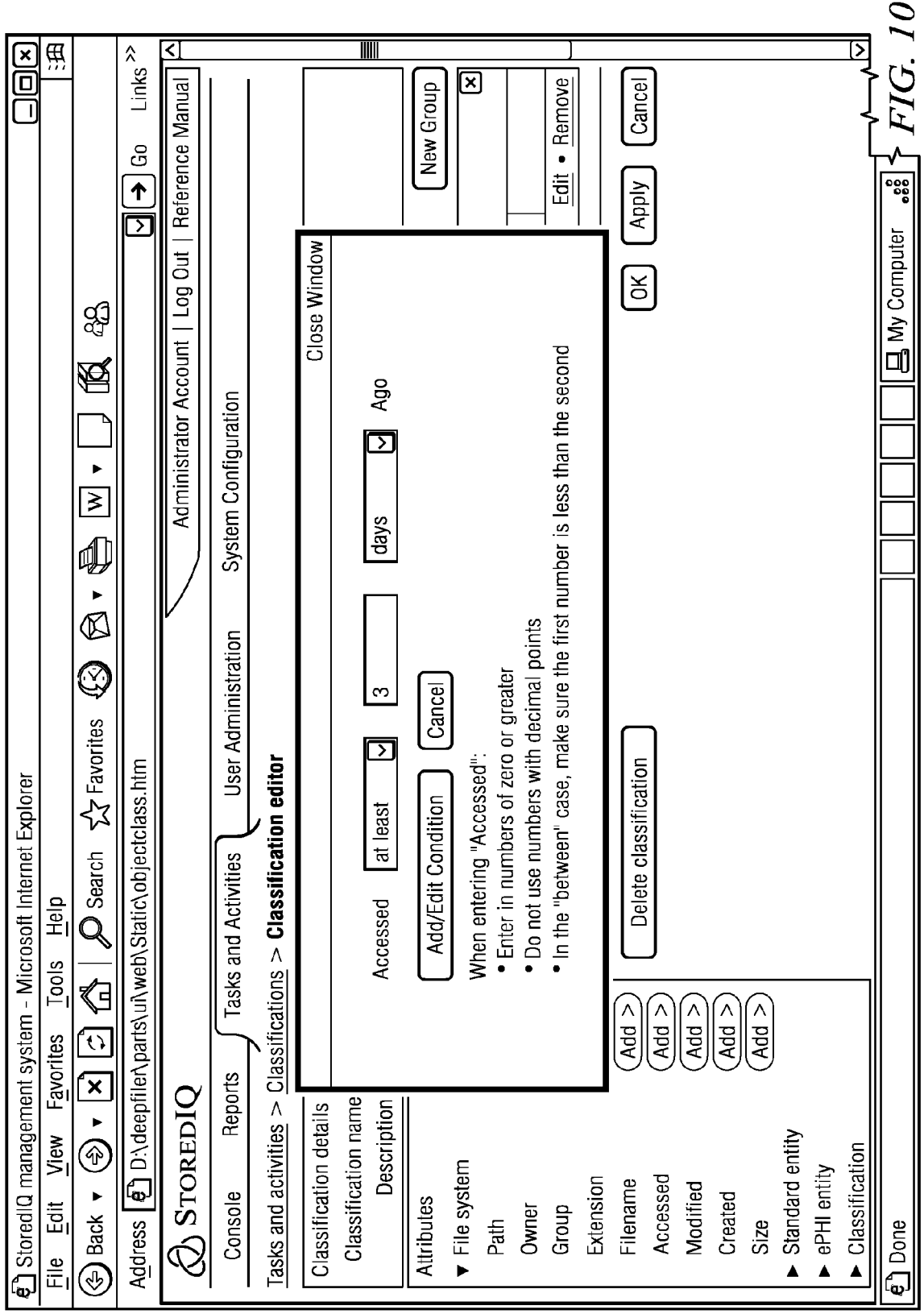

FIG. 10 depicts one embodiment of a screen for a state of a classification editor when a group is being defined. The "Add" button next to "Accessed" was clicked to bring up the dialog that is visible. The user has left the dropdown in the dialog set to the default value of "at least" and typed in "3". The user has also left the second dropdown set to the default value of "days". Thus, here the user is trying to add an attribute to the group "First Group" so that the group may comprise objects which were accessed at least three days ago.

Figure 11:
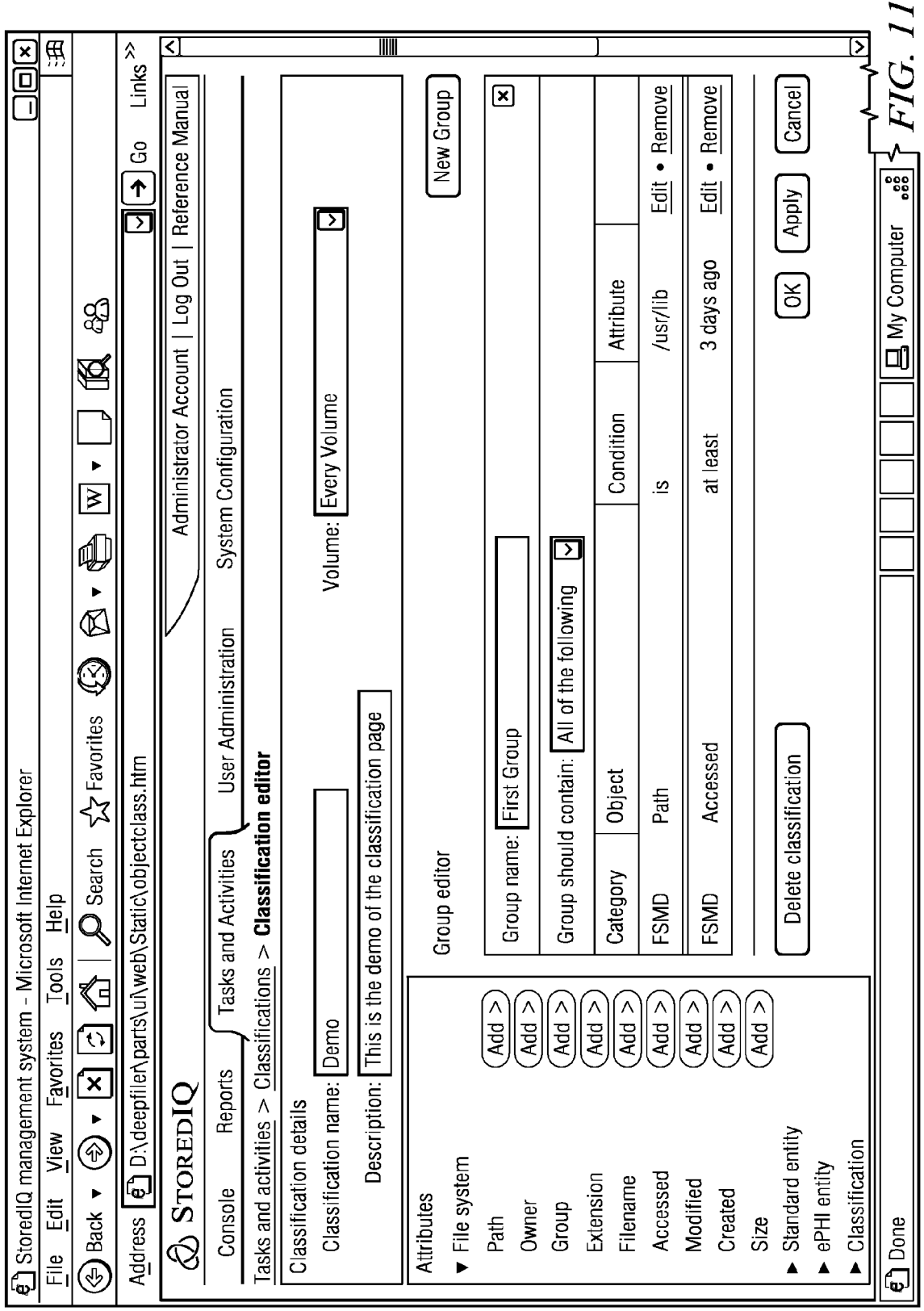

FIG. 11 depicts one embodiment of a screen for a state of a classification editor when a group is being defined. The user has clicked on the "Add/Edit Condition" button that was in the dialog in FIG. 10. A row has been added to "First Group" with the values selected from the dialog in FIG. 10. Because there are two rows in the group, an additional row is visible (second row from the top exposing a dropdown next to the phrase, "Groups should contain". The dropdown has been left to the default value of "All of the following". Thus, at this point "First Group" is defined as those objects where the path is equal to "/usr/lib" and which were accessed at least three days ago.

Figure 12:
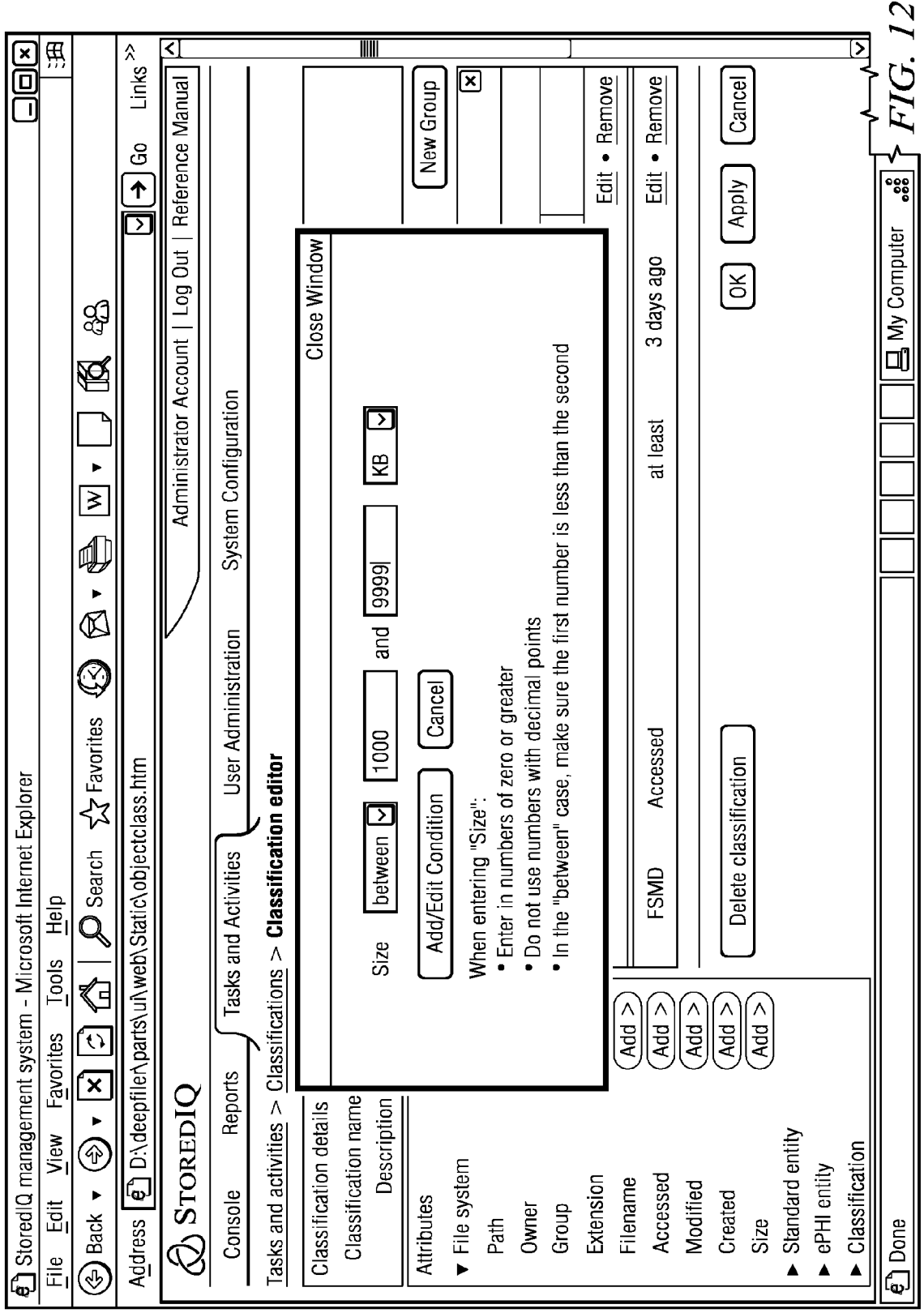

FIG. 12 depicts one embodiment of a screen for a state of a classification editor when a group is being defined. The "Add" button next to "Size" was clicked to bring up the dialog that is visible. The user has selected "between" from the first dropdown which exposed a second input field. The user then entered "1000" and "9999" into the first and second inputs respectively. Finally, the user has selected "KB" from the second dropdown menu. Thus, here the user is trying to add an attribute to the group "First Group" so that the group may comprise objects where the size is between 1000 and 9999 KB.

Figure 13:
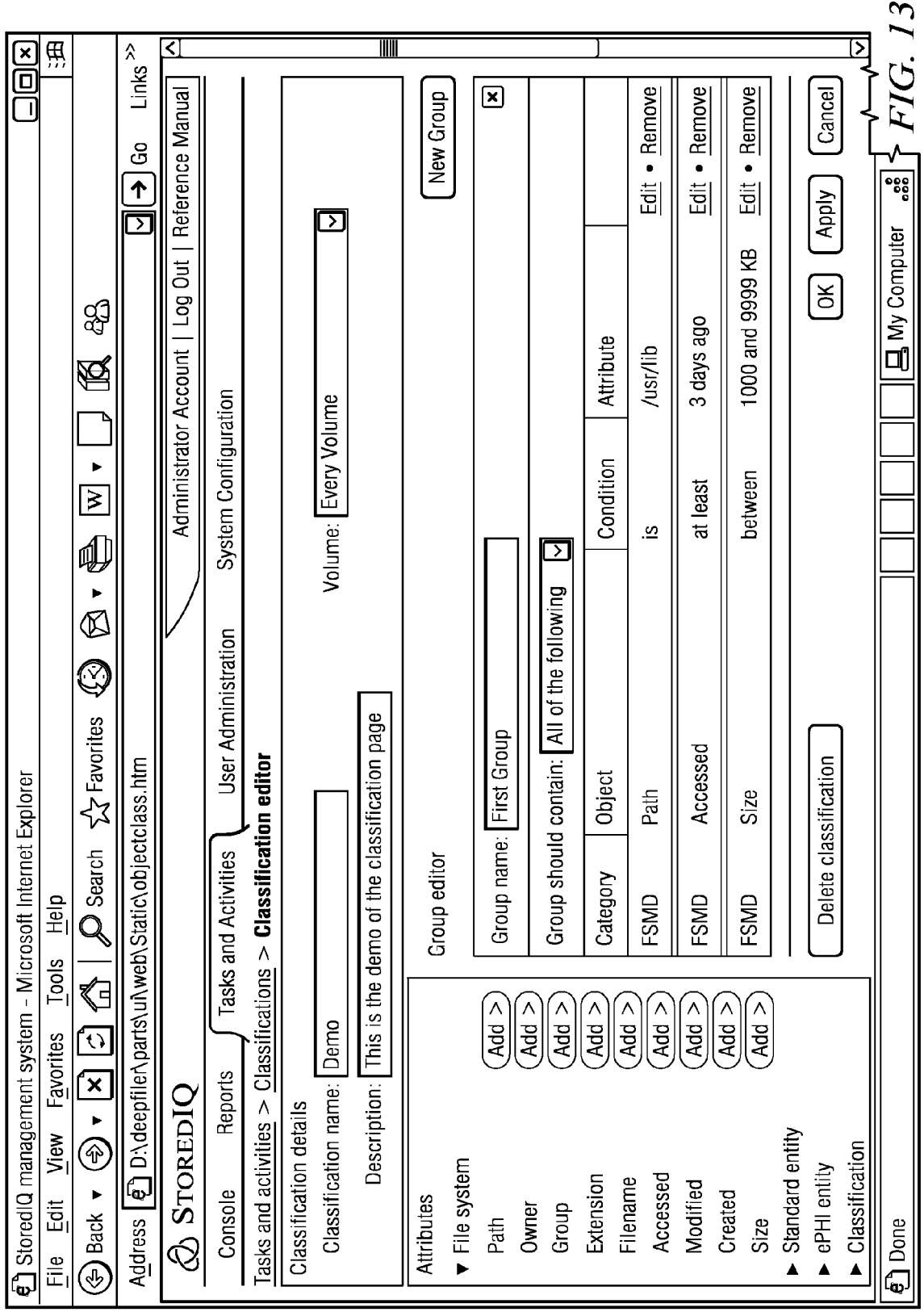

FIG. 13 depicts one embodiment of a screen for a state of a classification editor when a group is being defined. The user has clicked on the "Add/Edit Condition" button that was in the dialog in FIG. 12. A row has been added to "First Group" with the values selected from the dialog in FIG. 12. Thus, at this point "First Group" is defined as those objects where the path of the object is equal to "/usr/lib", the object accessed at least three days ago and the size of the object is between 1000 and 9999 KB.

Figure 14:
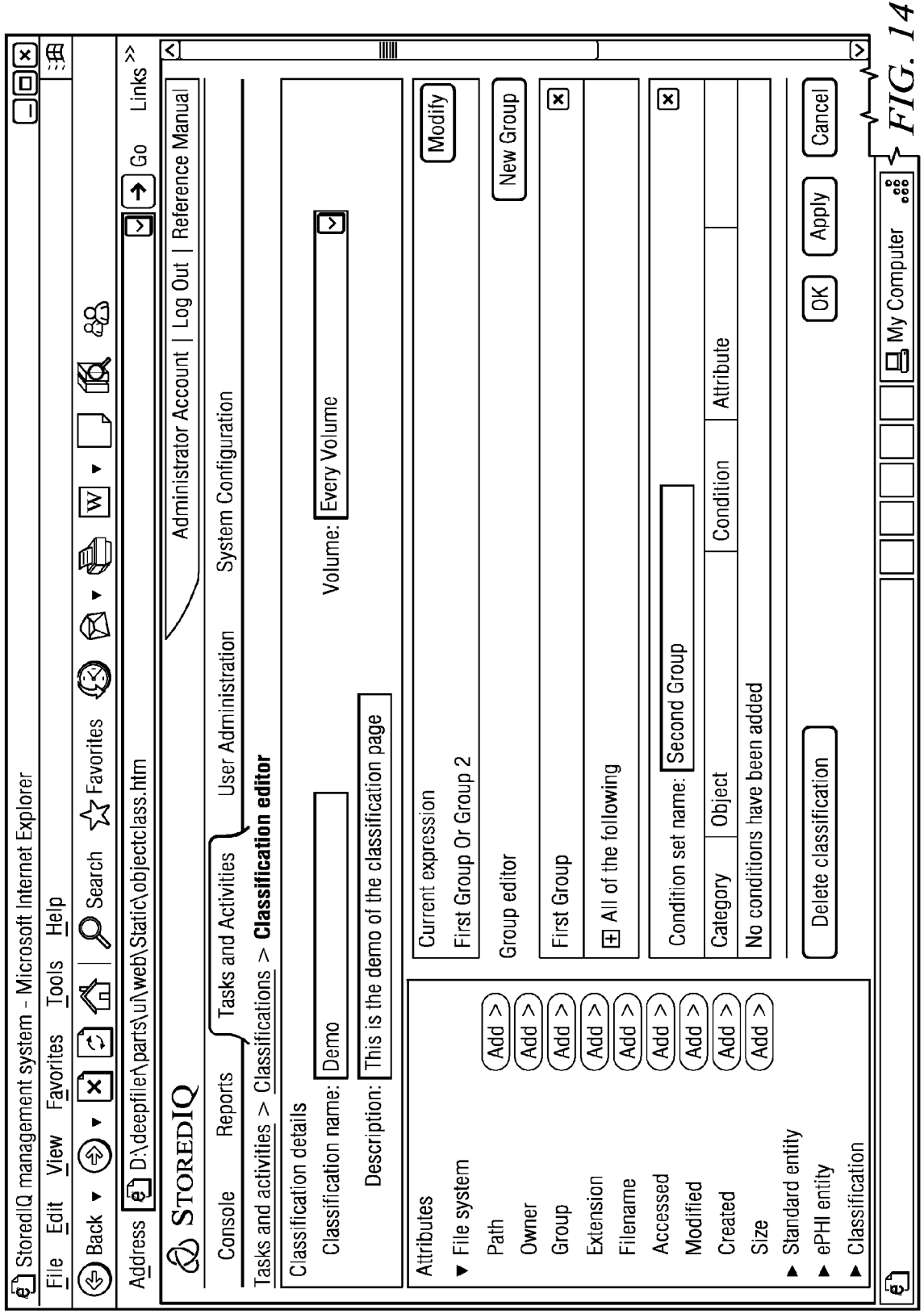

FIG. 14 depicts one embodiment of a screen for a state of a classification editor when a new group has been added. The user has clicked on the "New Group" button which has done multiple things. It added a second empty group below the first group and was set to active. In this particular embodiment this new grouped has been named "Second Group". The first group has now "collapsed" hiding the rows with each condition has been set to inactive. A section for "Current expression" was added. In this, a default express-ion "First-Group or Second Group" is displayed. This default expression reflects the names of the groups which have been defined. Notice that a default expression only appears once more than one group has been defined. Additionally, a "Modify" button has been exposed in the "Current expression", wherein clicking on this button may allow the expression to be modified.

Figure 15:
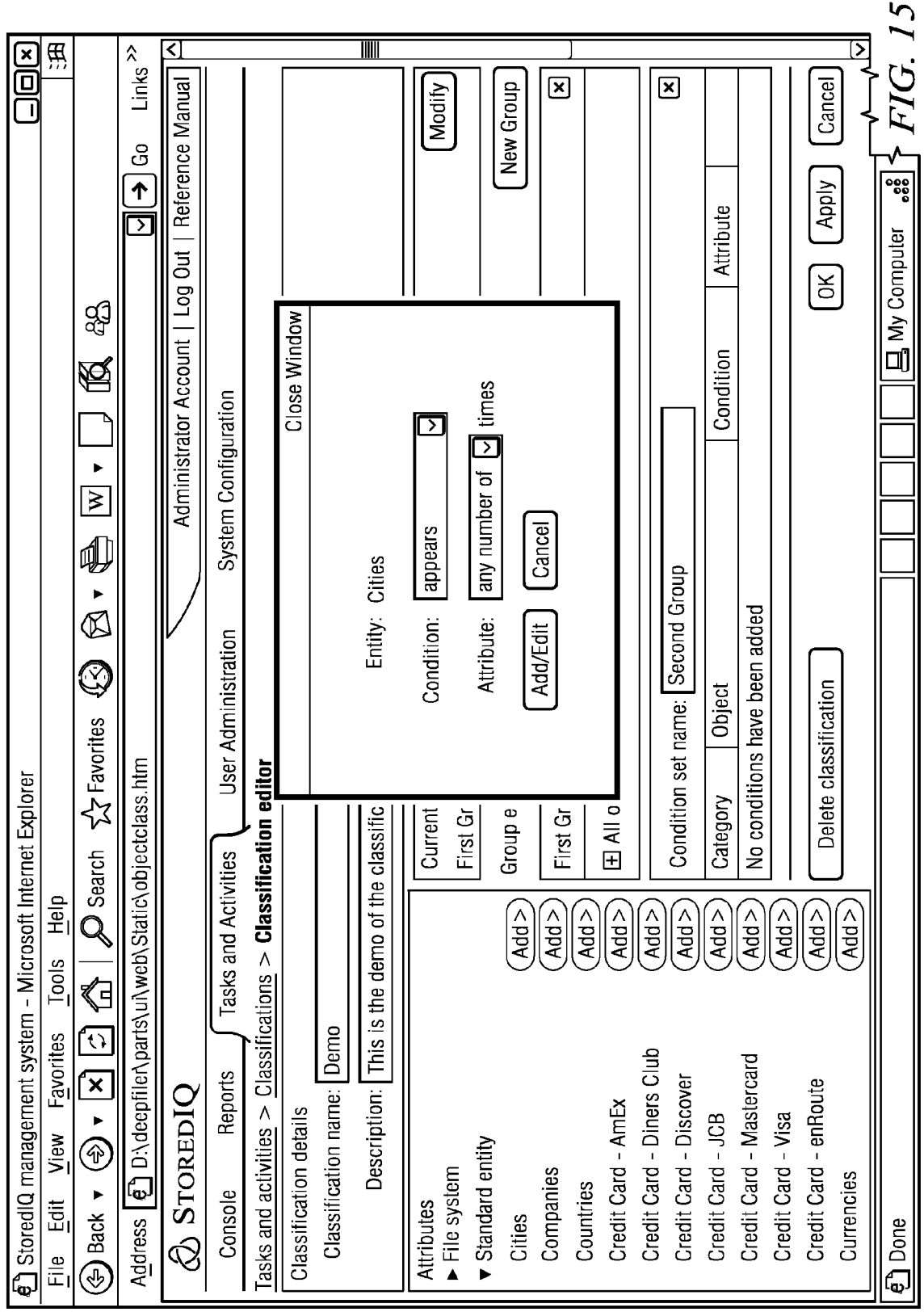

FIG. 15 depicts one embodiment of a screen for a state of a classification editor when a group is being defined. The user has clicked on "File System" which collapsed the list of File System Attributes. The user then clicked on "Standard entity" expanding the list of Standard Entity Attributes. The user clicked on the "Add" button next to "Cities". The dialog that appears may be the default view. Thus, here the user is trying to add a condition to the group "Second Group" so that the group may comprise objects where Cities appears any number of times.

Figure 16:
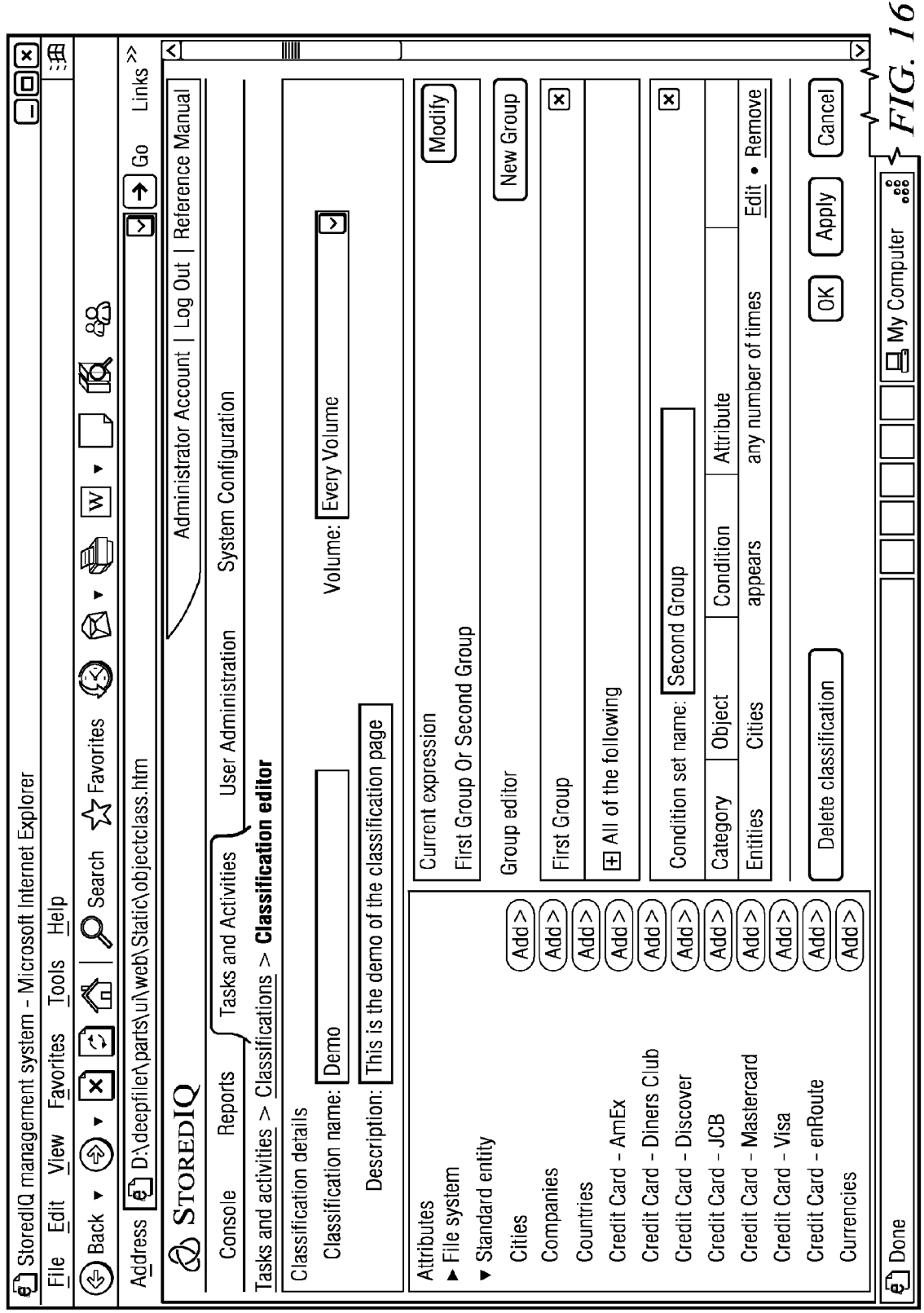

FIG. 16 depicts one embodiment of a screen for a state of a classification editor when a group is being defined. The user has clicked on the "Add/Edit" button that was in the dialog in FIG. 15. A row has been added to "Second Group" with the values selected from the dialog in FIG. 15. Thus, at this point "Second Group" is defined as those objects where Cities appears any number of times.

Figure 17:
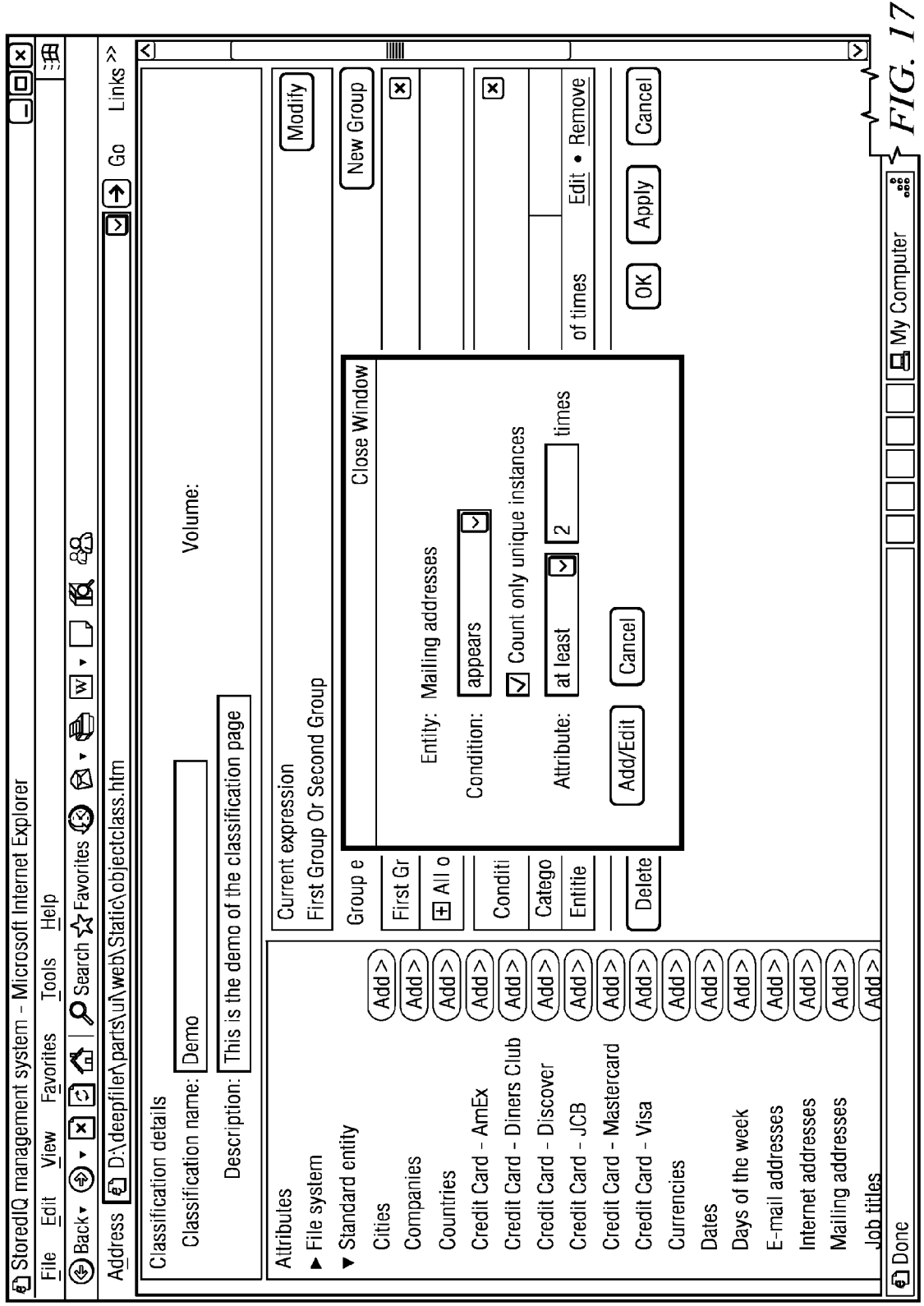

FIG. 17 depicts one embodiment of a screen for a state of a classification editor when a group is being defined. The user has clicked on the "Add" button next to "Mailing Addresses". The user then selected "at least" from the "Attribute" dropdown. By doing this a checkbox that says "Count only unique instances" was exposed as well as an input field next to the "Attribute" dropdown. The user checked the checkbox and entered "2" for the input field. Thus, here the user is trying to add a condition to the group "Second Group" so that the group may comprise objects where the mailing address appears at least two times and only unique instances of the mailing address count toward this determination.

Figure 18:
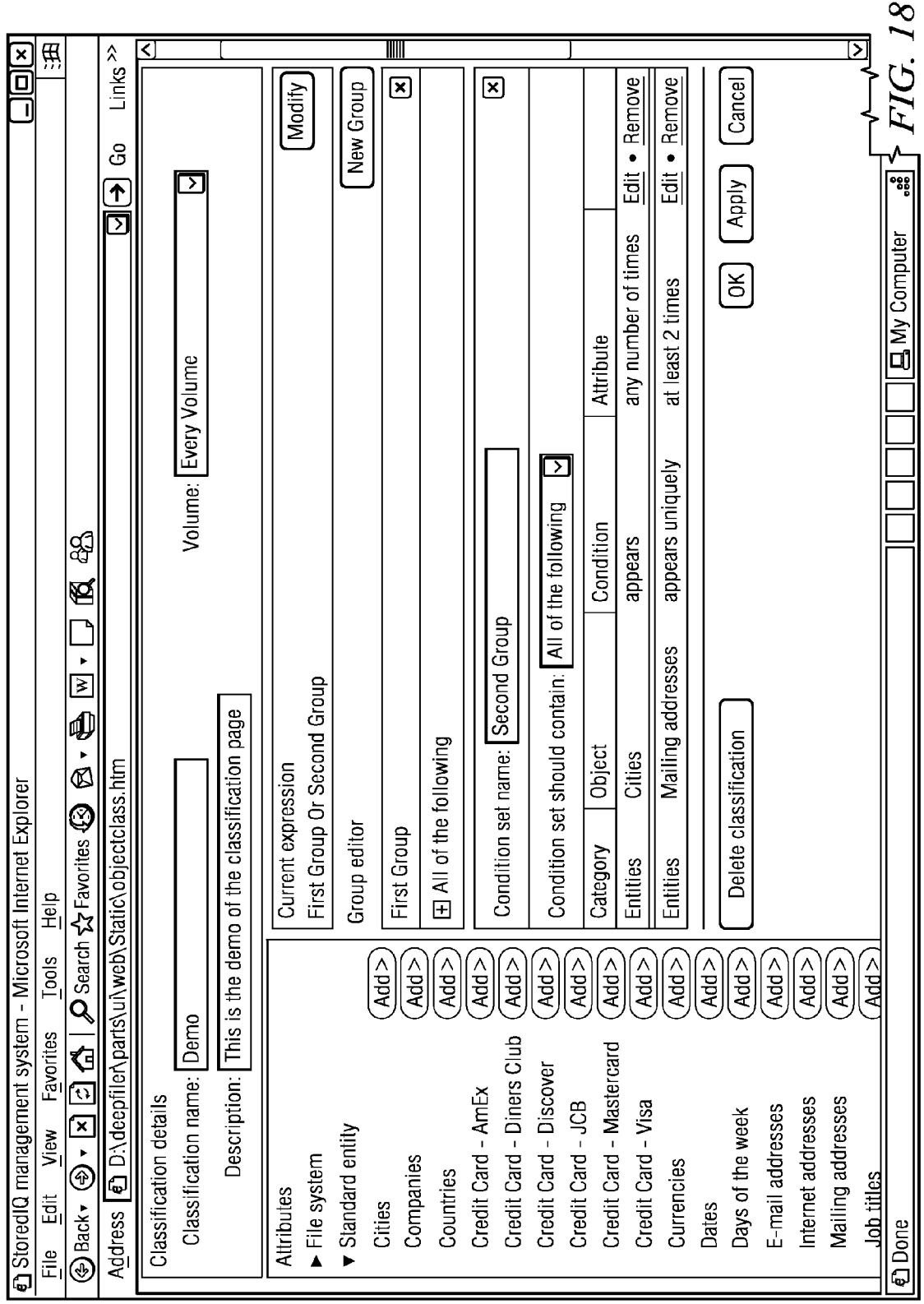

FIG. 18 depicts one embodiment of a screen for a state of a classification editor when a group is being defined. The user has clicked on the "Add/Edit" button that was in the dialog in FIG. 17. A row has been added to "Second Group" with the values selected from the dialog in FIG. 17. Because there are two rows in the group, an additional row is visible (second row from the top exposing a dropdown next to the phrase, "Groups should contain". The dropdown has been left to the default value of "All of the following". Thus, at this point "Second Group" is defined as those objects where Cities appears any number of times and the mailing address appears at least two times.

Figure 19:
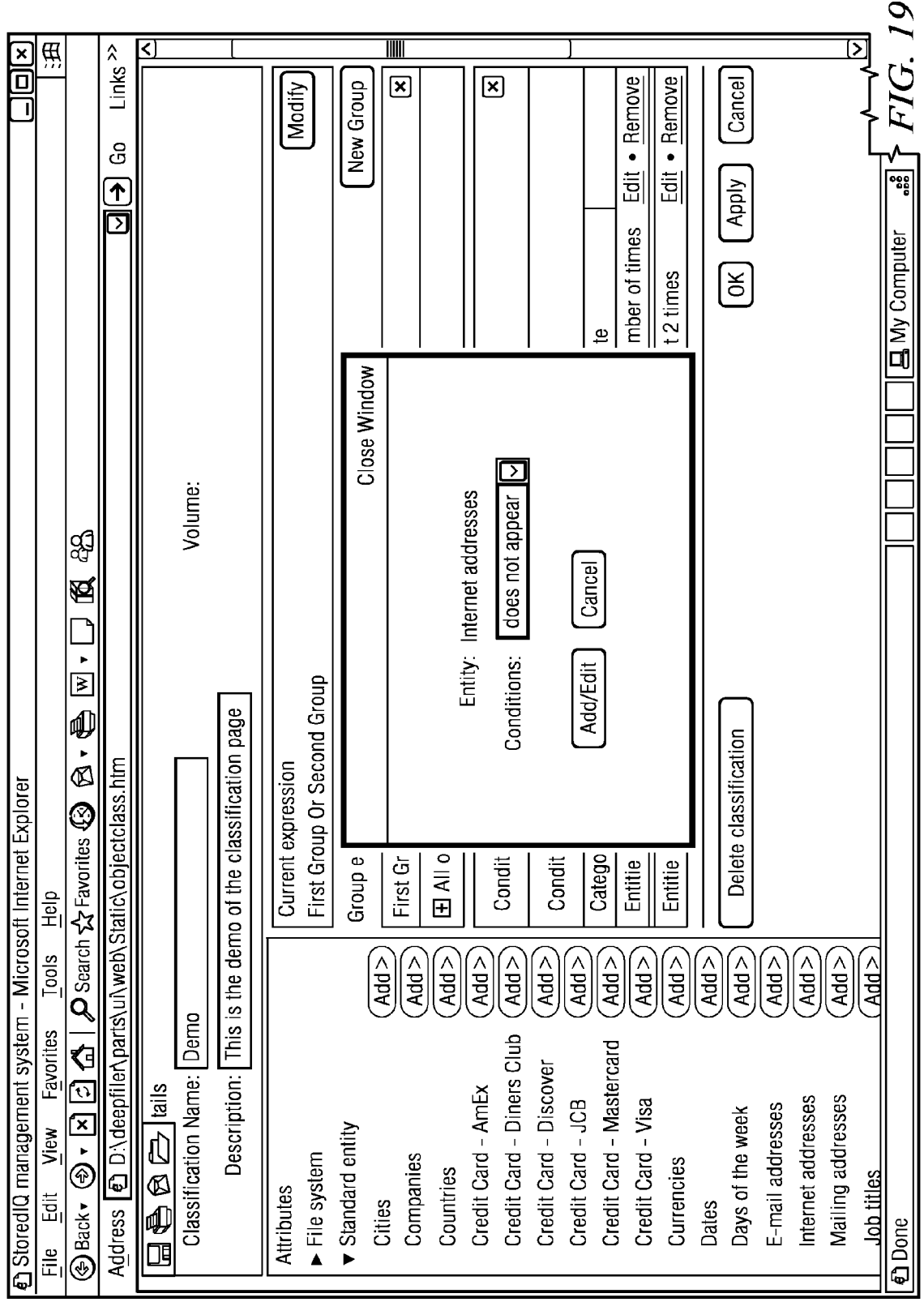

FIG. 19 depicts one embodiment of a screen for a state of a classification editor when a group is being defined. The user has clicked on the "Add" button next to "Internet addresses". The user has then selected "does not appear" from the "Condition" dropdown. This hid the "Attribute" section of the dialog. Thus, here the user is trying to add a condition to the group "Second Group" so that the group may comprise objects where internet addresses do not appear.

Figure 20:
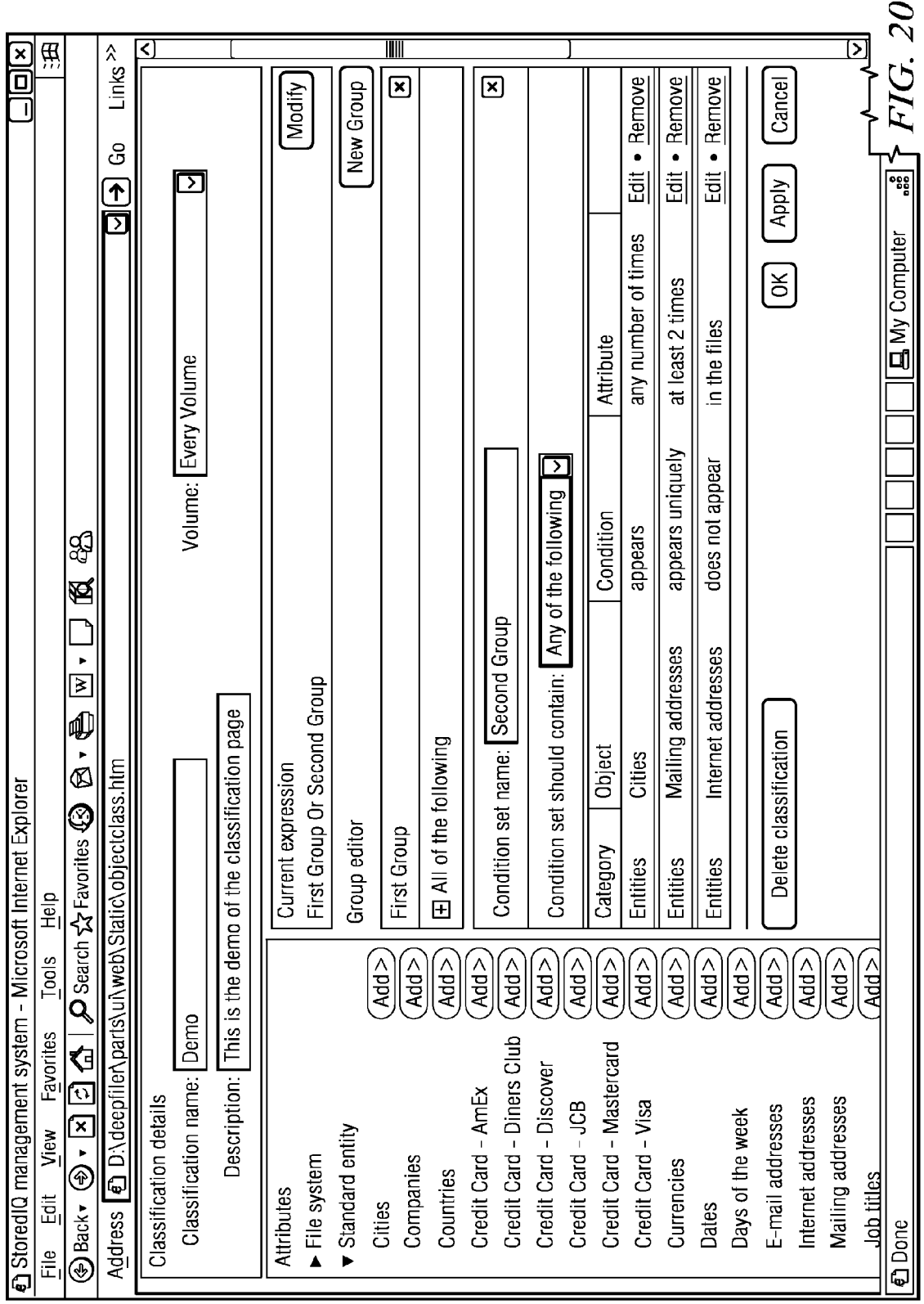

FIG. 20 depicts one embodiment of a screen for a state of a classification editor when a group is being defined. The user has clicked on the "Add/Edit" button that was in the dialog in FIG. 19. A row has been added to "Second Group" with the values selected from the dialog in Screenshot 14. The user has also selected "Any of the following" from the "Group should contain" dropdown. Thus, at this point "Second Group" is defined as those objects where Cities appears any number of times or the mailing address appears at least two times or where internet addresses do not appear in the object. Notice here that by selecting "Any of the following" the "Second Group" may comprise objects which meet any one of the conditions of the group.

Figure 21:
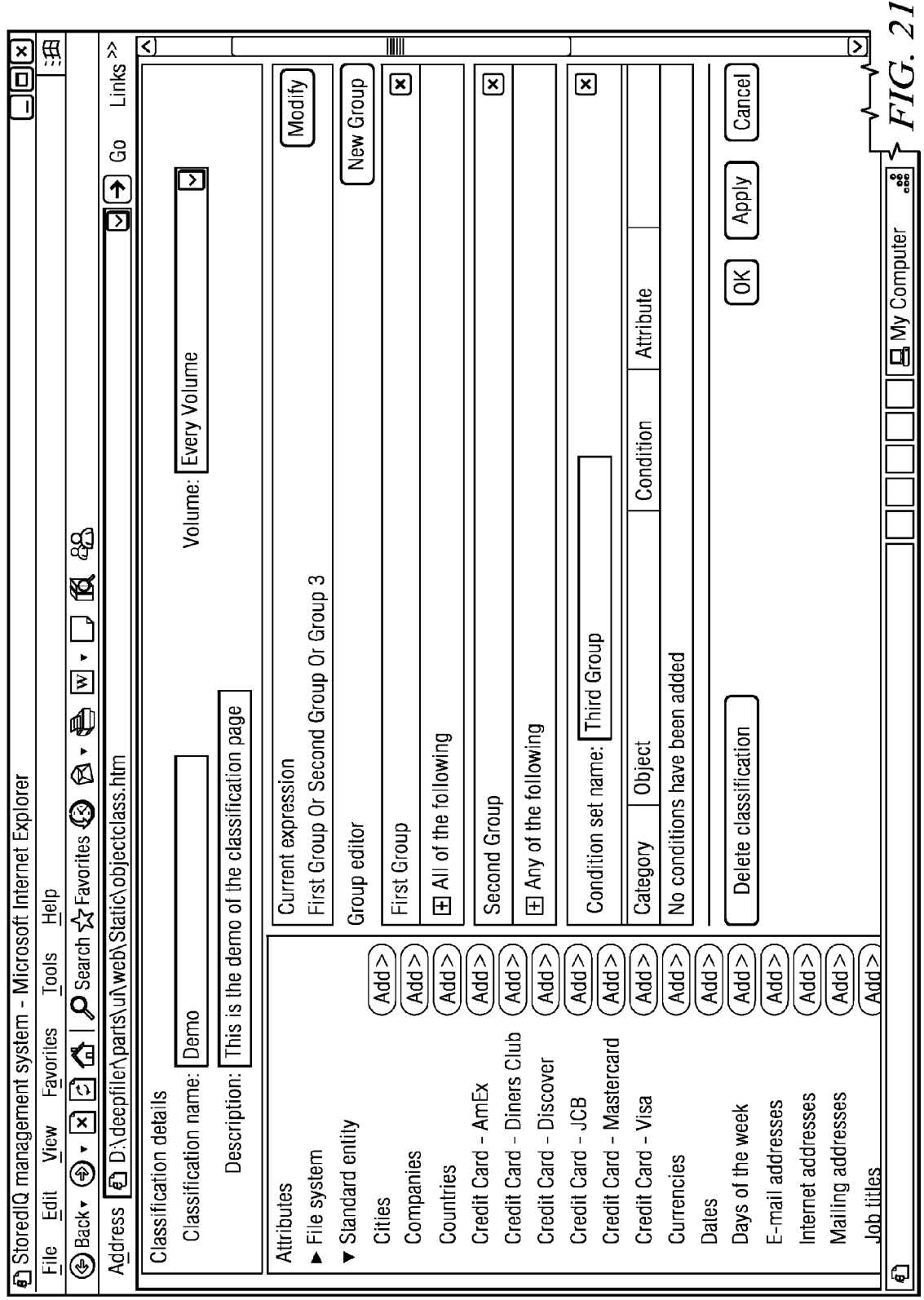

FIG. 21 depicts one embodiment of a screen for a state of a classification editor when a new group is being added. The user has clicked on the "New Group" button which "collapsed" and deactivated the second group "Second Group". An empty group was added after the second group and was set to active. The user then typed in "Third Group" for the newly added group's name. This set the text in "Current expression" to "First Group or Second Group or Third Group", indicating that the default expression is now equivalent to First Group or Second Group or Third Group.

Figure 22:
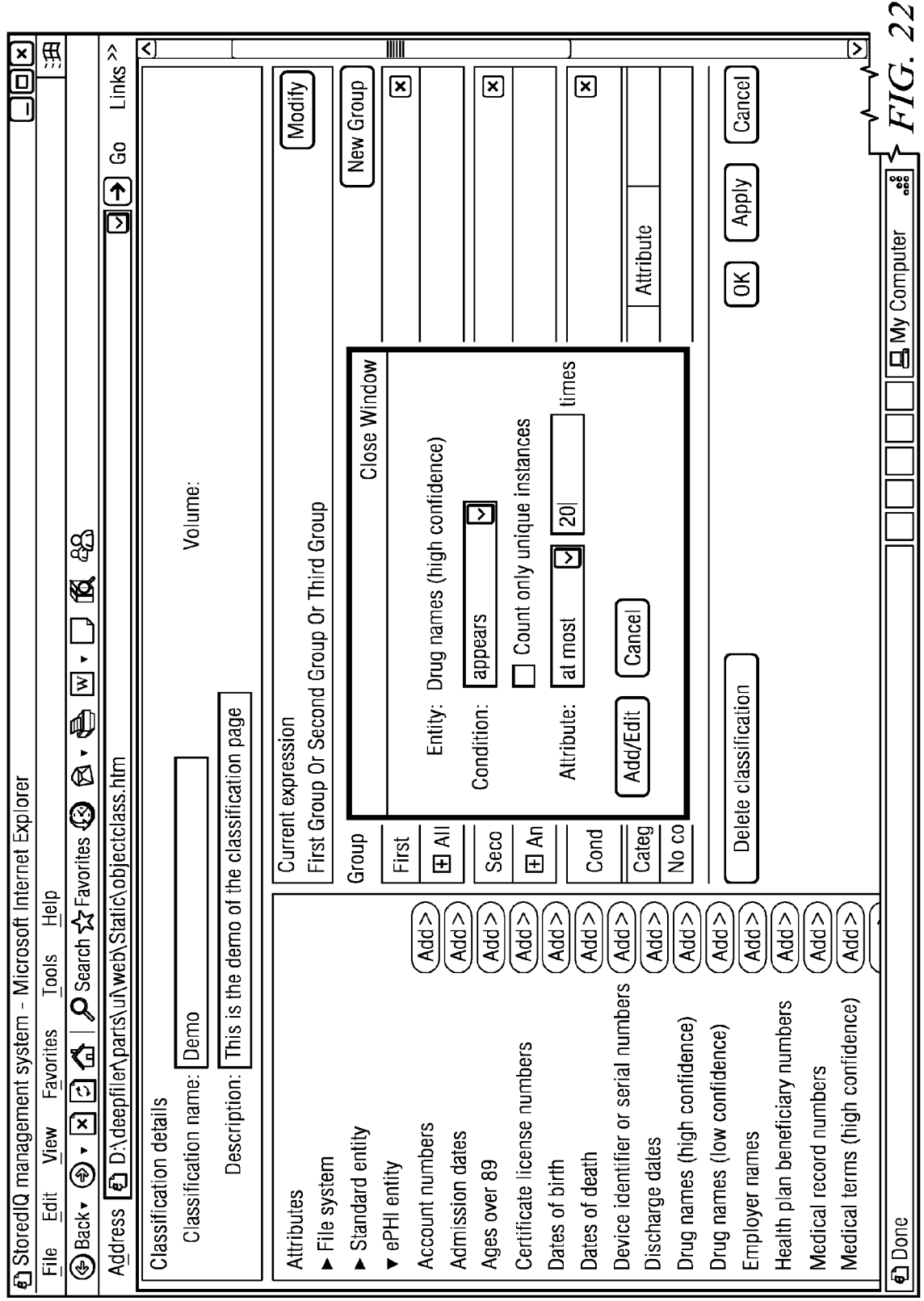

FIG. 22 depicts one embodiment of a screen for a state of a classification editor when a group is being defined. The user has clicked on "Standard entity" which collapsed the list of Standard Entity Attributes. The user then clicked on "ePHI entity" expanding the list of ePHI Entity Attributes. The user clicked on the "Add" button next to "Drug names (high confidence)". The user then selected "At most" from the "Attribute" dropdown which exposed the checkbox for uniqueness and the input next to the "Attribute" dropdown. Finally the user typed in "20" into that input. Thus, here the user is trying to add a condition to the group "Third Group" so that the group may comprise objects where drug names appear at most 20 times.

Figure 23:
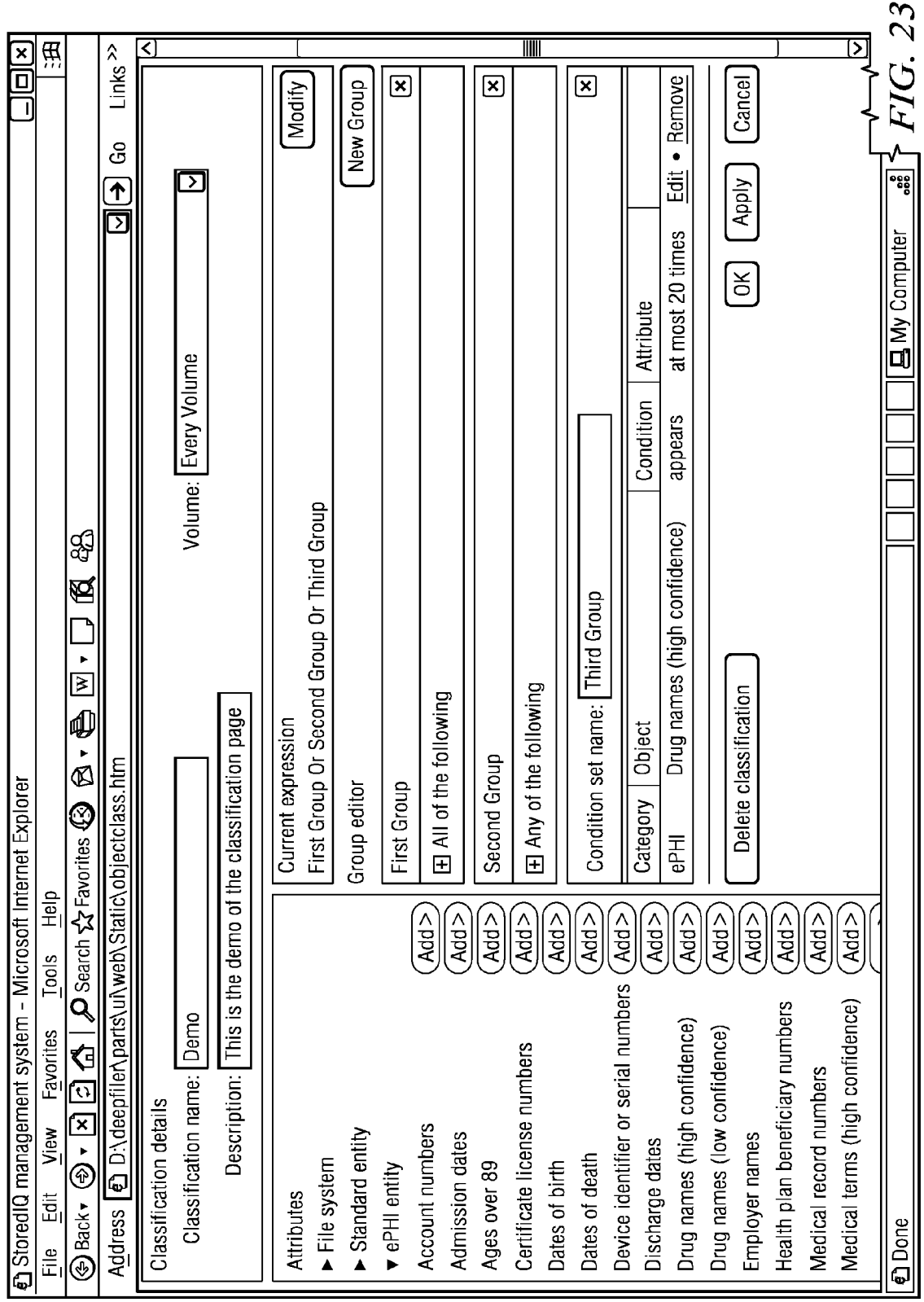

FIG. 23 depicts one embodiment of a screen for a state of a classification editor when a group is being defined. The user has clicked on the "Add/Edit" button that was in the dialog in FIG. 22. A row has been added to "Third Group" with the values selected from the dialog in FIG. 22. Thus, at this point "Third Group" is defined as those objects where drug names appear at most 20 times.

Figure 24:
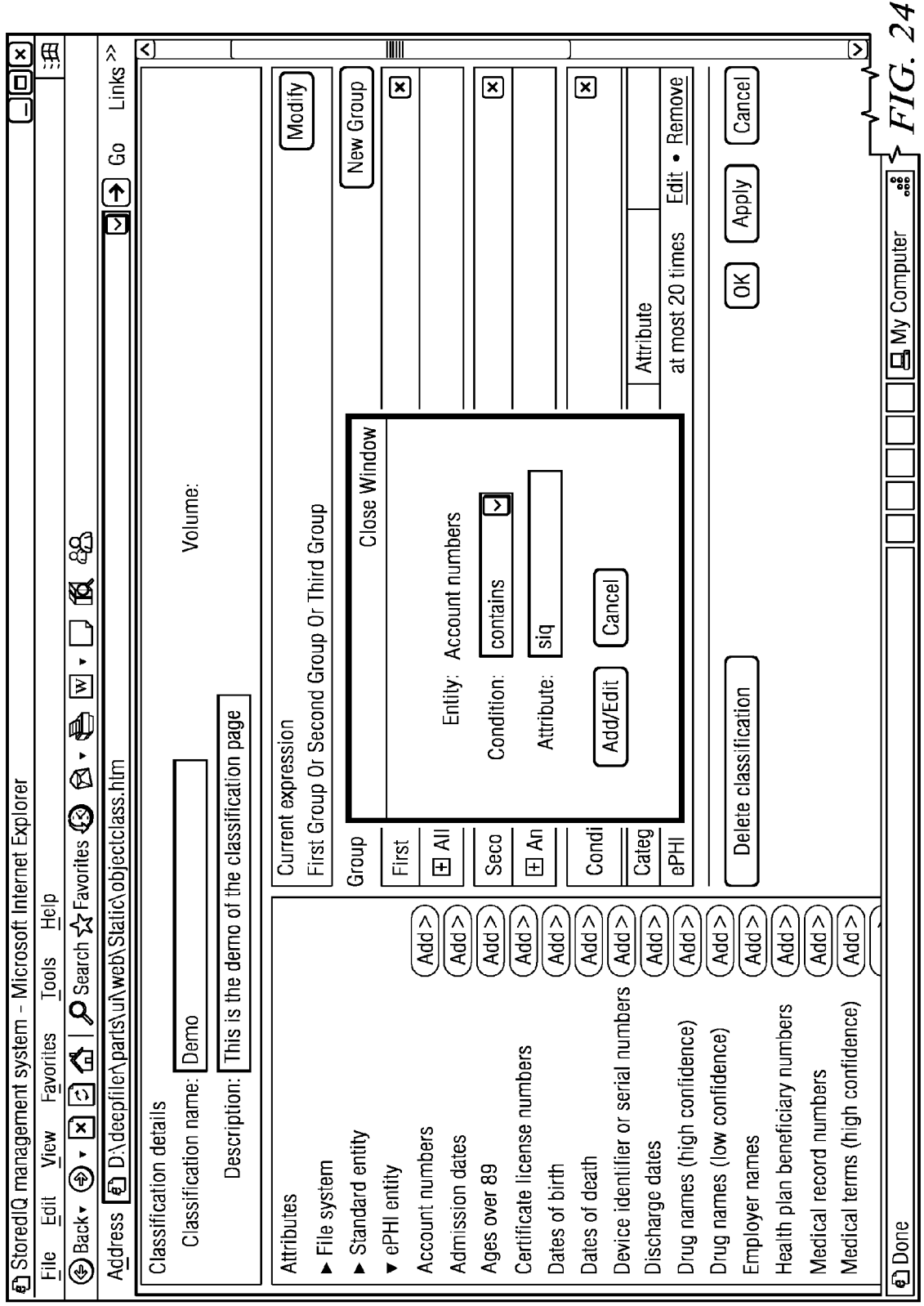

FIG. 24 depicts one embodiment of a screen for a state of a classification editor when a group is being defined. The user clicked on the "Add" button next to "Account numbers". The user then selected "contains" from the "Condition" dropdown which hid the "Attribute" dropdown, instead exposing an input field. The user typed in "siq" into this input. Thus, here the user is trying to add a condition to the group "Third Group" so that the group may comprise objects where the account number contains "sig".

Figure 25:
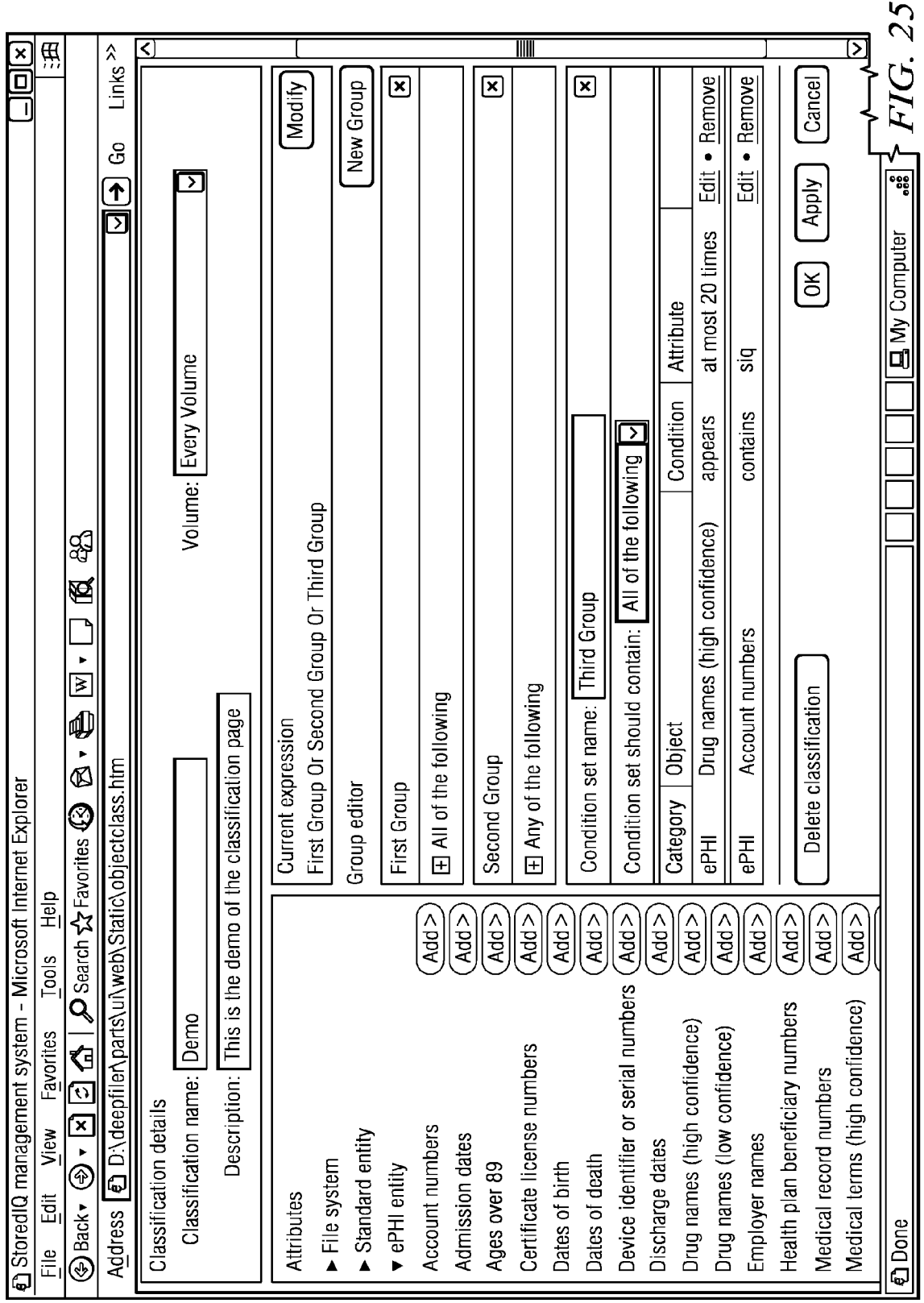

FIG. 25 depicts one embodiment of a screen for a state of a browser based classification editor when a group is being defined. The user has clicked on the "Add/Edit" button that was in the dialog in FIG. 24. A row has been added to "Third Group" with the values selected from the dialog in FIG. 24. Because there are two rows in the group, an additional row is visible (second row from the top exposing a dropdown next to the phrase, "Groups should contain". The dropdown has been left to the default value of "All of the following". Thus, at this point "Third Group" is defined as those objects where drug names appear at most 20 times and where the account number contains "siq".

Figure 26:
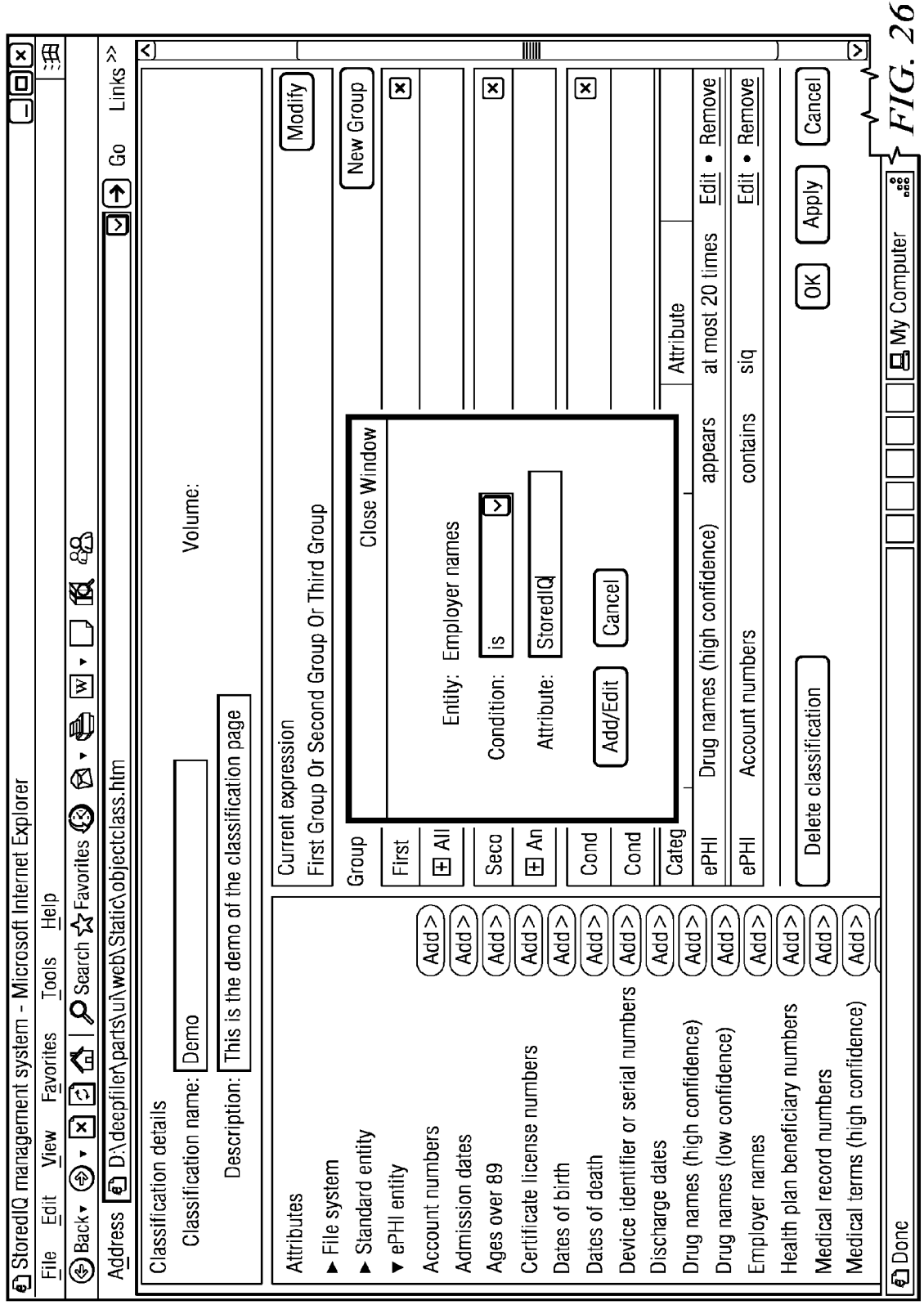

FIG. 26 depicts one embodiment of a screen for a state of a classification editor when a group is being defined. The user clicked on the "Add" button next to "Employer names". The user then selected "is" from the "Condition" dropdown which hid the "Attribute" dropdown, instead exposing an input field. The user typed in "StoredIQ" into this input. Thus, here the user is trying to add a condition to the group "Third Group" so that the group may comprise objects where the Employer name is "StoredIQ".

Figure 27:
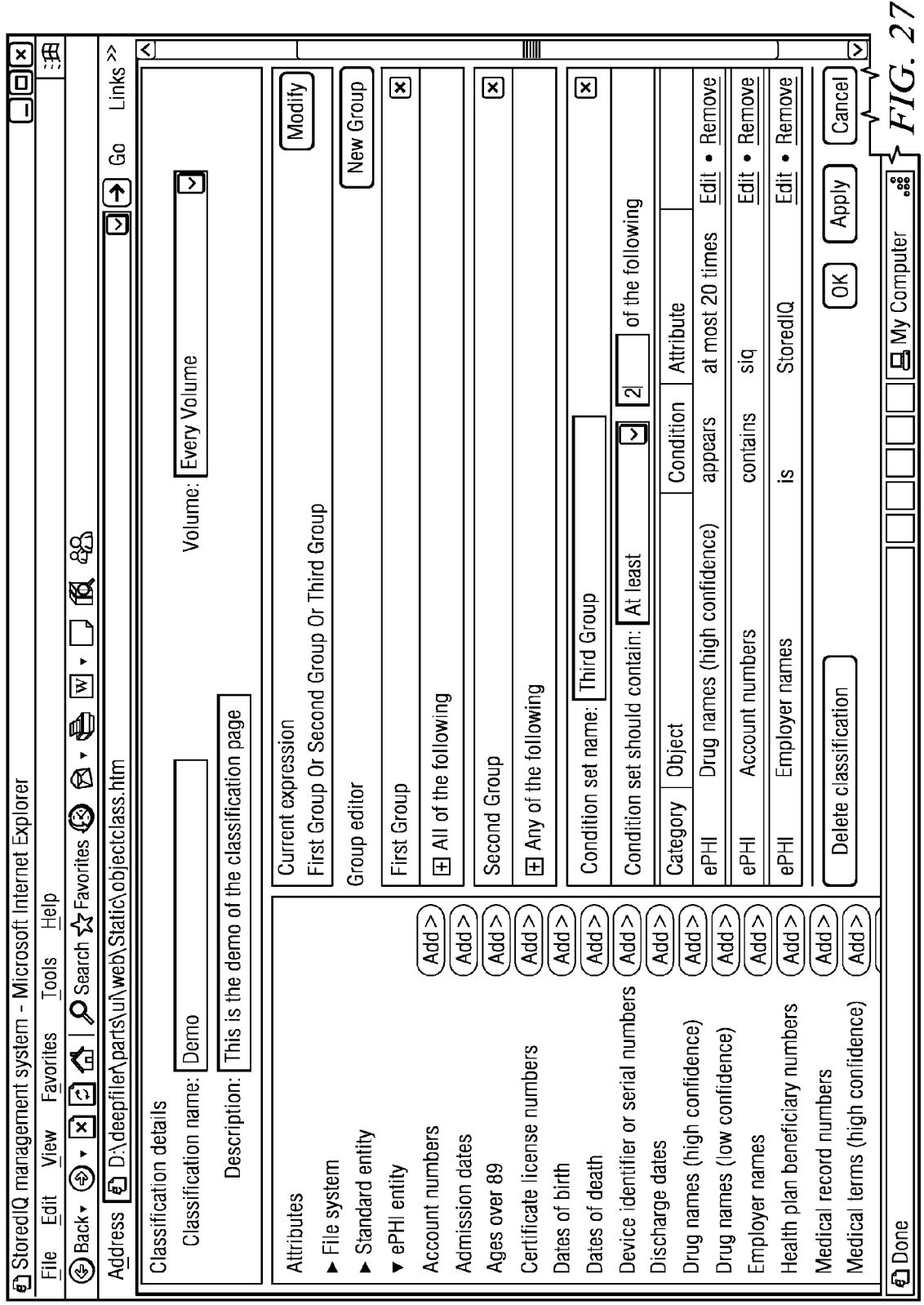

FIG. 27 depicts one embodiment of a screen for a state of a classification editor when a group is being defined. The user has clicked on the "Add/Edit" button that was in the dialog in FIG. 26. A row has been added to "Third Group" with the values selected from the dialog in Screenshot 20. The user has also selected "At least" from the "Group should contain" dropdown exposing an input field next to the dropdown. The user then entered "2" into the input. Thus, at this point "Third Group" is defined as those objects which meet at least two of the following conditions: drug names appear at most 20 times, the account number contains "siq", the Employer name is "StoredIQ". Notice here that by selecting "at least" the "Third Group" may comprise objects which meet at least a certain number of the conditions associated with the group.

FIG. 28 depicts one embodiment of a screen for a state of a browser based classification editor when a group is being defined. The user has clicked on the "+" button next to "All of the following" in the first group. As a result the conditions that make up that group have been exposed, but the group has remained in an inactive state (e.g. The group is not currently being edited or altered).

Figure 29:
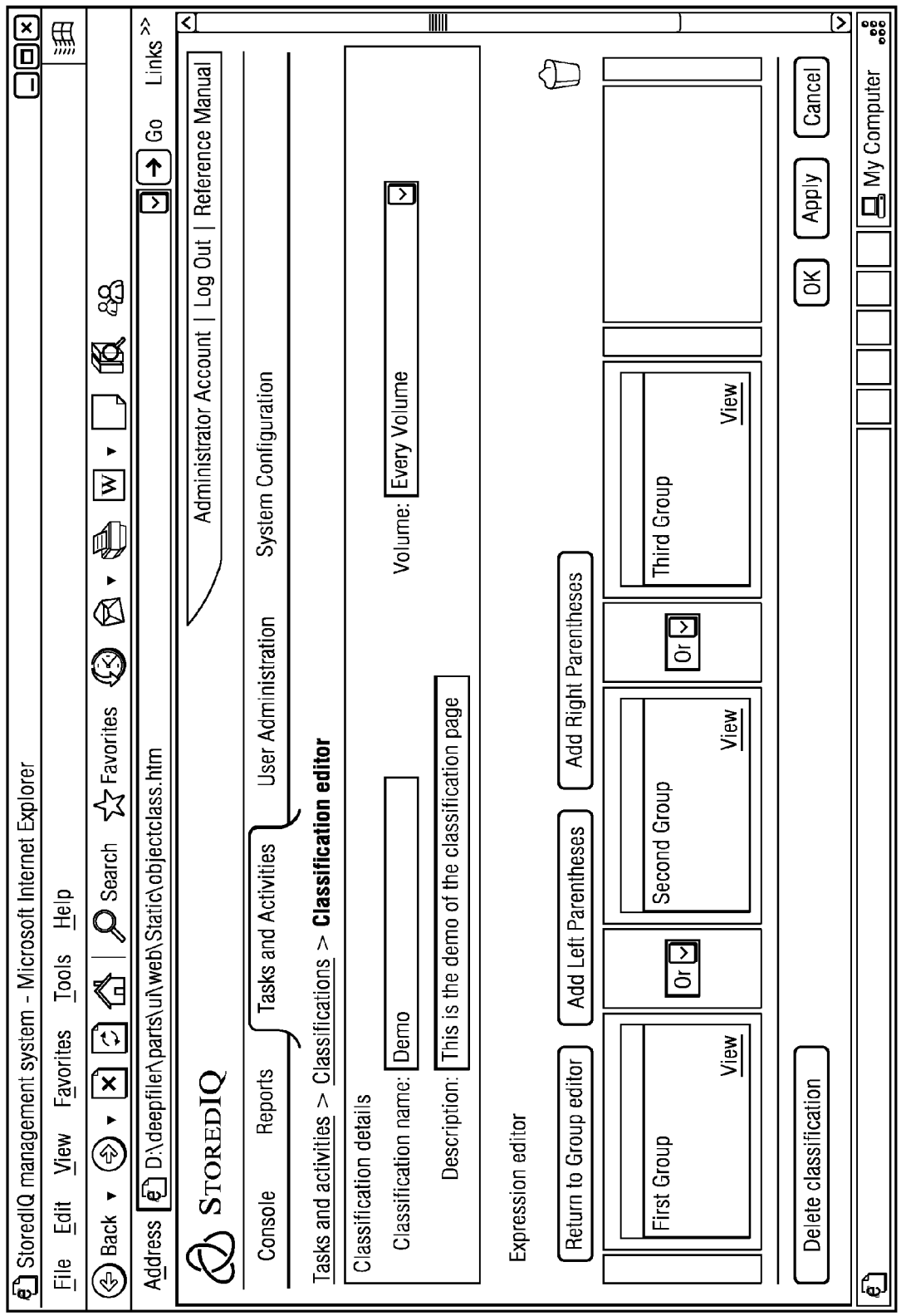

FIG. 29 depicts one embodiment of a screen for a state of a classification editor where an expression can be edited. The user has clicked on the "Modify" button in the "Current expression" section that was visible in FIG. 28. The view that the user had previously been looking at—the "Group editor"—has disappeared exposing the "Expression editor" screen or pane as depicted in FIG. 29. The "expression editor" screen or pane presents blocks representing each of the three groups that were configured in the Group editor (depicted previously). In addition there is an operator in between each of the groups which define the logical relationship between each group. In one embodiment, these operators may be the same as the those depicted in the "current expression" portion of the "Group editor".

Figure 30:
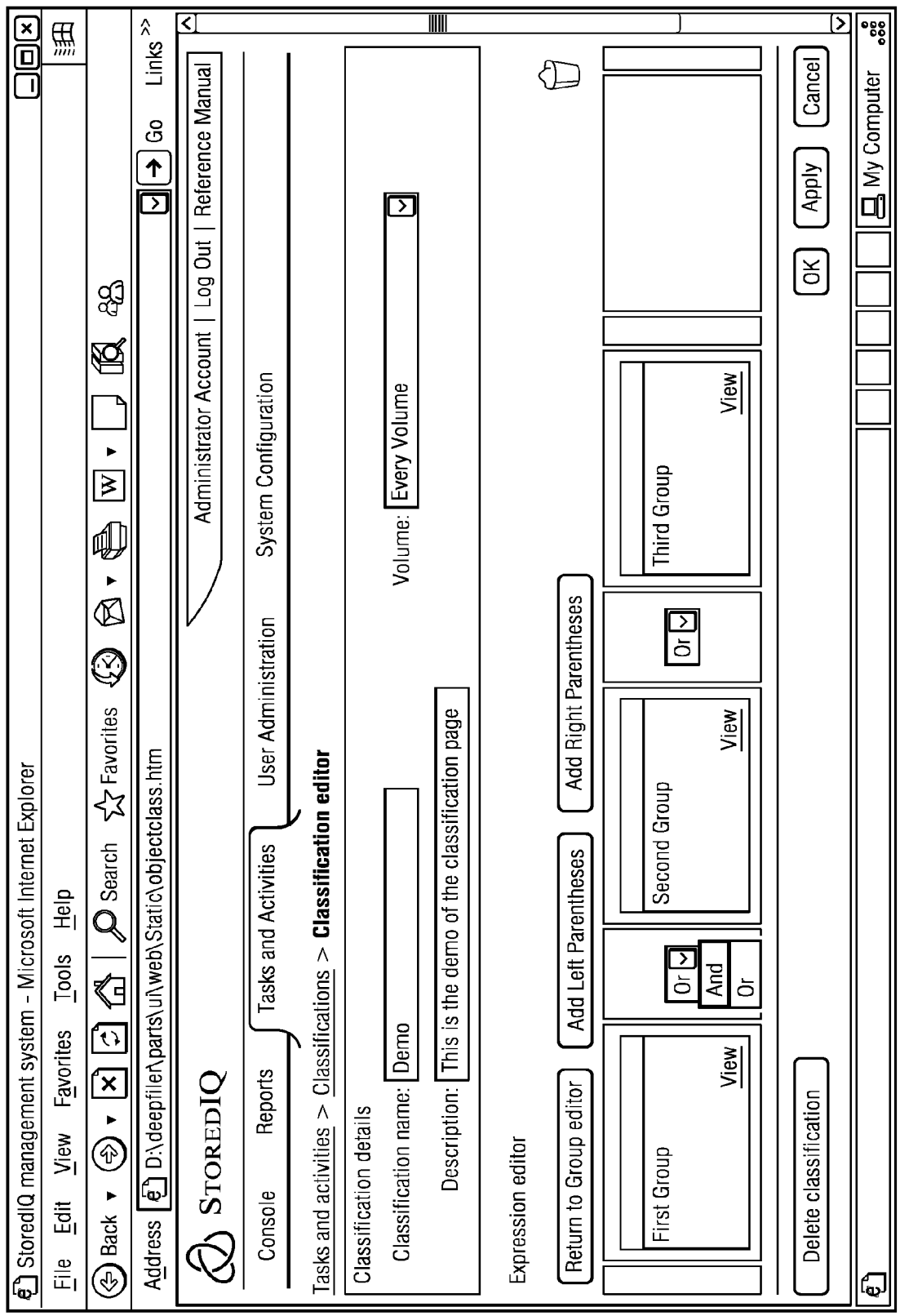

FIG. 30 depicts one embodiment of a screen for a state of a classification editor when an expression is being edited. The user has selected "And" from the dropdown in between "First Group" and "Second Group". Thus, after the users selection the current expression comprises "First Group AND Second Group OR Third Group".

Figure 31:
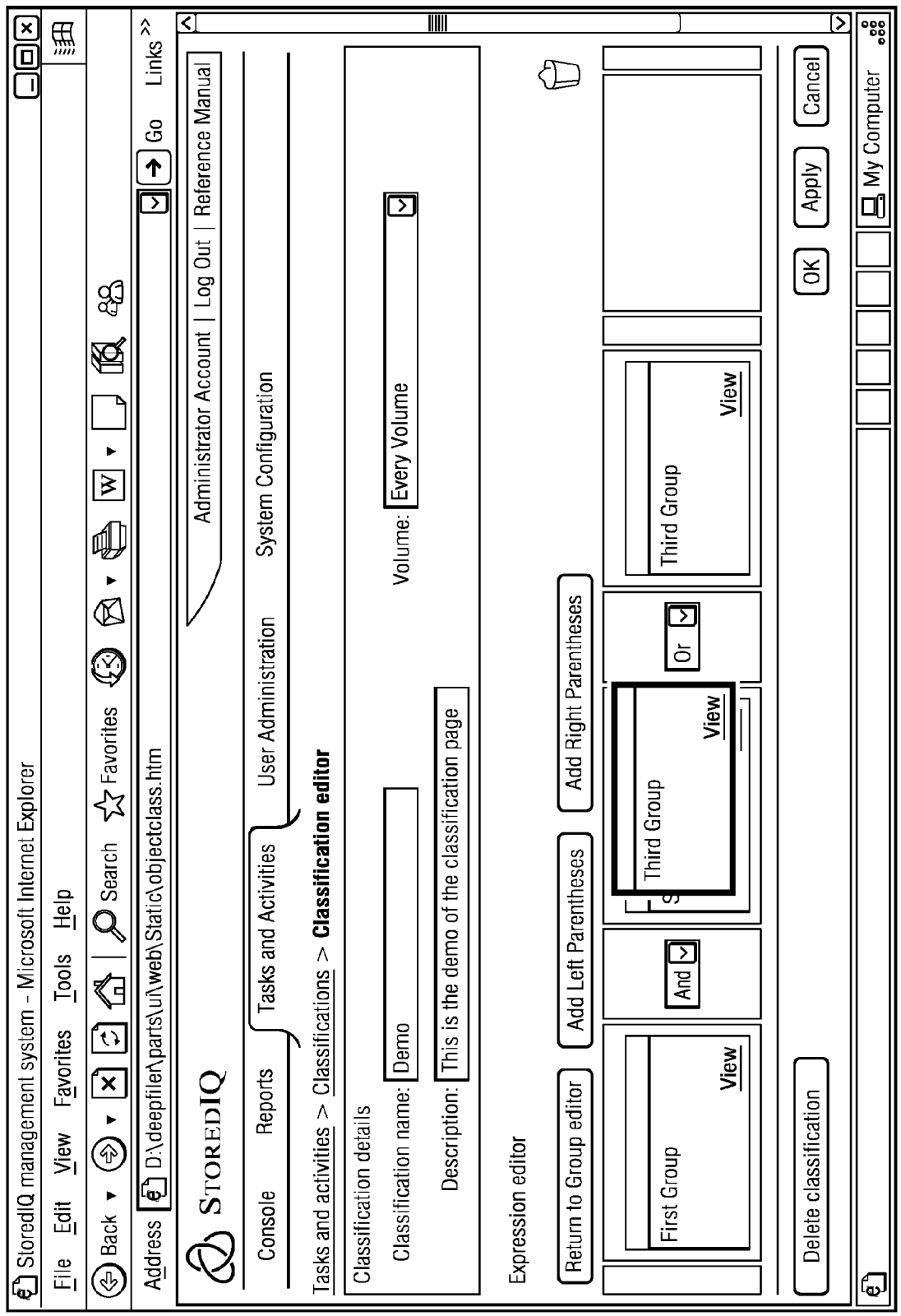

FIG. 31 depicts one embodiment of a screen for a state of a classification editor when an expression is being edited. The user has clicked and started dragging the block representing "Third Group" over top of "Second Group". The cell that contains. "Second Group" is highlighted indicating that it is ok to drop "Third Group" into this position. Thus, the block representing "Third Group" has been dragged from its initial location and dropped in the previous location of the block representing the "Second Group".

Figure 32:
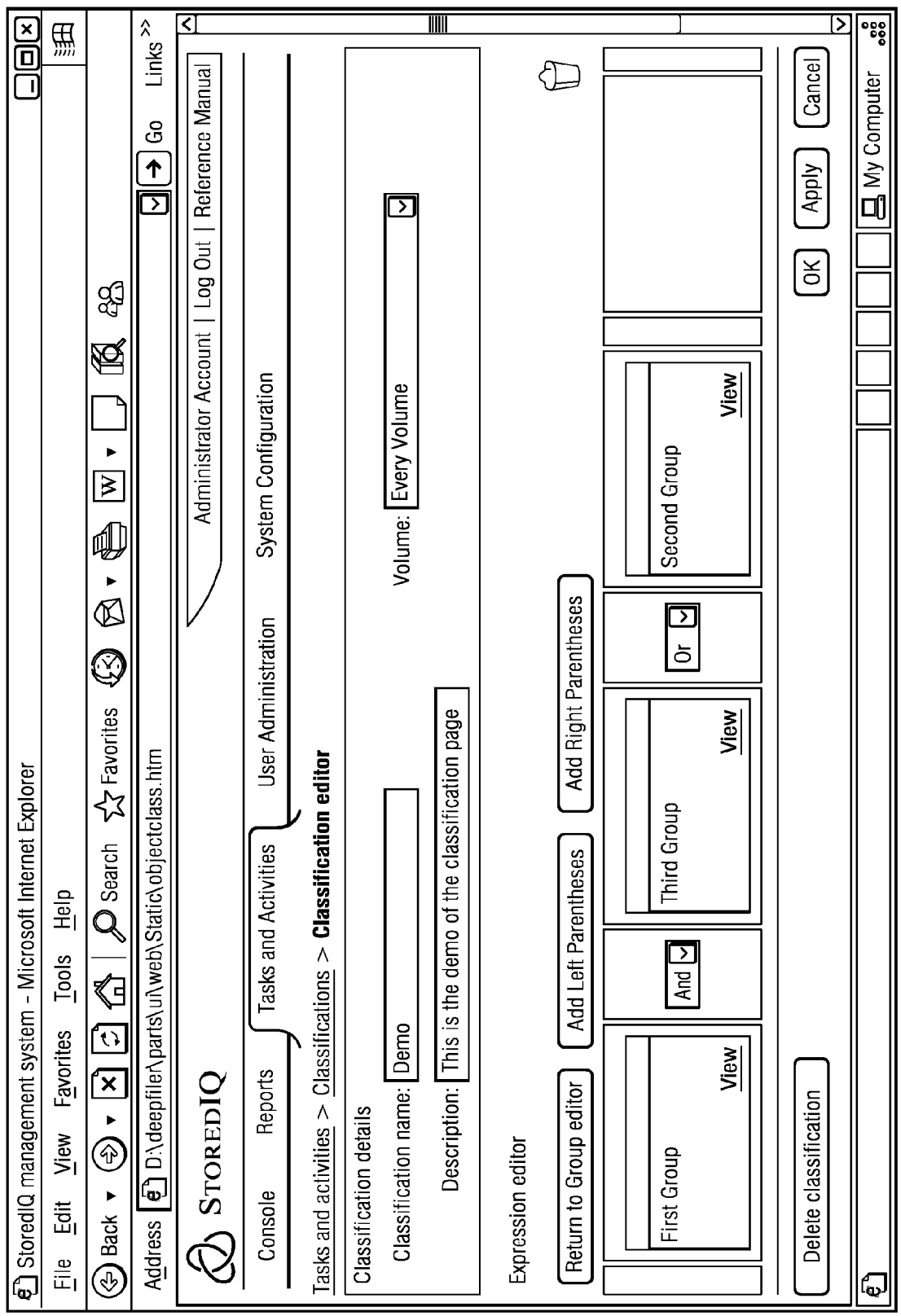

FIG. 32 depicts one embodiment of a screen for a state of a classification editor when an expression is being edited. More particularly, FIG. 32 depicts the results of the operations shown in FIG. 31. The user has dropped "Third Group" and "Second Group" shifted one position to the right while "Third Group" is now in the position that was previously occupied by "Second Group". In other words, the two groups switched places through a drag and drop operation. Thus, after the user's editing the current expression comprises "First Group AND Third Group OR Second Group".

Figure 33:
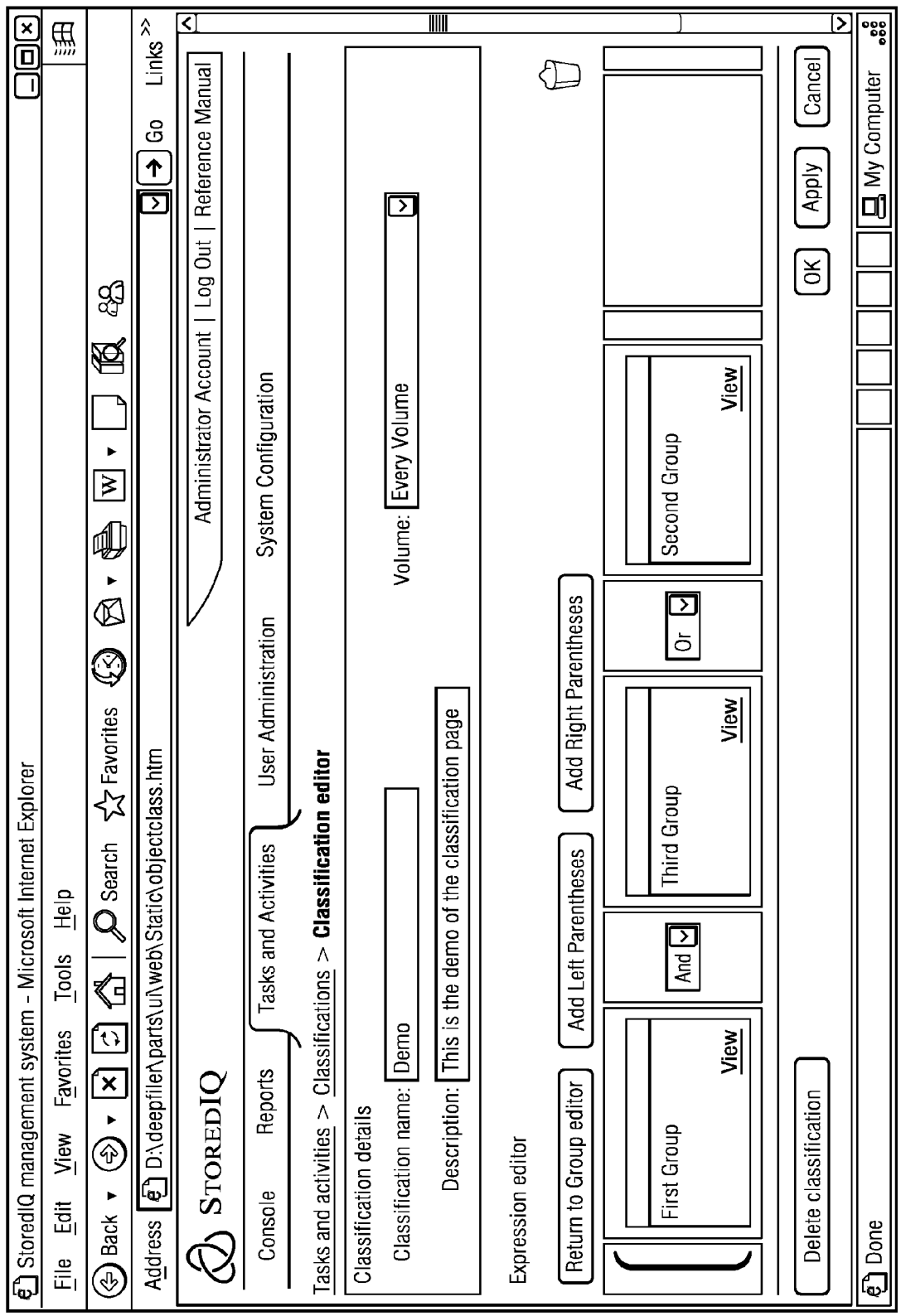

FIG. 33 depicts one embodiment of a screen for a state of a classification editor when an expression is being edited. The user has clicked on "Add left parentheses". An image representing a parenthesis was added before the first group, "First Group".

Figure 34:
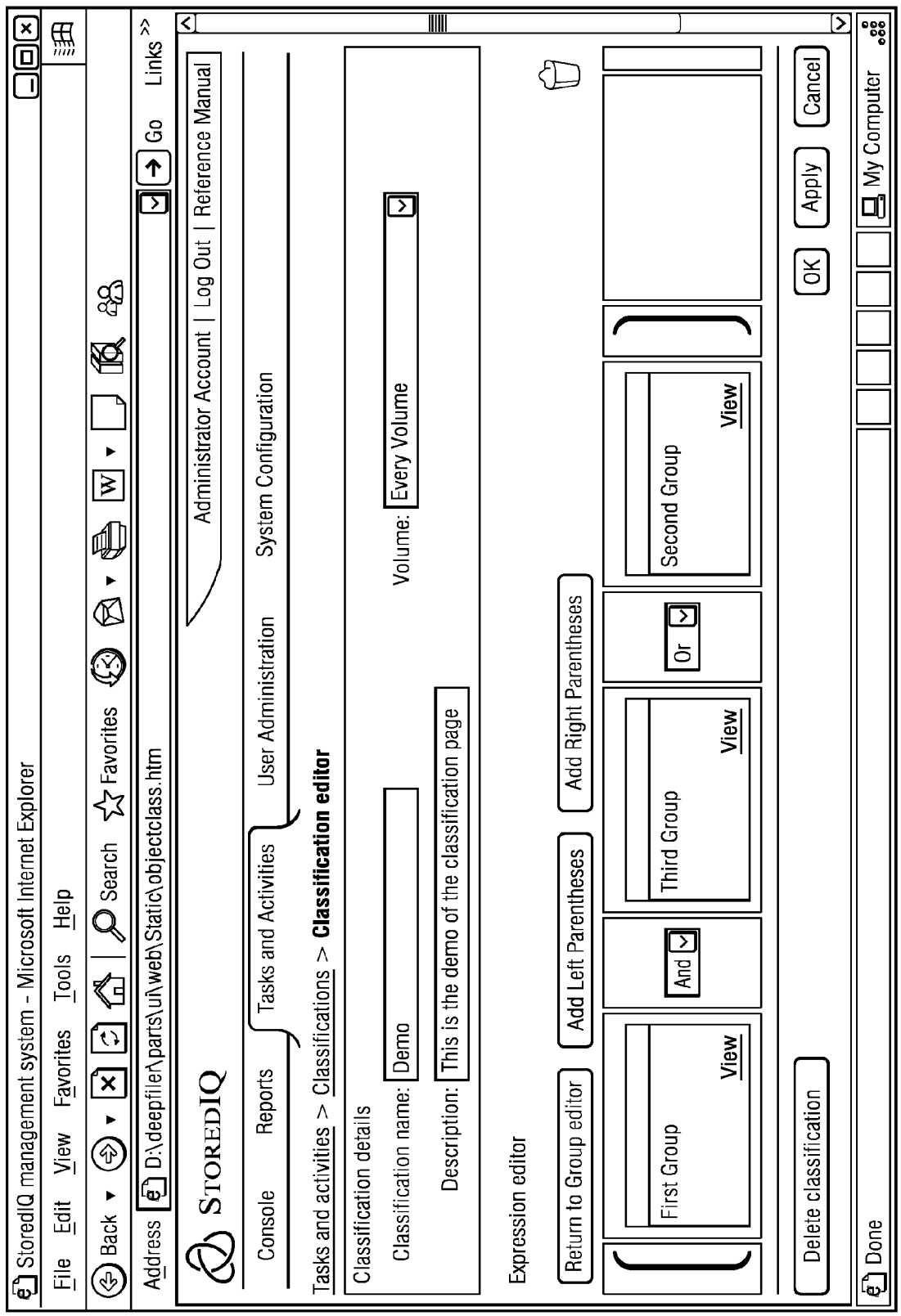

FIG. 34 depicts one embodiment of a screen for a state of a classification editor when an expression is being edited. The user has clicked on "Add right parentheses". An image representing a parenthesis was added after the last group, "Second Group". Thus, after the user's editing the current expression comprises "(First Group AND Third Group OR Second Group)".

Figure 35:
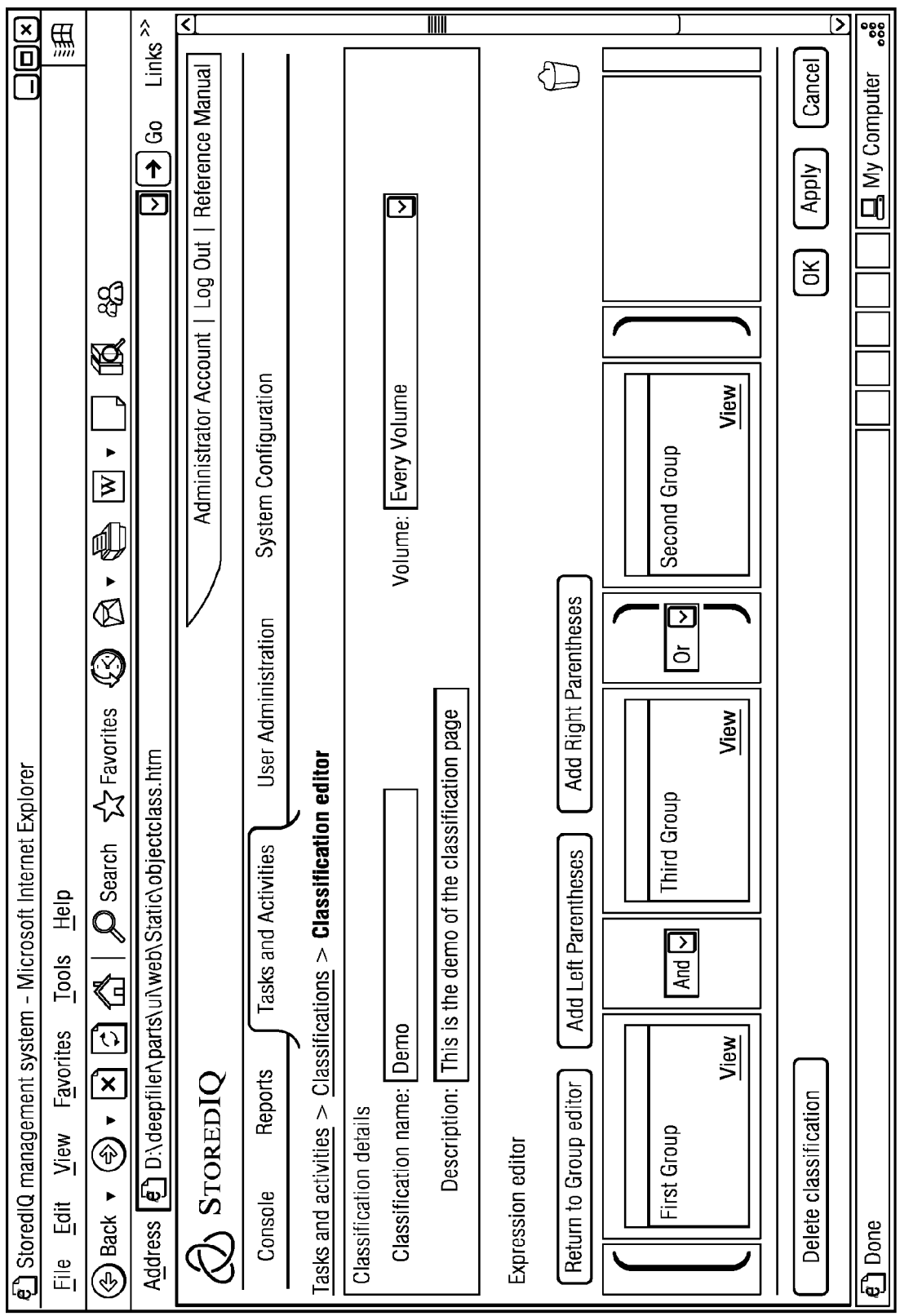
Figure 36:
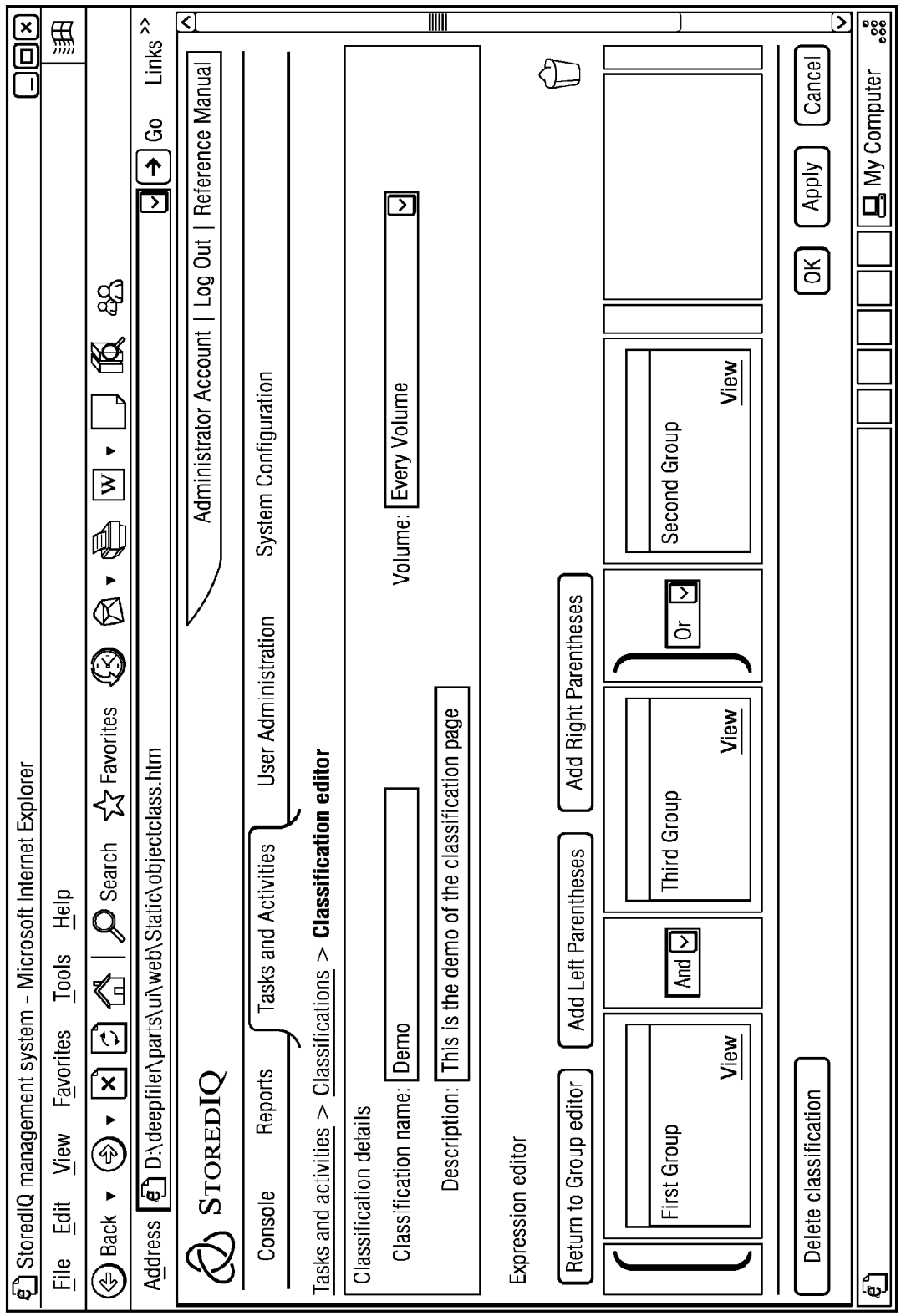

FIG. 35 depicts one embodiment of a screen for a state of a classification editor when an expression is being edited. The user has clicked and started to drag the right parenthesis and is holding it over the second operator. The cell that contains this operator is highlighted indicating that it is ok to drop the parenthesis into this position FIG. 36 depicts one embodiment of a screen for a state of a classification editor when an expression is being edited. The user has dropped the parenthesis into the position from FIG. 35. The parenthesis now moved to that position. Thus, after the user's editing the current expression comprises "(First Group AND Third Group) OR Second Group".

Figure 37:
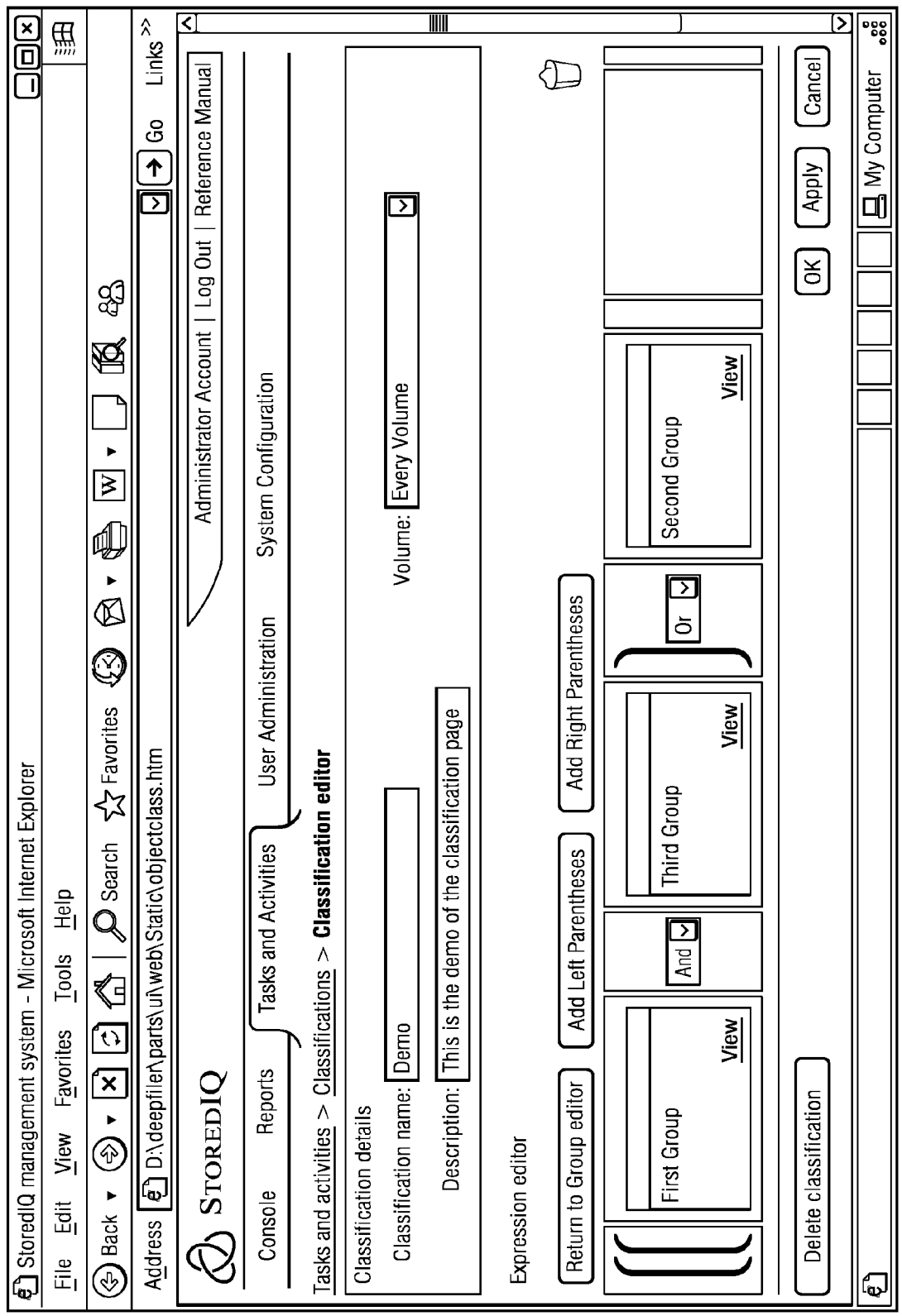

FIG. 37 depicts one embodiment of a screen for a state of a classification editor when an expression is being edited. The user has clicked on "Add left parentheses". An image representing a parenthesis was added before the first group, "First Group" so now there are two left parentheses.

Figure 38:
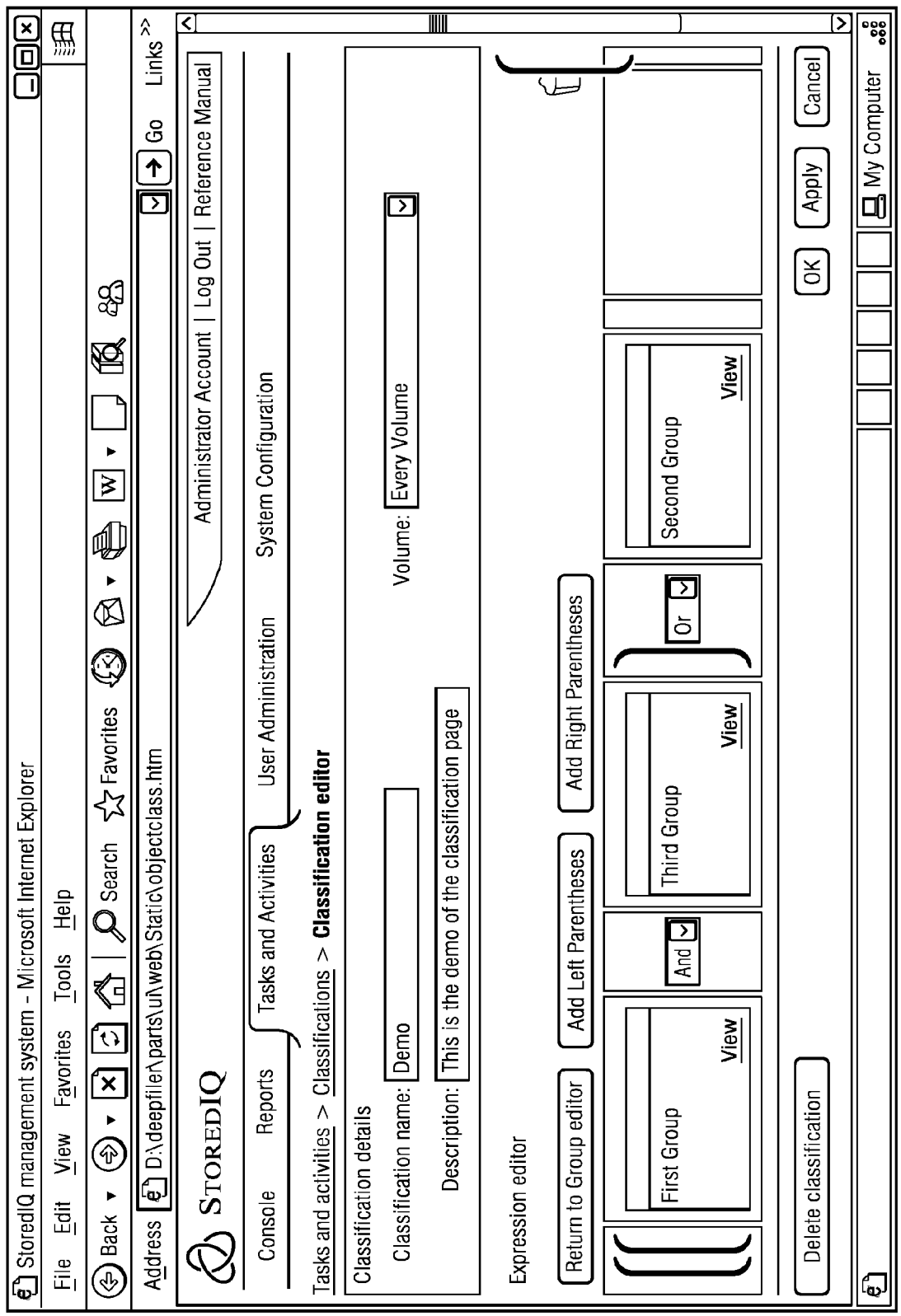

FIG. 38 depicts one embodiment of a screen for a state of a classification editor when an expression is being edited. The user has clicked and begun to drag the left parenthesis that was added in FIG. 37 and is now holding it over the trash can on the right side of the screen. The trash can has a glow around it, indicating that the user can drop the parenthesis into the trash can.

Figure 39:
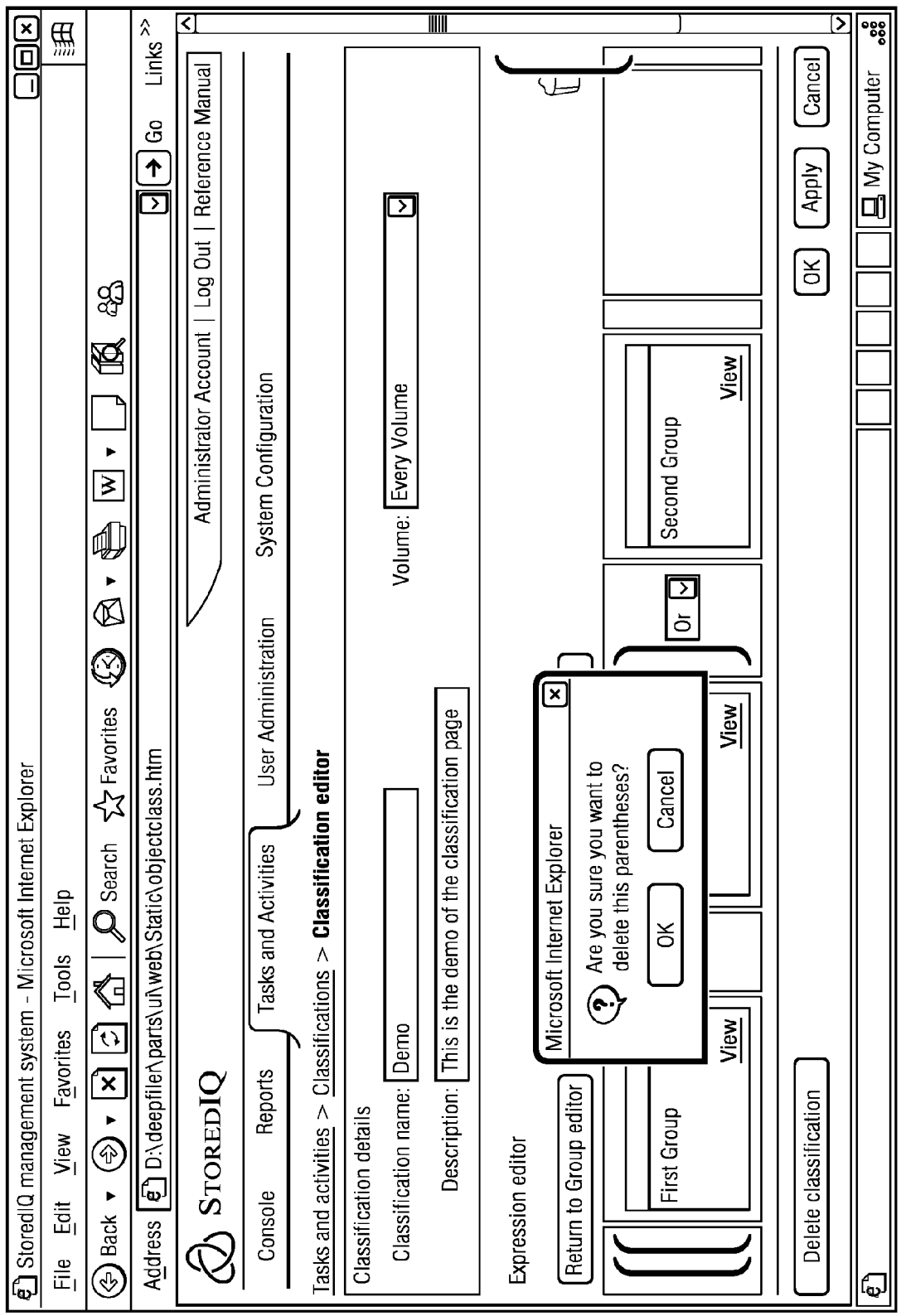

FIG. 39 depicts one embodiment of a screen for a state of a classification editor when an expression is being edited. The user has dropped the parenthesis into the trash can and there is a dialog confirming that the user wants to delete the parenthesis.

Figure 40:
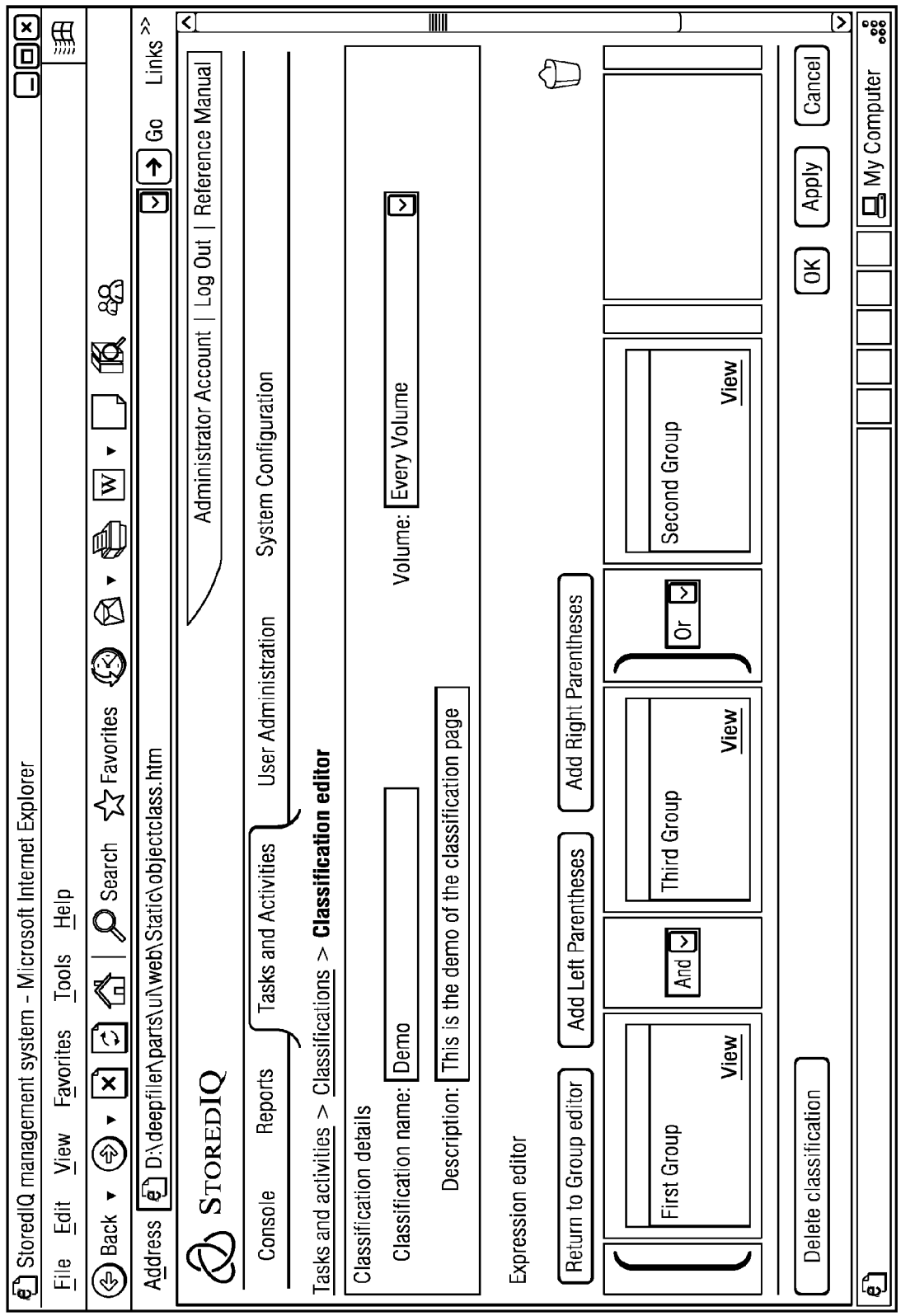

FIG. 40 depicts one embodiment of a screen for a state of a classification editor when an expression is being edited. The parenthesis has been deleted after the user confirms the deletion. Thus, the current expression comprises "(First Group AND Third Group) OR Second Group".

Figure 41:
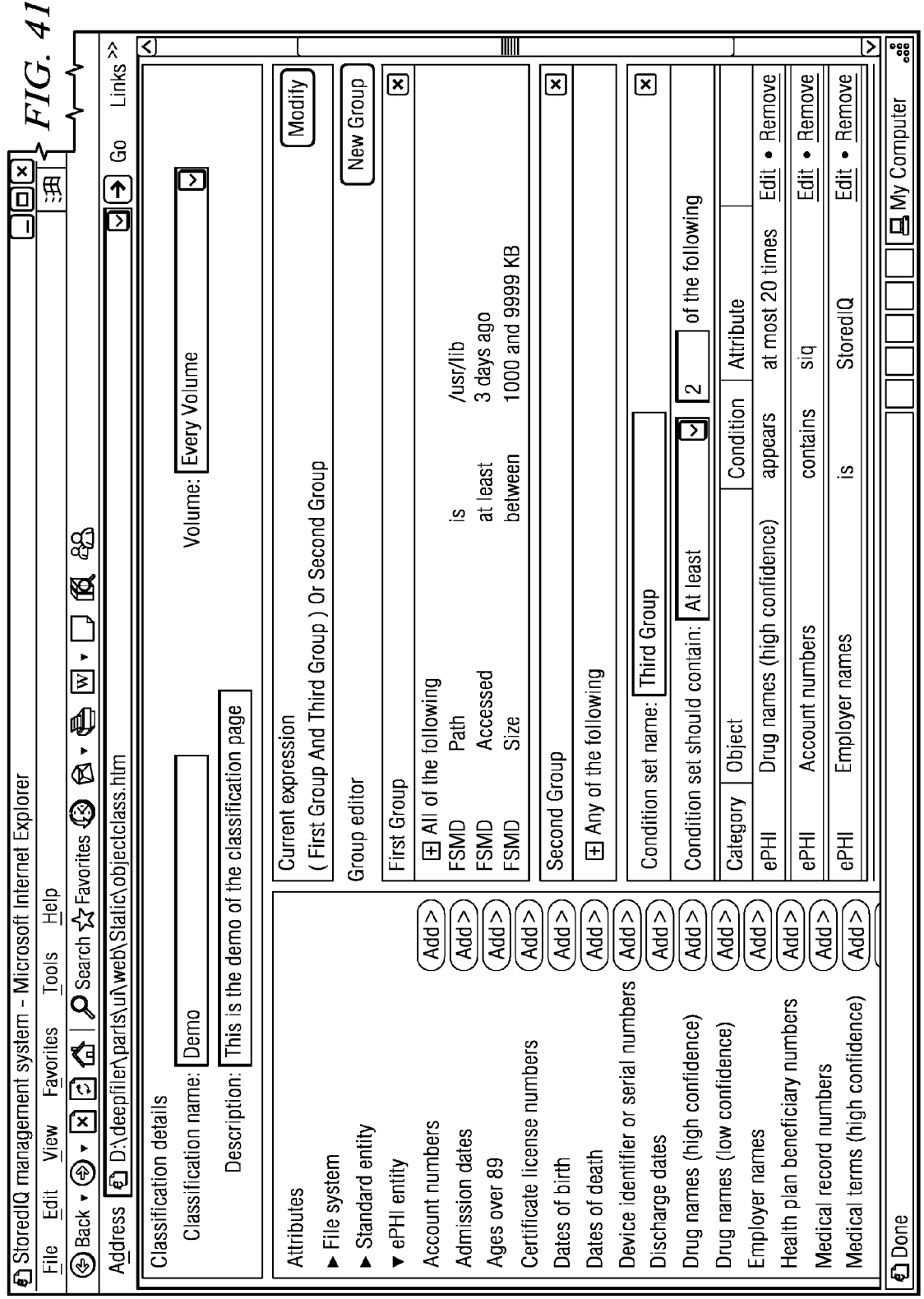

FIG. 41 depicts one embodiment of a screen for a state of a classification editor when a group can be defined. The user has clicked on "Return to Group editor" in FIG. 40. The "Expression editor" has now disappeared, and the "Group editor" is now displayed. Because of the changes that were made in the "Expression editor" the "Current expression" now shows "(First Group and Third Group) or Second Group".

Thus, if objects are classified using the expressions and groups represented in FIG. 41, objects will be identified according to the logic expressed in the current expression, namely objects that belong to the first and third groups or objects that belong to the second group.

While many different technologies may be used to implement the classification editor as depicted with respect to FIGS. 7-41, in one embodiment within the classification editor application, DHTML is used extensively to change the display and allow a user to create an object classification without having to reload a web page. DHTML is a way to manipulate HTML elements on the screen by using javascript that is downloaded on to the clients machine with the web page. In recent years, internet browsers have exposed more APIs in the browser through javascript which allow for more advanced web pages. In addition, the World Wide Web Consortium has worked to create a standard across all browsers which aid the developer in creating one set of code that will work on many different machines and browsers.

It will be apparent that the description of the embodiment for implementing an embodiment of the classification editor described below describes one specific embodiment of functions, steps and methods for implementing a classification editor and that various modifications and changes can be made to the below described embodiment and other methods utilized to implement the classification editor as described above without departing from the scope of the present invention.

In one embodiment, cascading style sheets (CSS) may also be utilized to implement the classification editor. CSS allows the developer to set attributes on an HTML element which define its display. For example, using CSS, a developer can set the background color of an element by using the background-color attribute. Groups of attributes can be formed into a class. A style sheet can contain many classes. Using DHTML, a developer can change a CSS attribute or class on an element.

Combining the use of DHTML and CSS has helped to do many of the effects that may be utilized in conjunction with a classification editor. In one embodiment, a function that returns a reference to an HTML element may be utilized. This function uses the getElementById method which is part of the document object in DHTML which accepts the id of the HTML element and returns a reference. If for some reason the browser does not support the method getElementById, it can be checked to see if the document object has a collection called all and return a reference to the element by finding the id in the document.all collection.

Once a pointer to the element is obtained, the CSS class name can then be set by setting the className property on the element to a valid CSS class previously defined. CSS attributes like height or width can also be set. To do this the height or width property on the style object of the element is set.

Understanding those basics will help in understanding how it is possible to get the groups to expand in the group editor section; how dragging and dropping in the expression editor may be implemented; and it may be possible to highlight the background when an object is dragged over top of it.

Dragging and Dropping

In one embodiment, to create dragging and dropping, it is helpful to assign functions to events on the elements that will be dragged and dropped. The elements that will be moving are the group blocks and the parentheses in the Expression Editor section of the classification editor. When a group block is created, a new function is assigned to its onmousedown event which accepts the event as an input. In this case, it is desirable that the onmousedown event only fires on the header cell of the group block. To do this, the function created that returns a reference to an element called getDiv( ) may be utilized. Once a reference to the group block element is obtained the following code may be utilized to assign a function to the desired event: groupBlock.rows[0].cells[0].onmousedown=function (evt) {doMouseDown(evt); };

The group block is actually a table element in HTML. Since referencing rows and cells start at zero rather than one, to assign a function to an event to the first cell in the first row of the table, the following may be used:

groupBlock.rows[0].cells].0].onmousedown. The function assigned accepts the event as an input and calls another function called doMouseDown which may have been written with that same event as an input.

In addition to assigning a function to an event for the group block, the parentheses may also need to have a function assigned to its onmousedown event. The code for that is:
   parens.onmousedown=function (evt) {doMouseDown (evt);
};

Each parenthesis may actually be an image. The getDiv( ) function may be used to get a reference to that image and assign the same function as is doned for the group block.

On a side note, to change the look of the cursor when it goes over an element that can be dragged and dropped, the following attribute may be placed in the HTML tag that creates that element:
   onmouseover="this.style.cursor='move'"

The attribute assigns a line of code to the onmouseover event of the element. There is a css attribute called cursor which accepts several constants defined by W3C standard and implemented as part of CSS support in the current browsers. In one embodiment, the cursor which may be used is called 'move' which looks like a crossbar with an arrowhead on each end which indicates that the element can be moved.

The function that is called from the function assigned to the onmousedown events of the group block and parentheses, doMouseDown( ) immediately calls other functions that have been created to help handle the differences between different browsers in handling events. The first function, getSrcElement( ) accepts the event as an input. What this function does is returns a reference to the element that fired the event. If the event that is passed in, is indeed an object, and has a target property on it, then the reference is set to the element from the target of the event. But, it may be desired to make sure that this is the top element and not a child of the actual element that are desired. To do this, a loop may be run that checks the nodeType of the current element and if the nodeType is not 1, meaning it's a child, the reference is set to the parent of that element. This is repeated until the parent is gotten to and the reference returned. However, if the event that was passed in is not an object, it can be checked to see if the window object has a child object called event. If that object exists, it has an object called srcElement, which is returned. Typically, Mozilla-based browsers support the first case, while Internet Explorer supports the second case.

The second function that is called from doMouseDown( ) returns a useable reference to the event that was fired. This function, getEvent( ) accepts the event as an input. It then checks to see if that event is truly an object. If it is, it simply returns the event that was passed in. If that event is not an object, then it passes back window.event. Again, typically Mozilla-based browsers support the first case, while Internet Explorer supports the second case.

Once a reference to the source element and a reference to the event object are obtained, inside of the doMouseDown( ) function, the method thisEvent.preventDefault( ) is called where thisEvent is the reference to the event object. The preventDefault method is not available if the reference points to window.event. So it may be checked to see if the original event passed into the function is an object and before the preventDefault method is called. The reason for doing this is to make sure that if there was any default behavior defined for that event, it is not run.

Before describing what the next part of the doMouse-Down( ) function does, it may be helpful to describe how the elements are laid out on the screen. In one embodiment, in the Expression Editor, there is a table that contains all the elements that can be moved. All the elements can be moved within this table and only within like cells. Each row has nine cells. The odd-numbered cells contain parentheses and the operator dropdown (ands/ors). The even-numbered cells contain the group blocks. A parenthesis can only be moved to another odd-numbered cell, while a group block can only be moved to an even-numbered cell. If there are not enough group blocks to fill up a row, each cell contains a non-breaking space and nothing can be moved into these cells. There is one exception to that and that is the cell to the right of the cell containing the group block can have a parenthesis moved into it. These cells can be differentiated by the color of the background and the width. The group block cells use the style sheet class called, "tableBlock-cell-inactive" and its width begins as 24% of the width of the table. The cells containing parentheses and operators use the style sheet class called, "operatorBlock-cell-inactive" and its width begins as 1% of the width of the table.

In addition, the actual element that is dragged around is not the element stored in each cell, but rather a copy of it. To do this, there is an HTML element called a DIV. This DIV is hidden when no dragging is taking place by setting the property visibility on the style object of the DIV to 'hidden'. The DIV also has its position property on the style object set to 'absolute' so that its position is not relative to another other element on the screen but rather to the top and left of the entire window.

It can then be decided whether the source element is a TD (a table cell) or an image by checking the tagName property. A reference to the cell that contains the source element may be acquired so that if the element is dropped into another cell, it can be determined which direction to move the other elements and where they the other elements will be moved. If the source element is a TD, it is not the same cell that is desired—it's the header cell of the group block. To get the main cell, the parentNode property may be utilized on the element which returns the row. Then the parentNode property of the row which returns the table body may be utilized. The parentNode of the table body is the table itself and finally the parentNode of the table is a reference to the cell. Once the reference to the cell is obtained, the cellIndex property may be used to get its index in the row and set that to a global variable called celldx. The parentNode of the cell is obtained—the row—and get the rowIndex property of that to set to a global variable called rowldx. Finally the innerHTML of the DIV is set to the innerHTML property of the cell. What this does is copies the contents of the cell—the group block—to the contents of the DIV which is called divMovingBlock.

If the tagName returns 'IMG' then the source element is an image. In this case, the parentNode of the image is the cell. Once that reference is obtained, the same things may be done to set the cellIdx and rowIdx variables. If the id property of the image contains the word 'Left', then set the innerHTML on divMovingBlock to:

<img src="/r-images/left-parentheses.gif"

onmouseover="this.style.cursor='move';">

If the id property contains the word 'Right', then set the innerHTML on divMovingBlock to:

<img src="/r-images/right-parentheses.gif"

onmouseover="this.style.cursor='move';">

In this case, the contents of the cell cannot be copied because there could be additional parentheses or an operator dropdown in that cell. So HTML that references the same image file that is used to create the parentheses in the cell is created. The reason the cursor is set is so that cursor stays in the 'move' mode while the image is being dragged around.

Finally the position of divMovingBlock on the page its size are set, followed by setting some variables to maintain some state. To set the height and width, the height and width of the style object on divMovingBlock is set to the offsetHeight and offsetWidth properties of the image or group block. The offsetHeight and offsetWidth property return an integer for the height and width of the object relative to its layout.

To set the left and top properties, it is desired to figure how far the group block is from the left and top edges of the page. To do that the distance of the table that contains all the HTML elements is obtained by using the offsetLeft property add it to the distance of between the left edge of the table that contains all the blocks. Then each cell is looped through until the current cell is gotten to and the offsetWidth of each cell added to the cellPadding and cellSpacing of each cell. The cellPadding is the padding before the edge of each cell, and cellSpacing is the spacing between each cell. To get the distance from the top of the page same thing is done but use the offsetTop and offsetHeight properties. The total of each is set to the left and top properties on the style object of divMovingBlock.

A reference to the group block or the image is set. It is desired also to know how far the mouse cursor is from the top and left edge of the group block or image. This is obtained by subtracting the offsetLeft property of divMovingBlock from the clientX property of the event and set that to a global variable called startLeft. For the global variable startTop, the offsetTop property of divMovingBlock is subtracted from the clientY property of the event. The last thing that is done is to assign a global variable, curElement, to the source element.

Now that the state is state and the copy of the element that will be moving displayed, events of the mouse movement (the drag) and the mouse button release (the drop) must be handled. Since it is possible to drag all over the page and the mouse button can be released at any point on the screen (although the element will not be moved anywhere), functions may be assigned to the onnmousemove and onmouseup events of the document object. When the page loads, the following lines of code are executed:

document.onmousemove=function (evt) {doMouseMove (evt)
    };
    document.onmouseup=function (evt) {doMouseUp(evt)
    };

Similar to what was to assign functions to events for the group block and parentheses, a new function can be assigned that takes the event as an input and calls a function that was written passing in that event.

The doMouseMove( ) function is relatively simple. Essentially, if an object is being dragged by the mouse, rather than a user just moving the mouse around the screen, it sets the new left and top position of the object being dragged and calls a function to see if that object has moved over a spot that it can be dropped. First it is checked to see if the global variable curElement is not null. If curElement is null, it means that the function doMouseDown( ) was not called and therefore, nothing is being dragged. Once it is known that something is being dragged, the getEvent( ) function is called, as described above, to get a handle to the event object that works across browsers. Then the new left position for the divMovingBlock is obtained by subtracting the startLeft value saved previously from the clientX property of the event. The reason that this is done is if the left side of divMovingBlock is set to the point where the mouse is, that may not be the spot where the user originally set his mouse when he began dragging the object. By subtracting the startLeft, the left side is kept the same distance away from the mouse pointer at all times. The same thing is done for the top of divMovingBlock by setting the top property of the style object to the clientY property minus startTop. If the new left position is less than zero, the left position is set to zero. The same test is performed for the top position. Once the position of the DIV is set, the tagName property of curElement is checked to see if it is 'TD' OR 'IMG', which tells us whether it is a group block or a parentheses. Either moveBlocks( ) or moveImg( ) can then be called depending on which it is. The inputs to those functions are the event object, the top position of the DIV, and the Boolean value, false. Finally, the following two properties are set:

thisEvent.returnValue=false;
    thisEvent.cancelBubble=true;

The first line makes sure there is no return value resulting from the event that was fired. The second line makes sure other events are not bubbled up from this event.

The functions moveBlocks( ) and moveImg( ) are relatively similar. The purpose of these functions is to loop through every cell of the table and see if the mouse cursor is over top of that cell. If it is over a cell and it is the type of cell that the object can be moved into, it highlights that cell. Then if the function was called from the doMouseUp( ) function then, all the blocks or parentheses are moved into the appropriate cell. In this case, 'false' was passed in meaning it is not desired to move anything, just to highlight it. Later in this document, moving will be discussed.

To begin in these functions, variables called startCell and startRow are set equal to the global variables set earlier called curCellIdx and curRowIdx. Then a nested for loop that goes through every cell in every row may be run. A variable curX is set to the distance from the edge of the page to the start of the first cell by adding offsetLeft property of both the main table and the block table. Also if the clientLeft property exists on the body object of the document, then that is added as well. This is the margin of the page. If it does not exist (some browsers do not support it), the offsetLeft property of the main table is re-added again to make up for the discrepancy. Then the variable curY is set equal to offsetTop property of the main table and the offsetTop property of the block table. In addition, the first row of the block table is actually the buttons that add parentheses in so the clientHeight property of that row can be added and the cellPadding and cellSpacing properties of the block table can be subtracted. The difference between clientHeight and clientWidth and offsetHeight and offsetWidth are that client versions including the padding of the cell. The values, curX and curY, may be used to maintain or x,y coordinates within the table. As each cell is looped through, the clientWidth of that cell is added to curX as well as adding in the cellSpacing and cellPadding properties of the block table. When moving to the next row, the clientHeight of the row just evaluated is added to curY. For each cell it is checked if the clientX property is greater than or equal to curX (the left side of the cell) and less than curX plus the clientWidth property of the cell (the right side), as well as the top value sent in (for some reason the clientY value seemed to change in IE between before the call of this function, so the top of the DIV may be used to help avoid this problem) is greater than or equal to curY (the top side of the cell) and less than curY plus the clientHeight property of the cell. For a group block, it is checked if the index of the cell is odd (remember, that the index for each cell in a row starts at zero rather than one; so even though it may appear that group blocks can only go in even-numbered cells, that is even-numbered from a visual perspective). If the cell index is odd, and the innerHTML property of the cell is not a non-breaking space (blocks cannot be moved into a cell that is empty) and it meets the criteria above, the variables startCell and startRow are set to the index of the cell and row currently on. In addition, the className property of the cell is set to 'tableBlock-cell-active' which changes the style of the cell, making it appear highlighted. If the above criteria is not met by the cell index is an odd number, the className property is set to 'tableBlock-cell-inactive'. For dragging parentheses, rather than checking for odd numbers, it is checked for even numbers and the className of the cell changed to 'operatorBlock-cell-active' or 'operatorBlock-cell-inactive'.

If the object that is being dragged is a parenthesis, before the table is looped through, it is desired to see if the parenthesis are being dragged over the trash can. The trash can image is on the right side of the row that includes the buttons—the first row of the block table. The position of the trashcan is determined by getting the left side of the cell (which spans all nine cells of the table) in the same way curX above was set and clientWidth of the cell added. That gives the right edge of the cell. Then the clientWidth property of the trashcan image can be subtracted to give us the left side of the trash can. The top of the trashcan can be obtained by getting the top of the table the same way curY was set above. Then it is checked to see if the clientX property is between the left and right edges of the trashcan image and that the top value sent in to the function is between the top and bottom edges of the trash can similar to how the edges of the cells were checked above. If the cursor is over top of the trash can, the src property of the image is changed to use an image of a trashcan highlighted and a variable is set that tell us that it is over the trash can, otherwise the src property is set to the original image for the trash can.

Since a false was passed to each function then nothing is moved, just highlighted, so the last part of each function is ignored.

The last part of dragging and dropping is the called from the onmouseup event. The function that is called is doMouseUp( ) This function checks to see if something had been being dragged. If it were, it calls the moveBlocks( ) or moveImg( ) function. Then assuming that the object that moved was not a parenthesis that was deleted, it set the current position of the item that was dragged and calls a function to have the DIV fade back into that object. First it is checked to see if the global variable curElement is not null. If curElement is null, it means that the function doMouseDown( ) was not called and therefore, nothing is being dragged. Once it is known that something is being dropped, curElement is set to null so no mouse movements will move the DIV and the getEvent( ) function is called as described above to get a handle to the event object that works across browsers. Next the top of the DIV is obtained by checking the top property on the style object. This returns a string rather than an integer and it includes 'px' at the end of the value, so the replace method may be called on the string—replace('px', ' ')—to remove the extra value from it. From that the parseInt function is called to turn the value into an integer. After the top value is obtained, it is checked to see whether the tagName of curElement is 'TD' or 'IMG'. As done in doMouseMove, the appropriate function, moveBlocks( ) or moveImg( ) is called. The event is passed in, the value for the top of the div, and the Boolean value, true. The function moveImg( ) returns a Boolean which is whether the parenthesis was deleted or not. If nothing was deleted, the cell is obtained that contains the object that was dropped by getting the parentNode property on the global variable, originalTable. Once the cell is obtained, the value for the top and left edge of that cell is obtained in the same way it was possible to get the coordinates of the cells previously. The offsetLeft of divMovingBlock is subtracted from the value of the left edge to get the distance horizontal distance they are from each other. The result is divided by 10 and rounded to the nearest integer. What is defined is the distance of each step in the fade. That global variable is called moveLeft. The same is done for the top and call that global variable moveUp. Finally, the function fadeIntoOriginal( ) is called and the src property on the trash can image is set to the original image to make sure that that image goes back to its original state.

Earlier it was described what happened when moveBlocks( ) and moveImg( ) was called passing in the value of false. The value of false indicated only dragging over things, not dropping any elements or moving any elements. From the function doMouseUp( ) it was passed in the value of true, which indicates dropping things and moving elements. In both functions the exact same things described above may be done.

In one embodiment, after that, though, things differ. Within moveBlocks( ) it is first checked if the row where the block is being dropped is greater than curRowIdx, which is the row index that the block started at. Or it can be checked whether the cell that the block is being dropped is greater than the cell index that was started at and that the rows are the same. If either of those conditions are true, then set some variables to maintain state. A variable called curRow can be set to curRowIdx and curCell set to curCellIdx. Also, set nextRow to curRow and a variable bFound to false. Then while bFound is false, set nextCell to curCell plus two. If nextCell is greater than seven then, the end of the row has been reached so increment nextRow and set nextCell to one. If curCell and curRow equal the cell and row where the block was dropped, startCell and startRow, then set bFound to be true. Otherwise, if the first item of the collection of childNodes in the nextCell and nextRow, childNodes[0], has the property innerHTML. If it does, then set a reference to that childNode. If not, then check the innerHTML property in the second childNode, childNodes[1] and set a reference to that childNode. If that does not have the innerHTML property the same thing is done for the third childNode, childNodes[2]. This may be due to a bug in Mozilla that adds empty childNodes but never more than two empty childNodes. Once a reference to the right childNode is obtained, which is the group block that is being shifted over, the method appendChild can be called on the curCell and curRow, and pass in the group block just referenced. This inserts the group block in the current cell. Then add two to the variable curCell. If that is greater than seven, increment curRow and set curCell to one. Keep doing this until the cell that that block was dropped into is reached. Finally, call the appendChild on that cell and pass in the reference to the block being dropped, originalTable, which was set in doMouseDown( ) Then reset curCellIdx and curRowIdx to the new indexes of the location where the block is now. If the index of the row where the block is being dropped is less than curRowIdx or if the index of the cell where the block is being dropped is less than curCellIdx and the row indexes are the same, do the same loop that were described above, except subtract two for each movement and if the beginning of the row is reached, decrement the row index.

The function fadeIntoOriginal is a simple function. It moves the DIV the step amount defined in doMouseUp( ) and checks to see if the next movement would move it past the element that it is fading back into. If it will pass, then it hides the DIV and removes deletes the copy of the element, otherwise it calls itself again. The first thing done is get the top and left position of divMovingBlock. The top can be obtained using the same approach that was used in doMouseUp( ) To get the left position, first see if the left property on the style object returns '0pt'. In Mozilla-based browsers, if a position is all the way left, it returns '0pt' instead of 0px. If that's the case just set the left position equal to zero. Otherwise, w use the replace method to remove 'px' from the return value and use parseInt to turn it into an integer. Next set two variables, is PastLeft and is PastTop. Do this by seeing if the current left position of the DIV, curLeft plus moveLeft is greater than or equal to the left position of the original element and moveLeft is greater than zero (the DIV is to the left of the element). Or see if curLeft plus moveLeft is less than or equal to the left position original element and moveLeft is less than zero (the DIV is to the right of the element). The variable is PastTop is determined the same way, except using moveUp and curTop. If is PastLeft and is PastTop are both true, then stop and will the DIV by setting the visibility property on the style object to 'hidden'. Then set the innerHTML property on divMovingBlock to an empty string. Finally to unhighlight the cell that was being dropped in, so check to see if curCellIdx is odd or even. If it is odd, then set the className on the cell to 'tableBlock-cell-inactive', otherwise set the className property to 'operatorBlock-cell-inactive'. If is PastTop or is PastLeft are false, then move the DIV. To do that check, first, to see if is PastLeft is true. If it is, then set the left property on the style object of divMovingBlock to the left position of the original element. Otherwise, set the left property to curLeft plus moveLeft. Next check to see if is PastTop is true. Do the same thing that was done for the left position except using the top variables. The last statement that is called is:

window.setTimeout('fadeIntoOriginal( );', 30);

What that does is calls the function fadeIntoOriginal, but before making the call, it waits 30 milliseconds. It will be apparent that nay value may be used here, however 30 milliseconds may result in a smooth transition in the fade.

Fading

In the Group editor, each group may be represented by a table of conditions. Each table contains a header row which has the name of the group, a row which contains the operator for that group (all of the following, any of the following, at least x of the following). A group also has a row for each condition. Finally, if a group is active it has a row which has a label for each column.

The header row of the table has two cells—one that spans 4 columns and a cell all the way to the right which has the image to delete the group. The first cell contains two DIV's. The first DIV the read-only view of the group name. The second DIV is the input for the group name.

The operator row of the table has one cell which spans 5 columns. This also contains two DIV's. The first DIV is the read-only view of the operator, while the second DIV is the dropdown for the operator.

When the header row of a group is clicked, a function called changeActive( ) is called. This function calls a function fadeToInActive( ) on the currently active group and then calls fadeToActive( ) on the group which was clicked.

In addition, when the page was loaded an array was created. It contains 5 elements—each a different color ranging from gray to orange.

The function fadeToActive( ) accepts the index of the table to make active, as well as the start position in the fade process, which in the initial case is zero. What the function does is based on the position in the face process it is in, it changes something in terms of look in the table, then increments the position, and calls itself again with the new position. Using the method window.setTimeout( ) the call to itself is delayed by 87 milliseconds (The number 87 was achieved by trial and error).

The first time through the process, the CSS class of the entire table is changed to the class which represents and active group by using the className property on the table. Also the background color of the header row is set to the first color in the array of colors by setting the bgColor property on the style object of each cell in the header row. The next four times through the function set the background color of the header row are changed to the corresponding color in the array.

The next time through the process, a function showHeaderRow( ) is called which sets the input DIV for the group name to a CSS class which makes it visible and sets the read-only DIV to a CSS class that makes it invisible. Also the final background color of the row is set by setting the bgColor property, and the className property is set for each cell to the active header row.

After the header row step, the next step is to show the operator row by calling showOperatorRow( ). What that function does is determine whether there is more than one condition is in the group. If there is more than one condition, the className of the cell in that row is set to a visible class, the input DIV is set to a visible class, and the read-only DIV is set to a class that makes it hidden.

The next step in the function adds the row that has labels for each column. This uses the calls the method insertRow( ) on the table. Then it inserts five cells in the row by using the insertCell( )method. The innerHTML is set for each cell as is the width and the className.

Finally, for each condition in the group, there is a step to make that row visible and to set each the className for each cell to a class which makes it in the active state. Also the visibility of the style object of the last column is set to 'vis-ible'. Because of a bug in Mozilla, to make sure that the width of each cell is set properly, the border property on the table may be set to '1' and then back to '0'. Once each condition is set to active, the last thing done is to again set the border of the table to '1' and back to '0' to ensure that everything looks as it should in all browsers.

The function fadeToInActive( ) performs exactly as the fadeToActive( ) function except in reverse. First for each condition, starting with the last row, it sets the className of each cell to a class that is in the inactive state. If there is only one condition, it does not hide the visibility of the condition, except for the column with the edit and delete link, while the visibility is hidden if there is more than one condition.

Next the row with that has the labels for each column is deleted by calling the removeChild( )method on the parentNode property of that row.

The CSS class of the operator is set to an inactive class next. If the group has more than one condition, then the read-only DIV is set to visible, otherwise both DIV's are set to be hidden and the row height is set to zero, hiding the row.

The read-only DIV for the group name in the header row is made visible while the input is set to be hidden.

The final five steps go back through the colors in the array in reverse order. On that last step, both cells for the header row have their className set to a class that is in the inactive state, and the background color of each cell is set to gray. Now everything may have changed to either inactive or active.

Although the present invention has been described in detail herein with reference to the illustrative embodiments, it should be understood that the description is by way of example only and not to be construed in a limiting sense. It is to be further understood, therefore, that numerous changes in the details of the embodiments of this invention and additional embodiments of this invention will be apparent to, and may be made by, persons of ordinary skill in the art having reference to this description. Accordingly, the scope of the invention should be determined by the following claims and their legal equivalents.

What is claimed is:

1. A computer-implemented method of defining object classes, comprising:
   on a computer, executing the method of:
   programming the computer with a browser-based classification editor having a first tier functionality and a second tier functionality;
   wherein said first tier functionality is operable to enable a user of said computer to
     create a new class having a first group;
     select and associate one or more attributes with said first group; and
     define and modify one or more conditions to said first group, wherein said first group comprises objects having said one or more attributes that meet at least one of said one or more conditions; and
   wherein said second tier functionality is operable to enable said user to manipulate an expression comprising said first group.

2. The computer-implemented method according to claim 1, wherein said first tier functionality and said second tier functionality operate within a single classification page of a browser application running on said computer.

3. The computer-implemented method according to claim 2, wherein said first tier functionality is operable to enable said user to access said second tier functionality through a first click on said classification page.

4. The computer-implemented method according to claim 3, wherein said second tier functionality is operable to enable said user to return to said first tier functionality through a second click on said classification page.

5. The computer-implemented method according to claim 2, wherein said classification page is written in hypertext markup language.

6. The computer-implemented method according to claim 1, wherein upon creation of a second group said first tier functionality is operable to display a default expression comprising names of said first group and said second group.

7. The computer-implemented method according to claim 6, wherein said second tier functionality is operable to enable said user to modify said default expression.

8. The computer-implemented method according to claim 7, wherein said second tier functionality is further operable to enable said user to drag-and-drop a block representing said first group into a new position.

9. The computer-implemented method according to claim 8, wherein upon said first group being dropped into said new position said first tier functionality is operable to display a modified expression accordingly.

10. The computer-implemented method according to claim 1, wherein said first tier functionality is further operable to enable said user to name said first group, wherein said first group is an active group and initially blank.

11. The computer-implemented method according to claim 9, wherein upon creation of a second group said browser-based classification editor is operable to deactivate said first group.

12. A non-transitory computer-readable medium carrying computer-executable instructions implementing a browser-based classification editor having a first tier functionality and a second tier functionality,
wherein when executed by a computer said first tier functionality and said second tier functionality operate within a single classification page of a browser application running on said computer,
wherein said first tier functionality is operable to enable a user of said computer to
create and modify a plurality of groups;
select and associate attributes with each of said plurality of groups; and
define and modify conditions for each of said plurality of groups,
wherein each of said plurality of groups comprises objects having one or more associated attributes that meet at least one of said conditions; and
wherein said second tier functionality is operable to enable said user to create and manipulate expressions comprising said plurality of groups.

13. The computer-readable medium of claim 12, wherein said first tier functionality is operable to enable said user to access said second tier functionality through a first click on said classification page and wherein said second tier functionality is operable to enable said user to return to said first tier functionality through a second click on said classification page.

14. The computer-readable medium of claim 12, wherein said first tier functionality is operable to display a default expression comprising names of at least two groups and a relationship between said at least two groups.

15. The computer-readable medium of claim 12, wherein said second tier functionality is operable to enable said user to modify said default expression.

16. The computer-readable medium of claim 15, wherein said second tier functionality is further operable to enable said user to drag-and-drop a block representing a group into a new position.

17. The computer-readable medium of claim 15, wherein said first tier functionality is operable to display a modified expression showing on-the-fly said group in said new position.

18. A computer system comprising:
a processor; and
a non-transitory computer-readable medium carrying computer-executable instructions implementing a browser-based classification editor having a first tier functionality and a second tier functionality,
wherein when executed by said processor said first tier functionality and said second tier functionality operate within a single classification page of a browser application running on said computer system,
wherein said first tier functionality is operable to enable a user of said computer system to
create and modify a plurality of groups;
select and associate attributes with each of said plurality of groups; and
define and modify conditions for each of said plurality of groups,
wherein each of said plurality of groups comprises objects having one or more associated attributes that meet at least one of said conditions; and
wherein said second tier functionality is operable to enable said user to create and manipulate expressions comprising said plurality of groups.

19. The computer system of claim 18, wherein said first tier functionality is operable to enable said user to access said second tier functionality through a first click on said classification page and wherein said second tier functionality is operable to enable said user to return to said first tier functionality through a second click on said classification page.

20. The computer system of claim 18, wherein said first tier functionality is operable to display a default expression comprising names of at least two groups and a relationship between said at least two groups, wherein said second tier functionality is operable to enable said user to modify said default expression by drag-and-drop, and wherein said first tier functionality is operable to display a modified expression on-the-fly.

* * * * *